United States Patent
Bain et al.

(10) Patent No.: US 11,398,728 B2
(45) Date of Patent: Jul. 26, 2022

(54) METHODS AND SYSTEMS FOR AN AUTOMATED UTILITY MARKETPLACE PLATFORM

(71) Applicant: Energywell Technology Licensing, LLC, Greens Farms, CT (US)

(72) Inventors: Nicholas Jordan Bain, Greens Farms, CT (US); Gregory Craig, Greens Farms, CT (US); David Robert Cass, Greens Farms, CT (US); Luke Dallafior, Greens Farms, CT (US); Jason Rudder, Greens Farms, CT (US); Jeremy Zarowitz, Greens Farms, CT (US); Emily Cipes, Greens Farms, CT (US); Anwar Rohan, Greens Farms, CT (US); Bardia Keyvani, Greens Farms, CT (US); Kabir Shukla, Greens Farms, CT (US); Charles Cella, Pembroke, MA (US)

(73) Assignee: ENERGYWELL TECHNOLOGY LICENSING, LLC, Greens Farms, CT (US)

( * ) Notice: Subject to any disclaimer, the term of this patent is extended or adjusted under 35 U.S.C. 154(b) by 172 days.

(21) Appl. No.: 16/539,577

(22) Filed: Aug. 13, 2019

(65) Prior Publication Data
US 2019/0372345 A1    Dec. 5, 2019

Related U.S. Application Data

(63) Continuation of application No. PCT/US2018/018013, filed on Feb. 13, 2018.
(Continued)

(51) Int. Cl.
H02J 3/00      (2006.01)
G06Q 50/06     (2012.01)
H02J 3/38      (2006.01)

(52) U.S. Cl.
CPC .............. *H02J 3/008* (2013.01); *G06Q 50/06* (2013.01); *H02J 3/381* (2013.01); *H02J 3/003* (2020.01)

(58) Field of Classification Search
CPC   H02J 3/008; H02J 3/381; H02J 3/003; G06Q 50/06; G06Q 30/0601; Y02P 90/90
See application file for complete search history.

(56) References Cited

U.S. PATENT DOCUMENTS 5,479,358 A    12/1995  Shimoda et al.
7,043,459 B2    5/2006  Peevey
(Continued)

FOREIGN PATENT DOCUMENTS

JP    2009075876 A    4/2009
JP    2016018242 A    2/2016

OTHER PUBLICATIONS

PCT International Search Report and Written Opinion dated Jul. 26, 2018 for International Application No. PCT/US2018/018013, 66 pages.
(Continued)

*Primary Examiner* — Ziaul Karim
(74) *Attorney, Agent, or Firm* — RMCK Law Group, PLC

(57) ABSTRACT

A platform and components for an automated consumer retail utility marketplace are provided, including components for machine learning, components for gamification, and components for supporting a related consumer mobile application that enables improved visibility and control by a consumer over its interaction with energy markets.

19 Claims, 43 Drawing Sheets

Related U.S. Application Data

(60) Provisional application No. 62/458,479, filed on Feb. 13, 2017.

(56) References Cited

U.S. PATENT DOCUMENTS

| | | |
|---|---|---|
| 2004/0128266 A1 | 7/2004 | Yellepeddy et al. |
| 2004/0199294 A1 | 10/2004 | Fairlie et al. |
| 2006/0276938 A1 | 12/2006 | Miller |
| 2009/0043520 A1* | 2/2009 | Pollack ................. B60L 53/65 705/400 |
| 2010/0138363 A1 | 6/2010 | Batterberry et al. |
| 2010/0174643 A1* | 7/2010 | Schaefer .............. G06Q 20/102 705/40 |
| 2011/0264563 A1 | 10/2011 | Lundberg et al. |
| 2012/0043813 A1 | 2/2012 | Doi et al. |
| 2012/0047384 A1 | 2/2012 | Morris |
| 2012/0216123 A1 | 8/2012 | Shklovskii et al. |
| 2013/0238266 A1 | 9/2013 | Savvides et al. |
| 2013/0262197 A1* | 10/2013 | Kaulgud ................... H02J 3/14 705/14.1 |
| 2014/0129040 A1 | 5/2014 | Emadi et al. |
| 2015/0032277 A1 | 1/2015 | Warren et al. |
| 2015/0301548 A1 | 10/2015 | Goparaju et al. |
| 2016/0080500 A1 | 3/2016 | Penilla et al. |
| 2016/0371289 A1 | 12/2016 | Kopp et al. |

OTHER PUBLICATIONS

Supplementary European Search Report dated Aug. 17, 2020 for EP Application No. 18751412.0, 8 pages.

* cited by examiner

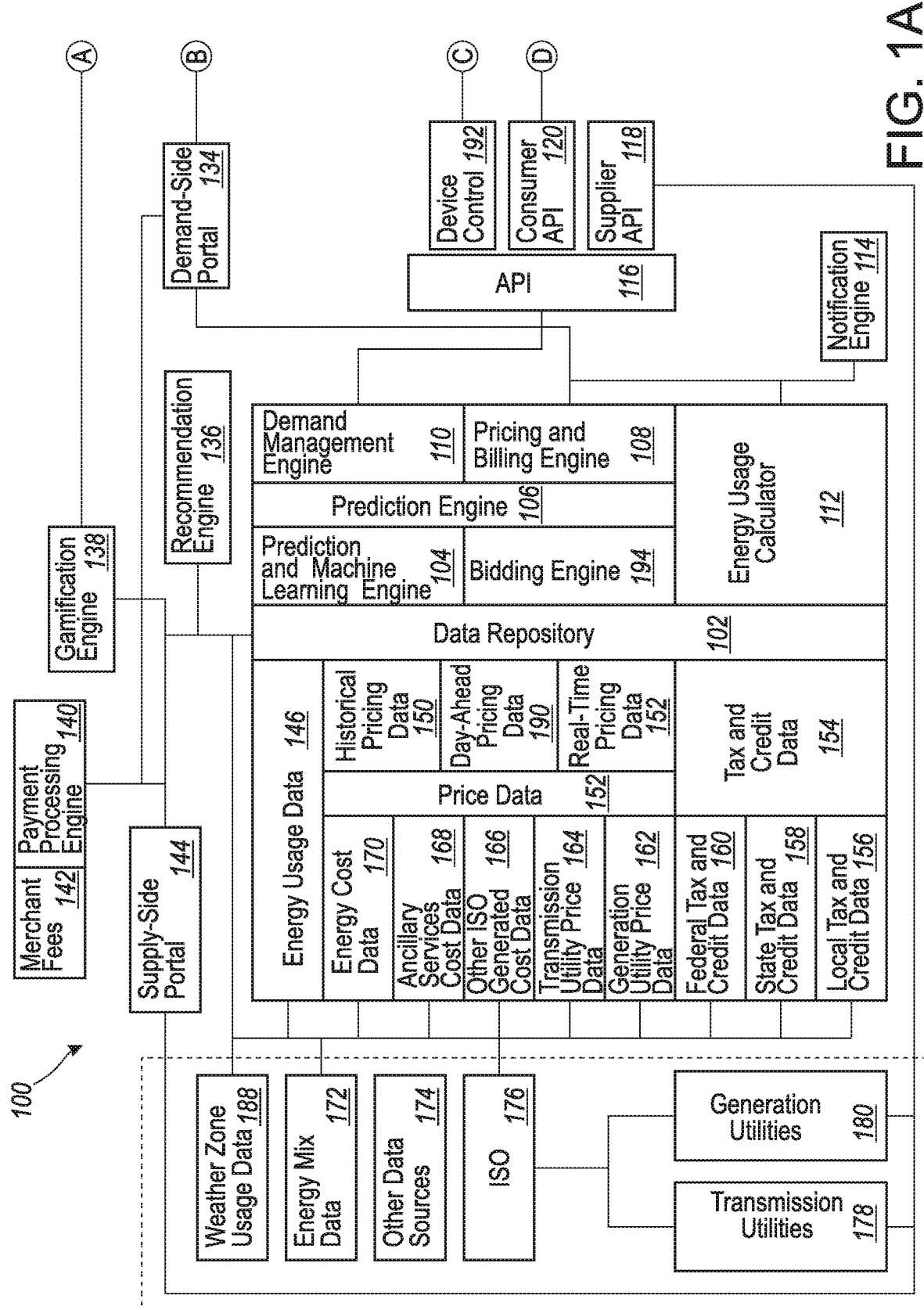

| Facility A 2302 | Residual Energy Consumption Portion A 2404 | | Time A 2002 | Time B 2004 |
|---|---|---|---|---|
| | | Source A 1930 | | |
| | | Source B 1932 | | |
| | Energy Consumption Allocation Estimate A 2410 | Cost A 1940 | | |
| | Energy Consumption Allocation Estimate B 2412 | Cost B 1942 | | |

User Interface 1970

FIG. 24

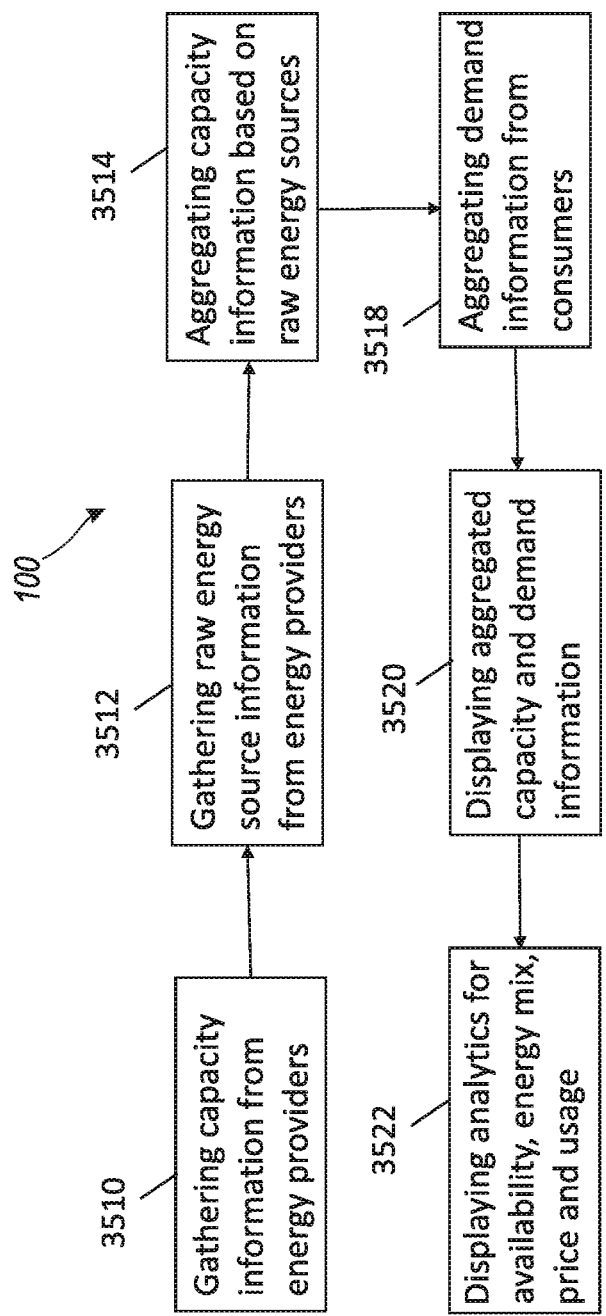

METHODS AND SYSTEMS FOR AN AUTOMATED UTILITY MARKETPLACE PLATFORM

CROSS-REFERENCE TO RELATED APPLICATIONS

This application is a continuation of PCT International Application No. PCT/US2018/018013, filed Feb. 13, 2018, which claims priority from U.S. Provisional Application No. 62/458,479, filed Feb. 13, 2017, entitled Methods and Systems for an Automated Utility Marketplace Platform, which are hereby incorporated by reference as if set forth herein in their entirety.

BACKGROUND

This disclosure relates to the field of energy, and more particularly to an automated platform for a marketplace for retail energy.

Delivery of energy and other utilities like water, natural gas, and the like to consumers (including individual retail consumers and various commercial, government, industrial, educational, and other enterprises) via the electrical grid, pipes, and other infrastructure, involves complex interactions among various parties, including various energy producers (e.g., owners and operators of power plants (using coal, oil, natural gas, nuclear energy and other sources), renewable energy producers (e.g., providing wind, solar, hydro-power and other renewable energy), providers of energy grid infrastructure (including generators, transformers, transmission lines, and many other elements), providers of water and gas pipes and other infrastructure, utilities (providers of electricity, water, gas and other utilities), regulators, and independent service organizations (including ones that manage the grid to match available supply and demand based on current conditions). Marketplaces have evolved, where energy and utilities are traded, on a current basis and via various financial instruments, including futures contracts, options, and various forms of derivative securities. Platforms involving information technology, including "smart grid" elements, middleware, software, and other elements, have evolved to help parties like large enterprises manage energy and utility usage, such as by managing demand for energy to heat or cool buildings based on the price and availability of energy at any given time and by managing the water supply. However, despite these highly complex technologies that balance overall supply and demand for power and other utilities and that enable sophisticated trading of energy and other utilities based on current and future pricing, for the typical retail consumer these variable characteristics of the infrastructure remain almost entirely opaque. A consumer may receive a period report indicating the per unit price of energy or other utilities and the amount consumed, but there is little or no visibility into the sources used to produce the energy or other utility, the actual price of the energy or other commodities to the utility that services the consumer, or many other factors that characterize the marketplace from which the consumer's power, water, or the like is provided. As consumers become increasingly interested in the sources of energy or other utilities (e.g., preferring renewable energy to fossil fuels) and continue to need control of their cost of consuming energy and other utilities, a need exists for methods and systems that provides greater visibility to consumers, that provides increased control for consumers with respect to their consumption of energy and other utilities, and that provides mechanisms for optimizing visibility and control to provide a higher value experience in the acquisition and consumption of energy and other utilities.

Transmission distribution service providers (TDSPs) for electrical power also face significant challenges. Because consumer reactions to changing prices are very slow (in part due to the absence of frequent updates in pricing information for consumers), TDSPs need to constantly invest in the grid and related protection infrastructure, to address higher peak demand, even though that demand may only ever be called upon to be used rarely, such as for an hour a year. This problem, sometimes referred to as "gold-plating the grid," requires much greater capital investment than if consumer behavior could be shaped to reduce the frequency or extent of peak demand events. A need exists for methods and systems that allow consumers to react more quickly to changes in the grid, thereby reducing the need for spending on infrastructure.

SUMMARY

An automated marketplace platform for energy and other utilities, referred to in some cases simply as the utility marketplace, utility marketplace, the marketplace, or the platform, is disclosed herein, with various systems, components, modules, services, facilities and processes (these being collectively referred to herein for convenience as "modules," "components," or the like), including information technology components specifically configured to enable consumers, such as retail consumers of energy and other utilities, to purchase and consume utilities efficiently and according to their preferences and needs, and including characteristics (such as relating to current and future energy and utility prices, sources of energy or utilities of particular types, and the like) of the underlying energy or utility infrastructure and marketplaces that are managed by incumbent entities like utilities, energy companies, and independent service organizations (ISOs). References to "energy" throughout this disclosure should be understood to encompass various types of energy, such as electricity, gas, and the like, and, except where the context indicates otherwise, embodiments referring to energy should be understood to encompass other utilities, such as water. The platform may include an architecture and components for obtaining and integrating data from a wide range of sources, including pricing and cost data, tax and credit data (such as relating to renewable energy credits), weather data, and other types of data from utilities, ISOs and other sources. The platform may have engines for demand management, pricing and billing, including ones that take advantage of machine learning capabilities, prediction capabilities, and the like. The platform may include a payment processing engine as well as interfaces for various constituencies, including application programming interfaces (APIs), portals, and the like. In embodiments, the platform may include a gamification engine for enabling game-based features, such as ones that encourage or reward consumer behavior that helps the consumer achieve objectives or that otherwise provides desired benefits for a host of the platform or for society. The platform may be configured to support one or more mobile applications, such as mobile applications that organize consumer interactions with the platform, including providing user interface features to provide visibility to the consumer, to enable workflows, to enable games and contests, and the like. In addition to helping consumers, the platform may help TDSPs, such as by shaping consumer behavior to reduce the frequency and extent of peak demand events, in turn reducing the need for expensive infrastructure investments that are required to handle rare events.

A platform for an automated consumer retail utility marketplace is provided. The platform may include a data repository for handling data from a plurality of data sources that characterize the sources of production of energy for an energy grid during a given period of time and the wholesale energy prices charged by the sources of production; a demand management engine for managing demand by consumers for energy; a machine learning engine for automating at least one component of the platform; and at least one interface by which a consumer is provided visibility in real time to the price of energy and the mix of energy production sources at a given time. The platform may also include a gamification engine for presenting an interface to a consumer that enables a game that promotes consumer behavior relating to energy usage. The platform may also include components of the platform configured for supporting a related consumer mobile application that provides the visibility to the consumer via the consumer's mobile device.

In embodiments, the methods and systems of the present disclosure include a user interface through which a consumer accesses an energy marketplace. The user interface includes a first visual element representing a real-time price of a type of energy available to the consumer over a consumer energy distribution network for a current time interval. The first visual element is updated at least once per time interval. The user interface includes a second visual element representing estimated prices for energy from different raw energy sources for a future time interval. The second visual element is updated at least once per time interval based on a time interval-specific calculation of the estimated prices. The user interactions with the second visual element result in allocation of at least one of the raw energy sources to produce energy for consumption by the consumer in the at least one future time interval.

In embodiments, the user interface includes a third visual element representing an indication of a trend direction of the first element compared to the second visual element and a fourth visual element representing portions of the type of energy available to the consumer attributable to a plurality of raw sources of energy. User interactions with the fourth visual element result in user selection of at least one raw source of energy to be allocated to energy for consumption by the consumer in at least one future time interval.

In embodiments, the user interface includes a third visual element representing a user selection of at least one raw energy source for the future time interval. User interactions with the third visual element result in user selection of at least one raw source of energy to be allocated to energy for consumption by the consumer in the at least one future time interval.

In embodiments, the methods and systems of the present disclosure include a user interface through which a consumer accesses an energy marketplace. The user interface includes a first visual element representing real-time price of a type of energy available to the consumer over a consumer energy distribution network for a current time interval. The first visual element is updated at least once per time interval. The user interface includes a second visual element representing estimated prices for energy from different raw energy sources for a future time interval. The second visual element is updated at least once per time interval based on a time interval-specific calculation of the estimated prices. User interactions with the second visual element result in user selection of at least one raw source of energy to be allocated to energy for consumption by the consumer in the at least one future time interval.

In embodiments, the user interface includes a third visual element representing an indication of a trend direction of the first element compared to the second visual element and a fourth visual element representing portions of the type of energy available to the consumer attributable to a plurality of raw sources of energy. User interactions with the fourth visual element result in user selection of at least one raw source of energy to be allocated to energy for consumption by the consumer in at least one future time interval.

In embodiments, the user interface includes a third visual element representing a user selection of at least one raw energy source for the future time interval. User interactions with the third visual element result in user selection of at least one raw source of energy to be allocated to energy for consumption by the consumer in the at least one future time interval.

In embodiments, the methods and systems of the present disclosure include a user interface through which a consumer accesses an energy marketplace. The user interface includes a first visual element representing a real-time price of a type of energy available to the consumer over a consumer energy distribution network for a current time interval. The first visual element is updated at least once per time interval. The user interface includes a second visual element representing an estimated price of the type of energy for a future time interval. The second visual element is updated at least once per time interval based on a time interval-specific calculation of the estimated price. The user interface includes a third visual element representing an indication of a trend direction of the first element compared to the second visual element and a fourth visual element representing portions of the type of energy available to the consumer attributable to a plurality of raw sources of energy. User interactions with the fourth visual element result in user selection of at least one raw source of energy to be allocated to energy for consumption by the consumer in at least one future time interval.

In embodiments, the methods and systems of the present disclosure include a user interface through which a consumer accesses an energy marketplace. The user interface includes a first visual element representing sourcing of a type of energy available to the consumer over a consumer energy distribution network from a plurality of raw energy sources for a current time interval and a second visual element representing an estimate of sourcing of the type of energy available to the consumer over the energy distribution network from a plurality of raw energy sources for at least one future time interval. The user interface includes a third visual element representing a user selection of at least one raw energy source for the future time interval. User interactions with the third visual element result in user selection of at least one raw source of energy to be allocated to energy for consumption by the consumer in the at least one future time interval.

In embodiments, the methods and systems of the present disclosure include a user interface through which a consumer accesses an energy marketplace. The user interface includes a first visual element representing a mix of raw energy being used to provide energy available through a consumer energy distribution network in a current time interval and a second visual element representing a forecast of the mix of raw energy for a future time interval. The user interface includes a third visual element that is dependent on differences between the forecast mix and the use mix in the current time interval. Consumer interaction with any of the first, second, and third visual element facilitates allocation of at least one raw energy in the mix of raw energy for a future time interval to produce energy for the consumer.

In embodiments, the methods and systems of the present disclosure include a user interface through which a consumer accesses an energy marketplace. The user interface includes a first visual element representing sourcing of a type of energy available to the consumer over a consumer energy distribution network from a plurality of raw energy sources for a current time interval and a second visual element representing an estimate of sourcing of the type of energy available to the consumer over the energy distribution network from a plurality of raw energy sources for at least one future time interval. The user interface includes a third visual element representing a user selection of at least one raw energy source for the future time interval. User interactions with the third visual element result in an allocation of at least one of the raw energy sources to produce energy for consumption by the consumer in the at least one future time interval.

In embodiments, the methods and systems of the present disclosure include a user interface through which a consumer accesses an energy marketplace. The user interface includes a first visual element representing an estimate of production output of energy for distribution over a consumer energy distribution network. The energy for distribution is sourced from one of a plurality of raw energy sources and distributed over the energy distribution network during a future time interval of a plurality of future consecutive time intervals. The user interface includes a second visual element representing an estimate of demand for the energy sourced from the one of a plurality of raw energy sources for the future time interval. The second visual element is updated at least once per time interval by calculating the estimate of demand in response to raw energy source selection activity by a plurality of consumers interacting an instance of the user interface on consumer-specific mobile devices. The user interface also includes a demand allocation visual display element that depicts an allocation of each of the raw energy sources to the production of the energy for distribution based on the updated estimate of demand.

In embodiments, the methods and systems of the present disclosure include a user interface through which a consumer accesses an energy marketplace. The user interface includes a first visual element that depicts consumption of energy by a consumer in a first time interval based on data received from at least one energy consumption tracking meter of the consumer and a gamification visual element that depicts at least one game question, the response of the consumer to which impacts an estimate of consumption by the consumer during a future time interval. The user interface includes a second visual element that depicts the estimate of future time interval consumption based on a prediction of response of the consumer to the at least one game questions in the gamification element. The second visual element is updated based on the response of the consumer to the at least one game question.

In embodiments, the first visual element depicts energy consumption for a plurality of uses of the energy by the consumer.

In embodiments, the plurality of uses includes at least one of heating, cooling, cooking, washing clothing, drying clothing, operation of appliances, energy storage, lighting, and a use that exceeds five percent of annual load.

In embodiments, the methods and systems of the present disclosure include a user interface through which a consumer accesses an energy marketplace. The user interface includes a leaderboard including a first visual element representing relative measures of consumer success in achieving objectives of the energy marketplace. The consumer success is based on at least one of consumer responses to questions posed in the user interface, and energy-related actions taken by the consumer, the completion of which contribute to the measure of consumer success.

In embodiments, the methods and systems of the present disclosure include a method for a consumer to manage energy. The method includes gathering consumer energy usage measurements for the energy consumed by the consumer across a plurality of energy consumption devices over discrete time intervals. The method includes allocating the gathered energy usage measurements to at least one source of the energy for each of the discrete time intervals and calculating a cost of energy usage for each of the discrete time intervals by processing the gathered energy usage measurements and the at least one source of the energy with an energy pricing engine that tracks actual cost of energy purchased at price intervals for at least one source of energy. The method further includes presenting the calculated cost of energy usage and calculated costs of at least two sources of energy for each of the discrete time intervals in a user interface.

In embodiments, the user interface is populated by data from a consumer energy marketplace through which the at least one source of the energy for allocating to at least one future discrete time interval is selectable by the consumer. In embodiments, the at least one source of the energy is a fossil fuel. In embodiments, the method includes at least one other source of energy tracked by the energy pricing engine that is a different fossil fuel. In embodiments, the at least one source of energy is a renewable energy source. In embodiments, the method includes at least one other source of energy tracked by the energy pricing engine that is a fossil fuel source. In embodiments, the at least one source of the energy is one of fossil fuel, renewable fuel, and nuclear fuel.

In embodiments, the energy pricing engine calculates the costs of at least two sources of energy based on a consumer type of the consumer so that the presented costs of the at least two sources of energy are based on consumption costs by the consumer type of the consumer.

In embodiments, the consumer type is one of a retail consumer, a business consumer, an industrial consumer, and an energy provider.

In embodiments, the energy pricing engine calculates the costs of at least two sources of energy based on a location parameter of the consumer so that the presented costs of the at least two sources of energy are based on costs for energy in a geographic region indicated by the location parameter.

In embodiments, the location parameter specifies a postal code. In embodiments, the location parameter specifies one of a county, a parish, a prefecture, an arrondissement, and a canton. In embodiments, the location parameter specifies one of a state, a commonwealth, a province, a territory, a municipality, and a community. In embodiments, the location parameter specifies one of a local geographic region, a multi-state region, a community region, and an administrative district.

In embodiments, the energy pricing engine calculates the costs of the at least two sources of energy based on available energy sources associated with a location parameter of the consumer. In embodiments, the presented calculated costs of the at least two sources of energy are for sources of energy for a geographic region indicated by the location parameter.

In embodiments, the energy pricing engine calculates the costs of at least two sources of energy based on a target total consumption of energy from the at least two sources of energy. In embodiments, the presented calculated costs of the at least two sources of energy are normalized for the target total consumption.

In embodiments, the target total consumption of energy is aligned with an actual total consumption of energy from the at least one source of the energy for each of the discrete time intervals presented in the user interface.

In embodiments, the methods and systems of the present disclosure include a method for a consumer to manage energy. The method includes gathering consumer energy usage measurements for energy generated from a plurality of different types of energy sources and consumed by the consumer over discrete time intervals. The method includes allocating the gathered consumer energy usage measurements for each of the different types of energy consumed to an energy source for each type of the different types of energy within the discrete time intervals. The method also includes calculating a cost of energy usage for each type of the different types of energy consumed in the discrete time intervals by processing the consumer energy usage measurements for each type of energy consumed and the energy source for each type of the different types of energy with an energy pricing engine that tracks real-time cost of energy sourced from the plurality of different types of energy sources. The method further includes aggregating the calculated cost of energy usage across each type of the different types of energy for each time interval and presenting the aggregated calculated cost of energy usage and calculated costs of at least two sources of energy for each discrete time interval in a user interface.

In embodiments, the user interface is populated by data from a consumer energy marketplace through which a source of energy for allocating to at least one future discrete time interval is selectable by the consumer.

In embodiments, at least one of the at least two sources of energy is a fossil fuel. In embodiments, at least one other source of energy tracked by the energy pricing engine is a different fossil fuel. In embodiments, the at least one of the sources of energy is a renewable energy source relative to the plurality of different types of energy sources.

In embodiments, at least one other source of energy tracked by the energy pricing engine is a fossil fuel source. In embodiments, the plurality of different types of energy sources includes at least one source of energy is one of fossil fuel, renewable fuel, and nuclear fuel.

In embodiments, the energy pricing engine calculates costs of at least two sources of energy based on a consumer type of the consumer. The presented calculated costs of the at least two other sources of energy are based on consumption costs by the consumer type of the consumer.

In embodiments, the consumer type is one of a retail consumer, a business consumer, an industrial consumer, and an energy provider.

In embodiments, the energy pricing engine calculates costs of the at least two sources of energy based on a location parameter of the consumer. The presented calculated costs of the at least two sources of energy are based on costs for the energy in a geographic region indicated by the location parameter.

In embodiments, the location parameter specifies a postal code.

In embodiments, the location parameter specifies one of a county, a parish, a prefecture, an arrondissement, and a canton.

In embodiments, the location parameter specifies one of a state, a commonwealth, a province, a territory, a municipality, and a community.

In embodiments, the location parameter specifies one of a local geographic region, a multi-state region, a community region, and an administrative district.

In embodiments, the energy pricing engine calculates costs of the at least two sources of energy based on available energy sources associated with a location parameter of the consumer. In embodiments, the presented calculated costs of the at least two sources of energy are for sources of the energy for a geographic region indicated by the location parameter.

In embodiments, the energy pricing engine calculates costs of the at least two sources of energy based on a target total consumption of energy from the at least two sources of energy. In embodiments, the presented calculated costs of the at least two sources of energy are normalized for the target total consumption.

In embodiments, the target total consumption of energy is aligned with an actual total consumption of the energy from at least one source of energy from the plurality of different types of energy sources and for each discrete time interval presented in the user interface.

In embodiments, the methods and systems of the present disclosure include a method to manage energy at a facility with a meter. The method includes measuring energy consumption for the facility with the meter that records energy consumption for adjacent time intervals and determining an energy consumption context for at least one of the adjacent time intervals for each of multiple energy consuming devices in the facility. In embodiments, the determining of the energy consumption context includes measuring at least one of multiple factors that indicate a profile energy consumption for the energy consuming devices. The method includes applying the energy consumption context to energy usage models for the energy consuming devices. In embodiments, the energy usage models produce an estimate of energy consumption for each of the energy consuming devices for the at least one of the adjacent time intervals. The method includes allocating a corresponding portion of the measured energy consumption to each of the energy consuming devices based on the estimate of energy consumption for each of the multiple energy consuming device and reporting in a user interface the energy consumption for the facility as energy consuming device-by-device estimated consumption and a residual portion determined from an unallocated portion of the measured energy consumption for the facility.

In embodiments, the measured energy consumption for the facility is electrical energy.

In embodiments, the measured energy consumption for the facility is reported with energy cost information for the adjacent time intervals that are applicable to the measured energy consumption.

In embodiments, the measured energy consumption for the facility is reported with energy source information for the adjacent time intervals that are applicable to the measured energy consumption.

In embodiments, the measuring at least one of the multiple factors includes measuring energy flow into the multiple energy consuming devices.

In embodiments, the measuring at least one of the multiple factors includes receiving factor measurement data over a network from a networked computing device that measures a condition associated with at least one of the multiple energy consuming devices.

In embodiments, the at least one of the multiple energy consuming devices is a water heater and the condition associated with the at least one of the multiple energy consuming devices is a flow rate of water through the water heater.

In embodiments, the at least one of the multiple energy consuming devices is a water heater and the condition associated with the at least one of the multiple energy consuming devices is a temperature of water flowing into the water heater.

In embodiments, the at least one of the multiple energy consuming devices is a water heater and the condition associated with the at least one of the multiple energy consuming devices is a set temperature for the water heater.

In embodiments, the at least one of the multiple energy consuming devices is a water heater and the condition associated with the at least one of the multiple energy consuming devices is a temperature of water flowing out of the water heater.

In embodiments, the at least one of the multiple energy consuming devices is a water heater and the condition associated with the at least one of the multiple energy consuming devices is a portion of the time interval that the water heater is actively heating water in the water heater.

In embodiments, the at least one of the multiple energy consuming devices is a water heater and the condition associated with the at least one of the multiple energy consuming devices is a portion of the time interval that the water heater is consuming energy.

In embodiments, the at least one of the multiple energy consuming devices is a water heater is one of tankless, storage tank-based, and on-demand. In embodiments, the water heater has a gas heating element. In embodiments, the water heater has an electric heating element. In embodiments, the at least one of the multiple energy consuming devices is an air conditioner. In embodiments, the condition associated with the air conditioner is an outdoor temperature proximal to the air conditioner. In embodiments, the condition associated with the air conditioner is an indoor temperature proximal to the air conditioner. In embodiments, the condition associated with the air conditioner is an air filter blockage. In embodiments, the air filter blockage condition is an estimate of blockage based on an amount of time that the air conditioner circulation fan operates. In embodiments, the at least one of the multiple energy consuming devices is a home heating system. In embodiments, the condition associated with the home heating system is an outdoor temperature proximal to the heating system. In embodiments, the condition associated with the home heating system is an indoor temperature proximal to the heating system. In embodiments, the condition associated with the home heating system is air filter blockage. In embodiments, the condition of the air filter blockage is an estimate of blockage based on an amount of time that a circulation fan operates that is associated with the heating system.

In embodiments, the methods and systems of the present disclosure include an energy supply network for a consumer. The network includes multiple producers of a type of energy suitable for distribution over a residential energy distribution network. A set of the multiple producers each uses different raw sources of energy to produce the type of energy. The network includes a consumer energy marketplace platform that calculates aggregated demand estimates for each of the raw sources of energy based on aggregated consumer energy consumption estimates allocated to each of the raw sources of energy as specified by the consumers. The network also includes an energy producer load manager that controls energy flow to the energy supply network from the multiple producers based on a demand forecast received from the consumer energy marketplace platform for each of the different raw sources of energy.

In embodiments, the network includes an energy output meter disposed for measuring an amount of energy provided to the energy supply network at an entry point into the energy supply network for each of the multiple producers.

In embodiments, the type of energy is selected from the list consisting of natural gas, renewable, nuclear, coal, electricity, and oil.

In embodiments, the methods and systems of the present disclosure include a method of managing energy for consumers. The method includes receiving an estimate of an amount and timeframe of availability of the energy from each of multiple energy producers of a type of energy suitable for distribution over a residential energy distribution network. The method includes calculating a cost to receive the energy from the multiple energy producers and a retail price to provide the energy to the consumers over the residential energy distribution network from each of the multiple producers. The method includes generating retail consumer-specific usage cost estimates for multiple adjacent time intervals during the timeframe of availability by applying consumer-specific usage data to a model of energy usage for each of the multiple energy producers and associating a raw energy source to each of the multiple energy producers. The method includes presenting, in an electronic user interface of a consumer energy marketplace, comparative cost estimate information for a set of the multiple energy providers for the multiple adjacent time intervals and in response to a consumer selecting a raw energy source for each of the multiple adjacent time intervals, providing raw energy source-specific energy demand data to an energy producer load management facility for managing an allocation of demand of energy during the timeframe of availability among the multiple energy producers.

In embodiments, the raw energy source is selected from the list of raw energy sources consisting of solar, wind, hydro, fossil, nuclear, and gravity.

In embodiments, the user interface is populated by data from a consumer energy marketplace through which a source of energy for allocating to at least one future discrete time interval is selectable by the consumer.

In embodiments, the methods and systems of the present disclosure include an energy marketplace platform including an energy supply pricing interface that accesses energy supply prices for multiple energy providers and an energy supply-demand feedback interface that provides consumer demand information for multiple raw energy sources. Each of the multiple energy providers is associated with at least one of the multiple raw energy sources. The platform includes a consumer energy usage calculator that collects information about energy usage of multiple types of energy from energy usage monitoring devices disposed to determine an estimate of energy usage for multiple energy consuming devices operated by multiple consumers and a consumer energy cost calculator that computes a cost of using different raw energy sources to deliver energy needed to the multiple consumers based on the estimate of energy usage. The platform includes a consumer interface that presents computed costs of using different raw energy sources for individual consumers and is configured to provide an individual consumer with the ability to select at least one of the multiple raw energy sources for multiple adjacent time intervals. The consumer demand information includes an aggregation of the individual consumer selection of at least one of the multiple raw energy sources with a plurality of other individual consumer selections of the at least one of the multiple raw energy sources.

In embodiments, the user interface is populated by data from a consumer energy marketplace through which a source of energy for allocating to at least one future discrete time interval is selectable by one of the multiple consumers.

In embodiments, the methods and systems of the present disclosure include platform for a consumer energy marketplace including a service organization interface through which the consumer energy marketplace receives at least one of energy demand information and real-time pricing information for energy delivered over an energy distribution network that supplies an energy consumer and a host interface through which the consumer energy marketplace processes delivery-related cost information for multiple consumer energy delivery offerings. The platform includes a pricing engine that combines raw energy cost and energy delivery costs for each of the multiple energy delivery offerings into a snapshot of energy pricing for an interval of time and a user interface of the platform that facilitates presenting a plurality of energy cost options for at least a portion of the multiple energy delivery offerings.

In embodiments, the plurality of energy cost options is differentiated based on a raw source of energy used to produce energy delivered over the energy distribution network.

In embodiments, the pricing engine calculates consumer prices of energy for each raw source of energy.

In embodiments, the pricing engine calculates consumer prices of energy based on an estimate of aggregated demand for energy for each raw source of energy used to produce energy delivered over the distribution network.

In embodiments, the energy cost options for a given energy delivery offering include energy costs for a plurality of raw energy sources available through the given energy delivery offering.

In embodiments, the platform includes a regulatory interface through which an energy regulatory agency exchanges regulatory-related costs for at least one of energy delivered over the network and consumer access to energy delivered over the network.

In embodiments, the pricing engine accounts for the regulatory-related costs.

In embodiments, the pricing engine combines raw energy source-specific energy pricing with raw energy source-specific distribution and regulatory costs for producing energy cost options for each different raw source of energy. In embodiments, the pricing engine calculates real-time pricing for energy based on a spot market price for a time interval. In embodiments, the pricing engine calculates pricing for energy in a forward market for energy. In embodiments, the forward market is a day-ahead market. In embodiments, the calculation from the pricing engine is based on a forward market for a specific type of a raw energy source.

In embodiments, the methods and systems of the present disclosure include a method including updating a data structure of energy price information at least once per time period for multiple raw energy source-differentiated providers of an energy-type that is configured to be available to a consumer as a source of the energy-type delivered over a consumer energy distribution network. The method includes calculating a unit cost for each of multiple consecutive time periods for consumption of a unit of the energy-type delivered over the consumer energy distribution network for each of the multiple raw energy sources and presenting the unit cost for each of the multiple raw energy sources as a time period-based time series of unit costs in a user interface.

In embodiments, the method includes displaying in a presentation unit costs for a raw energy source available to the consumer for each time period by a non-text visual element visible in the presentation. In embodiments, the user interface is configured to permit selection by the consumer of a raw energy source. In embodiments, the unit costs for a raw energy source not selected by the consumer for a given time period that has a lower unit cost than the raw energy source selected by the consumer for the given time period is presented with a visual element that indicates a savings opportunity. In embodiments, the calculating of the unit cost includes calculating a unit cost for future time periods based on forward pricing information. In embodiments, the calculating of the unit cost includes combining the energy price information with other cost information. In embodiments, the other cost information includes at least one of a regulatory cost, a delivery cost, and a platform membership cost.

In embodiments, the methods and systems of the present disclosure include receiving energy pricing information indicating current and estimated future energy costs for raw energy-use production source producing energy for an energy grid that provides energy to a consumer and presenting in a user interface for the consumer a visual element indicating the pricing information.

In embodiments, the method includes aggregating information and updating a data structure of raw energy source information at least once per time period for a plurality of raw energy source-differentiated providers of an energy-type delivered over the energy grid that provides the energy to the consumer and using the data structure to enable the visual element indicating a portion of the raw energy source information.

In embodiments, the method includes calculating a unit cost for each of the multiple consecutive time periods for consumption of a unit of an energy-type delivered over the energy grid that provides the energy to the consumer for each of the raw energy-use production sources and presenting both the unit cost and the pricing information in the user interface.

In embodiments, the method includes presenting the calculated unit cost for the consumption of the unit of the energy-type delivered as a time period-based time series in a user interface.

In embodiments, the visual element aggregates fossil fuel energy sources together. In embodiments, the visual element aggregates renewable energy sources together. In embodiments, the visual element indicates a mix among at least two of a fossil fuel source, a coal source, an oil source, a natural gas source, a nuclear source, a renewable source, a wind source, a solar source, a hydropower source, a stored energy source, a battery source, and a gravity power source. In embodiments, the method includes indicating a preferred mix of energy sources from a consumer for future consumption with an interface element.

In embodiments, the user interface is configured to provide a visual element that details a recommendation for a consumer action that is configured to result in consumption of energy during availability of the preferred mix of energy sources. In embodiments, the user interface includes a recommendation engine that operates on at least one of historical, real-time, and forward market information regarding at least one of the raw energy-use production sources and the energy pricing information for at least one of the raw energy-use production sources.

In embodiments, the methods and systems of the present disclosure include gathering capacity information from multiple energy providers for a plurality of future time intervals and gathering raw energy source information from each of the multiple energy providers. The method includes aggregating the capacity information for the multiple energy providers based on sources of raw energy that each of the multiple energy providers use and generating a report that shows the aggregated capacity and an estimate of available energy from each of the sources of raw energy by reducing the aggregated capacity for each of the sources of raw energy by an indicator of demand from consumers for energy produced from the sources of raw energy.

In embodiments, the indicator of demand is calculated by a consumer energy marketplace platform that receives a consumer selection of at least one of the sources of raw energy for a plurality of time intervals in a user interface that is configured to display the report to the consumers participating in the energy marketplace.

In embodiments, the capacity information includes estimates from at least a portion of the multiple energy providers that are based on environmental conditions.

In embodiments, the environmental conditions include at least one forecast of any of wind, sun, and rain. In embodiments, the plurality of future time intervals includes consecutive time intervals no greater than one hour of time. In embodiments, each of the time intervals from the plurality of future time intervals has the same duration. In embodiments, the gathering of capacity information includes contacting a plurality of Independent Service Organizations (ISOs) offering to provide at least one type of energy over a consumer retail energy distribution network.

In embodiments, the raw energy source information is gathered through a supplier portal of a consumer energy marketplace platform that facilitates calculating the indicator of demand.

In embodiments, the estimate of available energy for a given time interval for each source of raw energy is adjusted in real-time in response to a consumer selection of a raw energy source for the given time interval.

In embodiments, the methods and systems of the present disclosure include a user interface that presents indicators of real-time capacity, availability, and consumer-selected demand for energy produced from a raw source of energy. The real-time capacity is adjusted based on capacity information provided by a plurality of energy providers who use the raw source of energy to provide the energy. The availability is determined by subtracting a real-time aggregation of consumer demand for energy produced by the raw energy source from the real-time capacity. The consumer selected demand is adjusted in response to a consumer selecting a raw source of energy in the user interface.

In embodiments, the indicator of demand is calculated by a consumer energy marketplace platform that receives a consumer selection of at least one raw energy source for a plurality of time intervals in the user interface that facilitates displaying the report to consumers participating in the energy marketplace.

In embodiments, the capacity information includes estimates from at least a portion of the energy providers that are based on environmental conditions.

In embodiments, the environmental conditions include at least one forecast of any of wind, sun, and rain. In embodiments, the plurality of time intervals includes consecutive time intervals no greater than one hour of time. In embodiments, each of the time intervals has a similar duration. In embodiments, the gathering capacity information is done by contacting a plurality of Independent Service Organizations (ISOs) offering to provide at least one type of energy over a consumer retail energy distribution network.

In embodiments, the raw energy source information is gathered through a supplier portal of a consumer energy marketplace platform that facilitates calculating the indicator of demand. In embodiments, the estimate of available energy for a given time interval for each source of raw energy is adjusted in real-time in response to consumer selection of a raw energy source for the given time interval.

In embodiments, the methods and systems of the present disclosure include an energy-type production capacity gathering module that communicates electronically with a plurality of production capacity indicator devices disposed proximal to production facilities for a plurality of producers of the energy-type. The capacity gathering module provides the gathered energy-type specific capacity information to an energy-type availability calculator. The system includes a raw energy demand aggregation module that aggregates demand for energy produced from a raw energy-type based on selection by a plurality of users of a raw energy-type for sourcing the user's energy demand for a plurality of time intervals. The aggregation module provides the aggregated demand to the energy-type availability calculator. The system includes a raw energy-type to energy-type allocator module that determines, for each of a plurality of raw energy types a portion of the gathered energy-type capacity to allocate to each of the plurality of raw energy types. The energy-type availability calculator is configured to further calculate a portion of the gathered capacity that is available from energy producers based on the raw energy-type that they use to produce the energy-type by subtracting the aggregated raw energy demand for each type of raw energy from the portion of the energy-type allocated to each type of raw energy.

In embodiments, the energy-type is transmission line electricity and the raw energy-types include solar, wind, hydro, fossil, waste and nuclear.

In embodiments, the demand for energy is calculated by a consumer energy marketplace platform that receives consumer selection of at least one raw energy source for a plurality of time intervals in the user interface that facilitates displaying the report to consumers participating in the energy marketplace.

In embodiments, the gathered capacity information includes estimates from at least a portion of the energy providers that are based on environmental conditions.

In embodiments, the environmental conditions include at least one forecast of any of wind, sun, and rain. In embodiments, the plurality of time intervals includes consecutive time intervals no greater than one hour of time. In embodiments, each of the time intervals has the same duration. In embodiments, the system includes capacity information from multiple energy providers for a plurality of future time intervals from a plurality of Independent Service Organizations (ISOs) offering to provide at least one type of energy over a consumer retail energy distribution network.

In embodiments, the system includes a supplier portal of a consumer energy marketplace platform through which the raw energy source information is gathered. In embodiments, the methods and systems of the present disclosure include receiving energy mix information indicating the nature and proportion of the raw energy production sources producing energy for an energy grid that provides energy to a consumer and presenting in a user interface for the consumer a visual element indicating the energy mix information.

In embodiments, the method includes aggregating information and updating a data structure of raw energy source information at least once per time period for a plurality of raw energy source-differentiated providers of an energy-type delivered over a consumer energy distribution network and using the data structure to enable the visual element indicating the energy mix information.

In embodiments, the method includes calculating a unit cost for each of a plurality of consecutive time periods for consumption of a unit of the energy-type delivered over the consumer energy distribution network for each of the raw energy sources and presenting both the cost and the energy mix information in the interface.

In embodiments, the presenting of the energy mix information for the consumed energy is depicted as a time period-based time series in the user interface.

In embodiments, the visual element aggregates fossil fuel energy sources together. In embodiments, the visual element aggregates renewable energy sources together. In embodiments, the visual element indicates a mix among at least two of a fossil fuel source, a coal source, an oil source, a natural gas source, a nuclear source, a renewable source, a wind source, a solar source, a hydropower source, a stored energy source, a battery source, and a gravity power source. In embodiments, the method includes an interface element by which a consumer may indicate a preferred mix of energy sources for future consumption.

In embodiments, the method includes an interface element by which a user interface element provides a recommendation for a consumer action that is configured to result in the preferred mix. In embodiments, the interface element is produced using a recommendation engine that operates on at least one of historical, real-time, and forward market information regarding at least one of energy production and energy price for at least one of a plurality of raw energy sources.

In embodiments, the methods and systems of the present disclosure include gathering prices for energy provided over a consumer energy distribution network from providers who use different sources of raw energy to produce the energy provided over the consumer energy distribution network. Prices cover a plurality of future time intervals for which the providers indicate providing energy over the consumer energy distribution network. The method includes calculating projected cost based one or more of the gathered prices for each of a plurality of consumers consuming energy over the consumer energy distribution network automatically notifying consumers, by transmission of a signal to a mobile device of each of the consumers who have requested notification, when the calculation of projected costs results in a cost savings opportunity. The automatically notifying consumers is in response to the consumer at least one of selecting a different raw energy source and selecting a mix of raw energy sources for one or more of the future time intervals.

In embodiments, the providers indicate providing energy over the consumer energy distribution network based on an estimate of demand for energy sourced from the type of raw energy source used by the providers. The estimate of demand is calculated based on consumer demand indicated by a consumer energy marketplace through which a source of raw energy for allocating to at least one future discrete time interval is selectable by the consumer.

In embodiments, the raw energy sources are among at least two of a fossil fuel source, a coal source, an oil source, a natural gas source, a nuclear source, a renewable source, a wind source, a solar source, a hydropower source, a stored energy source, a battery source, and a gravity power source.

In embodiments, the calculating of the projected cost includes calculating for a plurality of the future time intervals a cost for the energy and transmission related costs for each of a plurality of raw energy sources.

In embodiments, the methods and systems of the present disclosure include tracking prices of a consumer accessible energy-type produced by different energy producers by accessing real-time energy pricing information for each of the different energy producers through an energy supply information interface of a retail consumer energy marketplace platform and setting price notification thresholds for consumer notification for a plurality of raw energy sources. Each of the different energy producers is associated with at least one raw energy source. The method includes in response to a tracked price crossing the price notification threshold, sending a price alert communication signal from the platform to a consumer device that activates a user interface function of the consumer device through which the consumer is enabled to select one of a plurality of raw energy sources that results in increasing an allocation of demand for the energy-type for an energy producer associated with the selected raw energy source.

In embodiments, an increase in allocation is proportional to an estimate of energy usage by the consumer of the energy-type.

In embodiments, the raw energy sources are among at least two of a fossil fuel source, a coal source, an oil source, a natural gas source, a nuclear source, a renewable source, a wind source, a solar source, a hydropower source, a stored energy source, a battery source, and a gravity power source.

In embodiments, the methods and systems of the present disclosure include estimating a demand for a raw energy-specific consumer energy-type by calculating energy usage for consumers who have indicated a desire to consume energy produced from a specific raw energy type who are consuming energy produced from a different raw energy type and submitting the demand estimate to an energy supplier. The method includes receiving back a revised price for energy produced from the specific raw energy type and based on a comparison of the revised price to a price notification threshold associated with the specific raw energy type, alerting consumers who are consuming energy produced from a different raw energy type of the opportunity to switch to the specific raw energy type.

In embodiments, the method includes alerting the consumers who are consuming energy produced by the specific raw energy type of a change in the price of energy produced from the specific raw energy type.

In embodiments, the raw energy types are among at least two of a fossil fuel source, a coal source, an oil source, a natural gas source, a nuclear source, a renewable source, a wind source, a solar source, a hydropower source, a stored energy source, a battery source, and a gravity power source.

In embodiments, the estimating a demand for a raw energy-specific consumer energy-type includes determining factors that impact the demand, gathering measures of the factors from a plurality of sources, and applying the measures to an energy consumption model that estimates energy demand based on the factors.

In embodiments, the methods and systems of the present disclosure include a gamification engine of a consumer energy marketplace platform. The gamification engine includes an interface for receiving data representing energy usage for a plurality of consumers. The data is captured at individual energy usage meters and delivered to a server of the platform executing an instance of the gamification engine. The gamification engine includes a criterion setting module that establishes at least one criterion for meeting an energy usage objective and a gamification user interface executing on mobile devices of consumers associated with the individual energy usage meters the gamification user interface presenting at least one game element configured to induce a type of energy consumption-related behavior by at least one of the plurality of consumers that satisfies the established criterion.

In embodiments, the gamification engine includes a consumer interface module that communicates the at least one criterion from the server to the gamification user interface. The gamification user interface presents scenarios for meeting the energy usage objective by facilitating consumer selection of at least one of an energy source for an energy-type being captured by an energy usage meter associated with the consumer and energy demand for at least one device consuming the energy-type being captured by the energy usage meter.

In embodiments, the gamification user interface presents a challenge-based game element to a user. In embodiments, the gamification user interface presents a leaderboard on which a position of the consumer is indicated relative to other consumers. In embodiments, the leaderboard is based on an accumulation of points earned by the consumer through interaction with the gamification user interface. In embodiments, the leaderboard is based on a degree to which the consumer has satisfied the established criterion. In embodiments, the leaderboard is based on at least one of the amount, the cost and the raw energy source type of the energy consumed by the consumer. In embodiments, the leaderboard calculates a position for the consumer based on minimizing consumption of energy from fossil fuel sources. In embodiments, the leaderboard calculates a position for the consumer based on minimizing the amount of energy consumed. In embodiments, the leaderboard calculates a position for the consumer based on an amount of energy returned to the grid by energy production sources under control of the consumer. In embodiments, the energy production sources are renewable sources selected from among solar, wind power and hydropower resources.

In embodiments, the leaderboard calculates a position for the consumer based on the cost of energy consumed by the consumer. In embodiments, the leaderboard calculates a position for the consumer based on a filter that displays the consumer's position relative to similar consumers. In embodiments, the filter is at least one filter selected from the group consisting of an age filter, a property size filter, a property pride filter, a gender filter, an income bracket filter, a grid location filter, a geographic location filter, and a demographic filter.

In embodiments, the position for the consumer relative to similar consumers is based on at least one of demographic attributes of the consumers, geographic attributes of the consumers, grid attributes of energy grids providing energy to the consumers, weather conditions experienced by the consumers, facility types for facilities of the consumers, energy mix information for energy provided to the consumers and energy price information for energy provided to the consumers.

In embodiments, the position for the consumer relative to similar consumers is determined by a similarity model that applies weights to aspects of similarity to calculate similarity.

In embodiments, the position for the consumer relative to similar consumers is determined by collaborative filtering of attributes of consumers.

In embodiments, the position for the consumer relative to similar consumers is based on tracked user behavior.

In embodiments, the position for the consumer relative to similar consumers is based on a distance to other users in a cluster diagram that configures a node from multiple nodes for each user that represents weighted attributes of the user and that facilitates determining a distance between nodes.

In embodiments, the multiple nodes that are closer together represent similar users.

In embodiments, the gamification user interface is improved using machine learning based on feedback regarding the influence on at least one element of the gamification user interface on the behavior of a consumer.

In embodiments, the behavior of the consumer is within the gamification user interface. In embodiments, the behavior of the consumer is energy consumption behavior. In embodiments, the behavior of the consumer is a change in the energy mix consumed by the consumer.

In embodiments, the behavior of the consumer is a change in the amount of energy consumed by the consumer. In embodiments, the gamification user interface presents a challenge-based game element to a user.

In embodiments, the challenge-based game tracks points awarded to the user. In embodiments, the points awarded to a user are visible in a leaderboard presented in the gamification user interface the leaderboard indicates a position of a user relative to other users. In embodiments, the points awarded to a user are used to offset energy costs of the user. In embodiments, the points awarded to a user are raw energy type dependent.

In embodiments, the points awarded to a user are used to offset energy costs for receiving energy over a consumer energy distribution network, the received energy being produced from the raw energy type that the points are dependent upon.

In embodiments, the gamification user interface presents an extreme challenge-based game element to a user that uses a criterion of energy consumption of no more than a predetermined median energy consumption for the user's region.

In embodiments, the user's region is a neighborhood. In embodiments, the user's region is one of a town, a city, a village, and an unincorporated region of a county. In embodiments, the user's region is a postal code. In embodiments, the user's region is a county or a parish. In embodiments, the user's region is a state or a commonwealth. In embodiments, the user's region is a multi-state region. In embodiments, the user's region is a utility grid location.

In embodiments, the gamification user interface presents an extreme challenge-based game element to a user that uses a criterion of energy consumption of no more than a predetermined median energy consumption for similar users.

In embodiments, the similar users are filtered by at least one filter selected from the group consisting of an age filter, a property size filter, a property pride filter, a gender filter, an income bracket filter, a grid location filter, a geographic location filter, and a demographic filter.

In embodiments, the similar users are determined based on at least one of demographic attributes of the users, geographic attributes of the users, grid attributes of energy grids providing energy to the users, weather conditions experienced by the users, facility types for facilities of the users, energy mix information for energy provided to the users and energy price information for energy provided to the users.

In embodiments, the gamification user interface presents an extreme challenge-based game element to a user that uses a criterion of an amount of energy returned to a grid by energy production sources under control of the user of at least a predetermined value that is greater than a median amount of energy returned to the grid by energy production sources under control of users in the user's region.

In embodiments, the user's region is a neighborhood.

In embodiments, the user's region is one of a town, a city, a village, and an unincorporated region of a county. In embodiments, the user's region is a postal code. In embodiments, the user's region is a county or a parish. In embodiments, the user's region is a state or a commonwealth. In embodiments, the user's region is a multi-state region. In embodiments, the user's region is a utility grid location.

In embodiments, the gamification user interface presents an extreme challenge-based game element to a user that uses a criterion of an amount of energy returned to the grid by energy production sources under control of the user of at least a predetermined value greater than a median amount of energy returned to the grid by energy production sources under control of users for similar users.

In embodiments, the similar users are filtered by at least one filter selected from the group consisting of an age filter, a property size filter, a property pride filter, a gender filter, an income bracket filter, a grid location filter, a geographic location filter, and a demographic filter.

In embodiments, the similar users are determined based on at least one of demographic attributes of the users, geographic attributes of the users, grid attributes of energy grids providing energy to the users, weather conditions experienced by the users, facility types for facilities of the users, energy mix information for energy provided to the users and energy price information for energy provided to the users.

In embodiments, the extreme challenge-based game element facilitates access to a hypermiling-like challenge for consumption of energy from a consumer energy distribution network.

In embodiments, the gamification user interface presents a leaderboard on which a position of the consumer is indicated relative to other consumers. In embodiments, the leaderboard is based on consumption of energy over a consumer energy distribution network that is sourced from a mix of raw energy sources. In embodiments, the leaderboard is based on consumption of energy for heating. In embodiments, the leaderboard is based on consumption of energy for cooling. In embodiments, the leaderboard is based on consumption of energy for producing hot water.

In embodiments, the leaderboard is based on consumption of energy for operating at least one household appliance.

In embodiments, the at least one household appliance is selected from a group consisting of a refrigerator, an oven, a stovetop, a microwave, a beverage cooler, a freezer, lighting, baseboard heat, heated towel bar, subfloor heat, a computer, a printer, an air circulating fan, a musical instrument, a garbage disposal, an electric blanket, a toaster oven, a battery charger, a television, networking electronics, space heater, power tool, food mixer, blender, hair dryer and electric toothbrush.

In embodiments, the gamification user interface facilitates presents a location-based game element to the user.

In embodiments, the location-based game element facilitates multi-user game play.

In embodiments, the location-based game element groups users into geographic areas for participation in a game.

In embodiments, the location-based game element facilitates users in a first geographic area competing with users in a second geographic area.

In embodiments, the gamification user interface presents a quiz-based game element to the user.

In embodiments, the quiz-based game element requires submitting a reply in real time.

In embodiments, the quiz-based game element presents different quiz questions to different users based on the different users' energy consumption.

In embodiments, the quiz-based game element presents questions that pertain to a raw energy source used to produce energy consumed by the user over a consumer energy distribution network.

In embodiments, the quiz-based game element presents questions that influence user energy-use related behavior.

In embodiments, the quiz-based game element presents time-based questions.

In embodiments, the gamification user interface facilitates awarding users for satisfying the established criteria with a plurality of types of rewards.

In embodiments, the types of rewards are based on production capacity of at least one type of energy that is delivered over a consumer energy distribution network.

In embodiments, the types of rewards are based on a mix of raw energy sources used to produce energy consumed by the user over a consumer energy distribution network.

In embodiments, the methods and systems of the present disclosure include networked production probes configured to capture production data from a plurality of energy providers and networked consumption probes configured to capture consumption data from a plurality of consumers of energy from a consumer energy distribution network. The system includes a machine learning engine configured to receive and analyze the production data and the consumption data to detect patterns, including patterns of consumer and producer behavior. The machine learning output is used by an energy retail marketplace platform prediction engine to improve prediction of consumer and producer behavior.

In embodiments, the patterns of user behavior include patterns of consumption based on a time of day. In embodiments, the patterns of user behavior include patterns of consumption based on a day of a week. In embodiments, the patterns of user behavior include patterns of consumption based on a season. In embodiments, the patterns of user behavior include patterns of consumption based on weather. In embodiments, the patterns of user behavior include regional consumption patterns. In embodiments, the patterns of user behavior include patterns of consumption based on consumer energy source selection patterns.

In embodiments, the patterns of user behavior include patterns of consumption based on energy pricing differences. In embodiments, the patterns of user behavior include patterns of responsiveness to pricing alerts or other messages. In embodiments, the patterns of user behavior include consumer generated energy usage patterns. In embodiments, the consumer generated energy usage patterns include energy generated from solar energy. In embodiments, the patterns of user behavior include consumer generated energy sell-back patterns.

In embodiments, the patterns of producer behavior include allocation of energy demand to providers who use different raw energy sources. In embodiments, the allocation of energy demand is based on relative price of energy from different raw energy sources. In embodiments, the allocation of energy demand is based on availability of energy from the different raw energy sources. In embodiments, the patterns of user behavior include gamification patterns detected from consumer interactions with an energy distribution network gamification engine.

In embodiments, the gamification patterns include patterns of rewards provided to gamification engine users.

In embodiments, the machine learning engine facilitates prediction of energy price patterns. In embodiments, the machine learning engine facilitates detection of patterns for different raw energy sources for a given energy grid type. In embodiments, the given energy grid type is electricity.

In embodiments, the machine learning engine facilitates improving prediction of the impact of factors on energy price. In embodiments, the prediction of factors that have an impact on energy price includes a supply of energy. In embodiments, the prediction of factors that have an impact on energy price includes a prediction of impact of weather. In embodiments, the prediction of impact of weather is based on an outdoor temperature. In embodiments, the prediction of impact of weather is based on hours of daily sun. In embodiments, the prediction of factors that have an impact on energy price includes current and near-term usage.

In embodiments, the prediction of factors that have an impact on energy price includes current and near-term demand.

In embodiments, the prediction of factors that have an impact on energy price includes current and historical usage.

In embodiments, the prediction of factors that have an impact on energy price includes current and historical usage.

In embodiments, the patterns include maintenance patterns.

In embodiments, the machine learning engine facilitates improvement of maintenance patterns.

In embodiments, the machine learning engine facilitates classification of consumption patterns and states. In embodiments, the machine learning engine facilitates classification of production patterns and states. In embodiments, the machine learning engine facilitates classification of location state. In embodiments, the machine learning engine facilitates user classification.

In embodiments, the machine learning engine facilitates classification of user price-sensitivity. In embodiments, the machine learning engine facilitates classification of user preference states for energy mix. In embodiments, the machine learning engine facilitates classification of user preference states for comfort. In embodiments, the machine learning engine facilitates classification of a similarity of users. In embodiments, the machine learning engine facilitates classification of a similarity of homes. In embodiments, the machine learning engine facilitates classification of a similarity of regional energy mixes. In embodiments, the machine learning engine facilitates classification of a similarity of weather. In embodiments, the machine learning engine facilitates classification of a similarity of prices. In embodiments, the machine learning engine uses a model type classifier performs classification based on similarity calculated with weights on attributes of patterns.

In embodiments, the machine learning engine uses a model type classifier that facilitates detection and classification of similar users in similar homes experiencing similar weather with similar energy prices and energy mix. In embodiments, the machine learning engine uses a hybrid of model type and neural network type classifiers.

In embodiments, the machine learning engine uses a neural network is used to adjust presence of elements and/or weights on a model to improve the model.

In embodiments, the machine learning engine uses a hybrid of cluster type and neural network type classifiers.

In embodiments, the machine learning engine uses a neural network to adjust weights of clustering to arrive at better clusters.

In embodiments, the machine learning engine is used to improve prediction of a preferred mix of raw energy sources.

In embodiments, the machine learning engine is used to improve prediction of consumption behavior.

In embodiments, the machine learning engine is used to improve prediction of reaction to prices.

In embodiments, the machine learning engine is used to improve prediction of reaction to interface elements in a user interface of a retain consumer energy marketplace.

In embodiments, the user interface is a gamification user interface. In embodiments, the reaction is a reaction to gaming elements. In embodiments, the machine learning engine is used to improve prediction of location of energy consumption. In embodiments, the machine learning engine is used to improve prediction of a type of energy consumption. In embodiments, the machine learning engine is used to improve classification of patterns and further used to improve making a prediction based at least in part on the improved classification of patterns.

In embodiments, the methods and systems of the present disclosure include a gamification engine of a consumer energy marketplace platform. The platform includes an interface for receiving data representing energy usage for a plurality of consumers. The data is captured at individual energy usage meters and delivered to a server of the platform executing an instance of the gamification engine. The platform includes a criterion setting module that establishes at least one criterion for meeting an energy usage objective and a gamification user interface executing on mobile devices of consumers and operating on at least one data structure associated with each of the individual energy usage meters of the consumers. The platform includes a consumer interface module that communicates the criterion from the server to the gamification user interface. The gamification user interface presents scenarios for meeting the energy usage objective by facilitating at least one of consumer selection of at least one energy-type, consumer alteration of the amount of energy consumed, and consumer alteration of the time at which energy is consumed. The platform includes a machine learning feedback engine that feeds an output of machine learning of consumer responses to the presented scenarios into the criterion setting module, such that adjusts at least one of the criterion and the gamification user interface to improve at least one measure indicating success of the gamification engine in meeting the energy usage objective.

In embodiments, data representing energy usage for a plurality of consumers is based on time-interval information about the sources of energy used to power a grid used by a consumer.

In embodiments, the machine learning feedback engine feeds an output of machine learning of consumer responses to the presented scenarios into a pricing module of the platform that adjusts a pricing aspect of the criteria so that a measure of meeting the energy usage objective increases.

In embodiments, the machine learning feedback engine feeds an output of machine learning of consumer responses to the presented scenarios into an energy producer allocation module of the platform that facilitates adjusting an allocation of energy from a plurality of energy providers that use different raw energy sources so that a measure of meeting the energy usage objective increases.

In embodiments, the machine learning feedback engine applies A/B testing to facilitate adjusting at least one of the criterion and the gamification user interface to improve at least one measure indicating success of the gamification engine in meeting the energy usage objective.

In embodiments, the machine learning feedback engine applies genetic programming to facilitate adjusting at least one of the criterion and the gamification user interface to improve at least one measure indicating success of the gamification engine in meeting the energy usage objective.

In embodiments, the machine learning feedback engine uses a user behavior model to facilitate adjusting at least one of the criterion and the gamification user interface to improve at least one measure indicating success of the gamification engine in meeting the energy usage objective.

In embodiments, the user behavior model includes multi-home behavior.

In embodiments, the machine learning feedback engine uses a deep learning to facilitate adjusting at least one of the criterion and the gamification user interface to improve at least one measure indicating success of the gamification engine in meeting the energy usage objective.

In embodiments, the machine learning feedback engine uses a hybrid of deep learning to facilitate adjusting at least one of the criterion and the gamification user interface to improve at least one measure indicating success of the gamification engine in meeting the energy usage objective.

In embodiments, the machine learning feedback engine uses a neural net to facilitate adjusting at least one of the criterion and the gamification user interface to improve at least one measure indicating success of the gamification engine in meeting the energy usage objective.

In embodiments, the machine learning feedback engine applies a set of predictors to facilitate adjusting at least one of the criterion and the gamification user interface to improve at least one measure indicating success of the gamification engine in meeting the energy usage objective.

In embodiments, the applying the set of predictors includes role-based prediction.

In embodiments, the applying the set of predictors includes a model-based prediction.

In embodiments, the applying the set of predictors a neural network-based prediction.

In embodiments, the platform includes a classification module that classifies consumer responses to the presented scenarios into classes that facilitate adjusting at least one of the criterion and the gamification user interface to improve at least one measure indicating success of the gamification engine in meeting the energy usage objective.

In embodiments, the consumer responses include at least one image of a consumer performing an action.

In embodiments, the classification module employs vision-based classification of elements indicated in the at least one image.

In embodiments, the vision-based classification includes machine recognition of an element in the at least one image.

In embodiments, the vision-based classification includes machine recognition of an energy consuming device in the at least one image.

In embodiments, the vision-based classification includes machine recognition of the user taking an action with respect to an energy consuming device in the at least one image.

In embodiments, the action with respect to an energy consuming device includes controlling the device to adjust an amount of energy consumed by the device.

In embodiments, the classification module employs signal-based classification.

In embodiments, the output of the machine learning of consumer responses includes user behaviors influenced by a visual experience of the gamification user interface.

In embodiments, the output of the machine learning of the consumer responses includes user behaviors responsive to locations of user interface elements in the gamification user interface.

In embodiments, the output of the machine learning of consumer responses includes user behaviors responsive to information presented in the gamification user interface.

In embodiments, the output of the machine learning of the consumer response includes user reactions to gamification elements.

In embodiments, the machine learning feedback engine facilitates determining what quiz questions influence user behavior more than other quiz questions.

In embodiments, the machine learning feedback engine facilitates determining what rewards are most effective.

In embodiments, the machine learning feedback engine facilitates determining what mix of rewards are most effective.

In embodiments, the output of machine learning of consumer response includes user behaviors responsive to energy pricing in the gamification user interface.

In embodiments, the energy pricing includes at least two of current pricing, forward market pricing, and forecast pricing.

In embodiments, the output of machine learning of consumer response includes user behaviors responsive to the raw energy mix in the gamification user interface.

In embodiments, the raw energy mix includes current mix and forecast mix.

In embodiments, the machine learning feedback engine feeds an output of machine learning of information external to the mobile device contemporaneously with the user interacting with the gamification user interface.

In embodiments, the machine learning of information external to the mobile device includes device location information.

In embodiments, the device location information includes a geographic location of the device, a proximity to a home of the user operating the mobile device.

In embodiments, the machine learning of information external to the mobile device includes device location and energy consumption state of the user's home.

In embodiments, the machine learning of information external to the mobile device includes detection of the device being in proximity to the user's home.

In embodiments, the detection of the device being proximity to the user's home includes detection of the device connected to the user's home wireless network.

In embodiments, the machine learning of consumer responses facilitates influencing user consumption behavior of energy consumed for heating a home.

In embodiments, the machine learning of consumer response facilitates influencing user consumption behavior of energy consumed for cooling a home.

In embodiments, the machine learning of consumer response facilitates influencing user consumption behavior of energy consumed for a major appliance in the home.

In embodiments, the machine learning of consumer response facilitates influencing user consumption behavior of time shifting energy consumption.

In embodiments, the machine learning of consumer response facilitates influencing user consumption behavior of energy mix.

In embodiments, the machine learning of consumer response facilitates influencing user consumption behavior of off-grid energy consumption.

In embodiments, the off-grid energy consumption includes operating an electric car.

In embodiments, the machine learning of consumer response facilitates influencing user consumption behavior for multi-home energy consumption.

In embodiments, the user consumption behavior includes energy efficiency measures of one home relative to another home.

In embodiments, the user consumption behavior includes seasonal energy consumption.

In embodiments, the user consumption behavior includes user consumption of each of the multi-homes based on which home the user is occupying when responding in the gamification user interface.

In embodiments, the machine learning of consumer response facilitates influencing user production of behavior. In embodiments, the energy usage objective is a user energy production objective.

In embodiments, the output of the machine learning of the consumer responses in the gamification facilitates adjusting at least one of the criterion and the gamification user interface to improve at least one measure indicating success of the gamification engine in meeting the user energy production objective.

In embodiments, the user energy production objective is a storage objective.

In embodiments, the user energy production objective is a timing of storage objective. In embodiments, the user energy production objective is use of renewable energy for production of energy.

In embodiments, the user energy production objective is return of energy produced from a renewable energy source to a consumer energy distribution network. In embodiments, the user energy production objective is returning greater amounts of user produced energy to the consumer energy distribution network by refraining from energy consumption.

In embodiments, the refraining from energy consumption objective is based on time-interval of consumption of energy.

In embodiments, the methods and systems of the present disclosure include a gamification engine of a consumer energy marketplace platform. The gamification engine includes a consumer behavior model that facilitates an operator of the marketplace to react to and predict consumer behavior and a gamification user interface executing on mobile devices of consumers and operating on at least one data structure associated with individual energy usage meters of the consumers. The gamification engine includes a gamification user interface that presents scenarios for meeting the energy usage objective and receives consumer responses thereto and a machine learning feedback engine that feeds an output of machine learning of consumer response to the presented scenarios into the consumer behavior model, such that the consumer behavior model is improved in predicting consumer behavior based on the criterion.

In embodiments, the consumer behavior model is populated with data about various attributes of a consumer, behavioral attributes, consumer sentiment attributes, and attributes of consumer reaction to presented scenarios.

In embodiments, the consumer behavior model includes rules that facilitate predicting consumer attributes based at least in part on consumer attributes present in the model.

In embodiments, the methods and systems of the present disclosure include a platform for an automated consumer retail utility marketplace. The platform includes a data repository for handling data from a plurality of data sources that characterize the sources of production of energy for an energy grid during a given period of time and the wholesale energy prices charged by the sources of production and a demand management engine for managing demand by consumers for energy. The platform includes a machine learning engine for automating at least one component of the platform and at least one interface by which a consumer is provided visibility in real-time to the price of energy and the mix of energy production sources at a given time.

In embodiments, the platform includes a gamification engine for presenting an interface to a consumer that enables a game that promotes consumer behavior relating to energy usage.

In embodiments, the platform includes components of the platform configured for supporting a related consumer mobile application that provides the visibility to the consumer via the consumer's mobile device.

In embodiments, the methods and systems of the present disclosure include a platform for an automated consumer retail utility marketplace. The platform includes a data repository of data from a plurality of data sources. The data characterizing sources of production of energy for an energy grid during a predetermined time interval and energy prices charged by the sources of production of energy. The platform includes a demand management engine for managing demand by consumers for energy from the sources of production of the energy and a machine learning engine for automating at least one component of the platform. The platform includes at least one interface by which a consumer is provided visibility in real-time to the energy prices and a mix of the sources of production of the energy during the predetermined time interval.

In embodiments, the platform includes a gamification engine for presenting an interface to a consumer that enables a game that promotes consumer behavior relating to energy usage.

In embodiments, the at least one interface is configured to support a consumer mobile application that provides the visibility to the consumer via the consumer mobile device.

In embodiments, the platform includes an energy device inventory interface configured to provide visibility to a consumer into connected energy devices, the interface including at least one of: features to add, remove, label, and organize energy devices; and features to track and report device characteristics and data from device sensors. The data from the sensors includes information for at least one of energy consumption, energy generation, ambient temperature, humidity level, and ambient noise level.

In embodiments, the platform includes a device management system to control the storage, consumption, generation, and/or delivery of energy by devices.

In embodiments, the at least one interface is configured to facilitate segregation of customers, usage, and costs by multiple parties of the energy grid. The multiple parties include at least one of operating parties and retail energy providers. The multiple parties are associated with one or more electricity servicing regions of the grid.

In embodiments, the platform includes a forecasting engine that predicts at least one of periods of high and low prices; future energy consumption in-aggregate and per connected device; total cost in-aggregate and per connected device; and distribution of fuel types by energy sources.

In embodiments, the platform includes a non-transitory computer-readable medium including computer-readable instructions recorded thereon for: receiving, at a computing system, energy consumption and generation data from a plurality of network-connected devices; processing, with the computing system, the data received from the plurality of network-connected devices; and generating, with the computing system, a green score based on the processed data.

In embodiments, the at least one interface is configured to perform daily billing to an end customer of at least one of the following cost components: pro-rated monthly membership fee; energy generation charges; recurring energy transmission charges; and recurring energy delivery charges.

In embodiments, the at least one interface is configured to perform daily billing adjustments to an end customer of at least one of the following cost components: a pro-rated monthly membership fee; energy generation charges; ancillary service charges; energy transmission charges; energy delivery charges; and non-recurring charges related to energy transmission and delivery.

In embodiments, the platform includes an energy consumption and generation optimization algorithm for determining at any given time period of time which sources of generation to use and which sources of consumption to fulfill.

In embodiments, the sources of production include a mains electrical grid, photovoltaics, and hydroelectric. Sources of energy storage include mechanical, electrical, biological, electrochemical, and thermal storage.

In embodiments, the at least one of the data sources includes energy usage information based on data sourced from each of the following: an independent service organization; a transmission/distribution service provider; an energy provider; sensors embedded within an electronic device; external sensors attached to at least one of an electronic device, an electrical circuit, and a meter; and a third-party system that receives data from any of the sources above.

In embodiments, the at least one interface is configured to receive and process compressed and encrypted energy usage information.

In embodiments, the machine learning engine includes an algorithm for matching usage information with individual meters and matching individual meters with customers and billing accounts.

In embodiments, the at least one interface is configured to facilitate integration of the platform with regulated utility markets.

In embodiments, the at least one interface is configured to analyze tariff structures available within a given regulated utility market and the energy consumption and generation information to make a recommendation on a lowest-cost tariff structure.

In embodiments, the methods and systems of the present disclosure include a platform for managing Electronic Vehicles (EV). The platform includes a machine learning engine that automatically gathers and analyzes information about driving habits and patterns and based on the analysis makes recommendations for at least one of when to charge and the EV; when to consume energy for the home from the EV battery; and when to deliver energy to the grid from the EV.

In embodiments, the methods and systems of the present disclosure include a platform for data management, insights, and analytics, associated with energy provided over a consumer energy distribution network. The platform includes a repository for storing and retrieving information and a machine learning engine for analyzing datasets and producing recommendations about correlations and insights within a predetermined dataset and between the datasets.

In embodiments, the machine learning engine is configured to look for patterns and correlations within at least one of the predetermined datasets and between the datasets.

In embodiments, the platform includes a recommendation engine that is configured to automatically identify activities that one of reduce cost and increase consumption of energy from renewable energy sources.

In embodiments, the methods and systems of the present disclosure include a platform for a consumer to manage energy. The platform includes consumer energy usage measurements that are gathered for energy generated from a plurality of different types of energy sources and consumed by the consumer over discrete time intervals and that are allocated for each of the different types of energy consumed to an energy source for each type of the different types of energy within the discrete time intervals. The platform includes a cost of energy usage for each type of the different types of energy consumed in the discrete time intervals that is calculated by processing the consumer energy usage measurements for each type of energy consumed and the energy source for each type of the different types of energy with an energy pricing engine that tracks real-time cost of energy sourced from the plurality of different types of energy sources. The platform also includes a user interface that aggregates the calculated cost of energy usage across each type of the different types of energy for each time interval and presents the aggregated calculated cost of energy usage and calculated costs of at least two sources of energy for each discrete time interval in a user interface.

In embodiments, the user interface is populated by data from a consumer energy marketplace through which a source of energy for allocating to at least one future discrete time interval is selectable by the consumer.

In embodiments, the at least one of the at least two sources of energy is a fossil fuel.

In embodiments, the at least one other source of energy tracked by the energy pricing engine is a different fossil fuel.

In embodiments, the at least one of the sources of energy is a renewable energy source relative to the plurality of different types of energy sources.

In embodiments, the at least one other source of energy tracked by the energy pricing engine is a fossil fuel source.

In embodiments, the plurality of different types of energy sources includes at least one source of energy is one of fossil fuel, renewable fuel, and nuclear fuel.

In embodiments, the energy pricing engine calculates costs of at least two sources of energy based on a consumer type of the consumer. The presented calculated costs of the at least two other sources of energy are based on consumption costs by the consumer type of the consumer.

In embodiments, the consumer type is one of a retail consumer, a business consumer, an industrial consumer, and an energy provider.

In embodiments, the energy pricing engine calculates costs of the at least two sources of energy based on a location parameter of the consumer. The presented calculated costs of the at least two sources of energy are based on costs for the energy in a geographic region indicated by the location parameter.

In embodiments, the location parameter specifies a postal code. In embodiments, the location parameter specifies one of a county, a parish, a prefecture, an arrondissement, and a canton. In embodiments, the location parameter specifies one of a state, a commonwealth, a province, a territory, a municipality, and a community. In embodiments, the location parameter specifies one of a local geographic region, a multi-state region, a community region, and an administrative district.

In embodiments, the energy pricing engine calculates costs of the at least two sources of energy based on available energy sources associated with a location parameter of the consumer. The presented calculated costs of the at least two sources of energy are for sources of the energy for a geographic region indicated by the location parameter.

In embodiments, the energy pricing engine calculates costs of the at least two sources of energy based on a target total consumption of energy from the at least two sources of energy. The presented calculated costs of the at least two sources of energy are normalized for the target total consumption.

In embodiments, the target total consumption of energy is aligned with an actual total consumption of the energy from at least one source of energy from the plurality of different types of energy sources and for each discrete time interval presented in the user interface.

In embodiments, the methods and systems of the present disclosure include a platform to manage energy at a facility. The platform includes at least one meter at the facility that measures energy consumption for the facility, that records energy consumption for adjacent time intervals, and that determines an energy consumption context for at least one of the adjacent time intervals for each of multiple energy consuming devices in the facility. The energy consumption context includes at least one of multiple factors that indicate a profile energy consumption for the energy consuming devices. The platform includes a user interface that communicates with the at least one meter and that applies the energy consumption context to energy usage models for the energy consuming devices. The energy usage models produce an estimate of energy consumption for each of the energy consuming devices for the at least one of the adjacent time intervals. The user interface is configured to allocate a corresponding portion of the measured energy consumption to each of the energy consuming devices based on the estimate of energy consumption for each of the multiple energy consuming device to report the energy consumption for the facility as energy consuming device-by-device estimated consumption and a residual portion determined from an unallocated portion of the measured energy consumption for the facility.

In embodiments, the measured energy consumption for the facility is electrical energy.

In embodiments, the measured energy consumption for the facility is reported with energy cost information for the adjacent time intervals that are applicable to the measured energy consumption. In embodiments, the measured energy consumption for the facility is reported with energy source information for the adjacent time intervals that are applicable to the measured energy consumption. In embodiments, the measuring at least one of the multiple factors includes measuring energy flow into the multiple energy consuming devices. In embodiments, the measuring at least one of the multiple factors includes receiving factor measurement data over a network from a networked computing device that measures a condition associated with at least one of the multiple energy consuming devices. In embodiments, the at least one of the multiple energy consuming devices is a water heater and the condition associated with the at least one of the multiple energy consuming devices is a flow rate of water through the water heater.

In embodiments, the at least one of the multiple energy consuming devices is a water heater and the condition associated with the at least one of the multiple energy consuming devices is a temperature of water flowing into the water heater.

In embodiments, the at least one of the multiple energy consuming devices is a water heater and the condition associated with the at least one of the multiple energy consuming devices is a set temperature for the water heater.

In embodiments, the at least one of the multiple energy consuming devices is a water heater and the condition associated with the at least one of the multiple energy consuming devices is a temperature of water flowing out of the water heater.

In embodiments, the at least one of the multiple energy consuming devices is a water heater and the condition associated with the at least one of the multiple energy consuming devices is a portion of the time interval that the water heater is actively heating water in the water heater.

In embodiments, the at least one of the multiple energy consuming devices is a water heater and the condition associated with the at least one of the multiple energy consuming devices is a portion of the time interval that the water heater is consuming energy. In embodiments, the at least one of the multiple energy consuming devices is a water heater is one of tankless, storage tank-based, and on-demand.

In embodiments, the water heater has a gas heating element. In embodiments, the water heater has an electric heating element. In embodiments, the at least one of the multiple energy consuming devices is an air conditioner. In embodiments, the condition associated with the air conditioner is an outdoor temperature proximal to the air conditioner. In embodiments, the condition associated with the air conditioner is an indoor temperature proximal to the air conditioner. In embodiments, the condition associated with the air conditioner is an air filter blockage. In embodiments, the air filter blockage condition is an estimate of blockage based on an amount of time that the air conditioner circulation fan operates.

In embodiments, the at least one of the multiple energy consuming devices is a home heating system. In embodiments, the condition associated with the home heating system is an outdoor temperature proximal to the heating system. In embodiments, the condition associated with the home heating system is an indoor temperature proximal to the heating system. In embodiments, the condition associated with the home heating system is air filter blockage. In embodiments, the condition of the air filter blockage is an estimate of blockage based on an amount of time that a circulation fan operates that is associated with the heating system.

In embodiments, the consumer energy distribution network is configured to include at least one of a licensed entity, an authorized entity, and a regulated entity that facilitates delivery of energy for consumption by the consumer. In embodiments, the consumer energy distribution network is configured to include an entity who is regulated in its interaction with delivery of energy for consumption by the consumer. In embodiments, the consumer energy distribution network is configured to include an entity who is authorized by a governing entity to proceed with its interaction with delivery of energy for consumption by the consumer.

In embodiments, the consumer energy distribution network is configured to include at least one of a licensed entity, an authorized entity, and a regulated entity that facilitates delivery of energy for consumption by the consumer. In embodiments, the consumer energy distribution network is configured to include an entity who is regulated in its interaction with delivery of energy for consumption by the consumer. In embodiments, the consumer energy distribution network is configured to include an entity who is authorized by a governing entity to proceed with its interaction with delivery of energy for consumption by the consumer.

In embodiments, the meter at the facility is associated with at least one of a licensed entity, an authorized entity, and a regulated entity that facilitates delivery of energy for consumption by the consumer. In embodiments, the meter at the facility is associated with an entity who is regulated in its interaction with delivery of energy for consumption by the consumer. In embodiments, the meter at the facility is associated with an entity who is authorized by a governing entity to proceed with its interaction with delivery of energy for consumption by the consumer.

In embodiments, the consumer energy marketplace platform is configured to include at least one of a licensed entity, an authorized entity, and a regulated entity that facilitates delivery of energy for consumption by the consumer. In embodiments, the consumer energy marketplace platform is configured to include an entity who is regulated in its interaction with delivery of energy for consumption by the consumer. In embodiments, the consumer energy marketplace platform is configured to include an entity who is authorized by a governing entity to proceed with its interaction with delivery of energy for consumption by the consumer.

In embodiments, the energy distribution network is configured to include at least one of a licensed entity, an authorized entity, and a regulated entity that facilitates delivery of energy for consumption by the consumer. In embodiments, the energy distribution network is configured to include an entity who is regulated in its interaction with delivery of energy for consumption by the consumer. In embodiments, the energy distribution network is configured to include an entity who is authorized by a governing entity to proceed with its interaction with delivery of energy for consumption by the consumer.

In embodiments, the consumer energy distribution network is configured to include at least one of a licensed entity, an authorized entity, and a regulated entity that facilitates delivery of energy for consumption by the consumer. In embodiments, the consumer energy distribution network is configured to include an entity who is regulated in its interaction with delivery of energy for consumption by the consumer. In embodiments, the consumer energy distribution network is configured to include an entity who is authorized by a governing entity to proceed with its interaction with delivery of energy for consumption by the consumer.

In embodiments, the consumer energy distribution network is configured to include at least one of a licensed entity, an authorized entity, and a regulated entity that facilitates delivery of energy for consumption by the consumer. In embodiments, the consumer energy distribution network is configured to include an entity who is regulated in its interaction with delivery of energy for consumption by the consumer. In embodiments, the consumer energy distribution network is configured to include an entity who is authorized by a governing entity to proceed with its interaction with delivery of energy for consumption by the consumer.

In embodiments, the consumer energy distribution network is configured to include at least one of a licensed entity, an authorized entity, and a regulated entity that facilitates delivery of energy for consumption by the consumer. In embodiments, the consumer energy distribution network is configured to include an entity who is regulated in its interaction with delivery of energy for consumption by the consumer. In embodiments, the consumer energy distribution network is configured to include an entity who is authorized by a governing entity to proceed with its interaction with delivery of energy for consumption by the consumer.

In embodiments, the at least one meter at the facility is associated with at least one of a licensed entity, an authorized entity, and a regulated entity that facilitates delivery of energy for consumption by the consumer. In embodiments, the at least one meter at the facility is associated with an entity who is regulated in its interaction with delivery of energy for consumption by the consumer. In embodiments, the at least one meter at the facility is associated with an entity who is authorized by a governing entity to proceed with its interaction with delivery of energy for consumption by the consumer.

BRIEF DESCRIPTION OF THE FIGURES

FIG. 1A and FIG. 1B are schematic diagrams showing embodiments of the components of an automated retail utility marketplace platform and interactions among the components in accordance with the present disclosure.

FIG. 24 depicts a diagrammatic view of a user interface of the mobile application providing different energy consumption allocations in accordance with the present disclosure.

FIG. 35 depicts a flowchart providing aggregation of energy supply and demand information in accordance with the present disclosure.

DETAILED DESCRIPTION

Figure 1B:
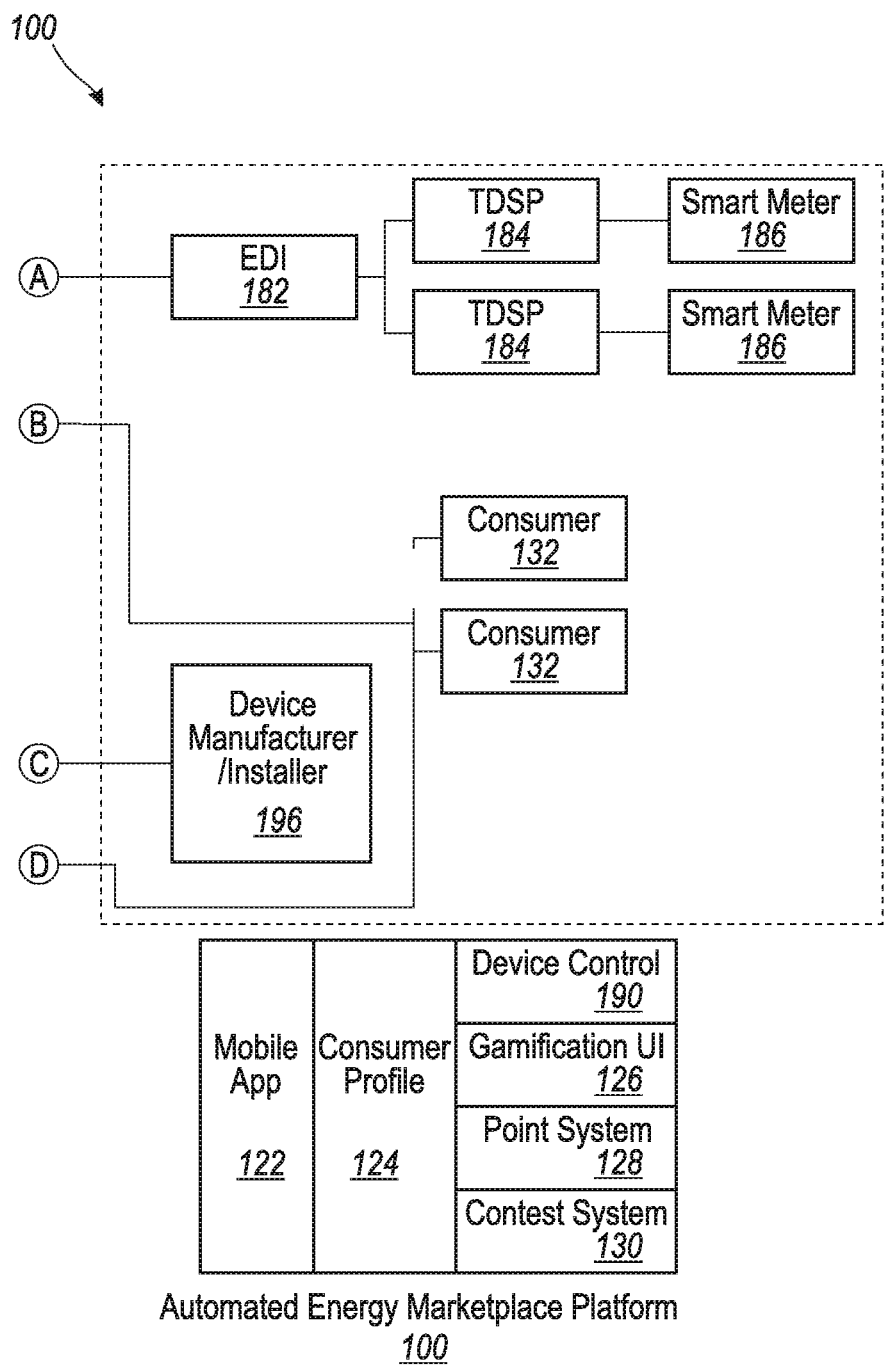

FIGS. 1A and 1B depict an automated utility marketplace platform or marketplace 100. A utility marketplace platform 100 may match demand and supply. A utility marketplace platform 100 may match consumer demand and available wholesale energy supply, including via the work of a real-time pricing engine. A real-time pricing engine may calculate prices using real-time usage data across an aggregated set of consumer users, as well as using real-time energy production data across multiple production types (and across the different real-time wholesale prices associated with each of the production types). Historically, consumer energy meters were read about once per month or once per calendar quarter. Meters were measured and multiplied over a month or more and consumption amounts were multiplied by a fixed price to generate prices. A utility marketplace platform 100 may perform similar functions in much smaller increments (e.g., 15-minute increments), which may present vastly greater opportunities for consumers to obtain, and act upon, prices that are accurate in real time (i.e., on smaller time scales of as little as seconds, minutes, a fraction of an hour, an hour, a day, or the like). Real-time pricing handled in the real time pricing engine may reflect current market pricing and/or forward-looking market pricing, such as day-ahead pricing or pricing associated with other future time periods. In embodiments, the platform may separately handle forward-looking pricing, such as day-ahead pricing, using data from, for example, a day-ahead market in a manner similar to that depicted for real-time pricing. References to real-time pricing throughout this disclosure should be understood to encompass embodiments that use forward-looking pricing in combination with or as an alternative to current market pricing, except where context indicates otherwise.

In embodiments, the energy platform may use defined rules. These rules may be packaged, followed and passed back to consumers. In embodiments, smart meters 186 may provide consumption data in real-time or near real-time to the platform 100. The energy platform 100 may then perform the required pricing calculations to present consumption costs to consumers and to present the anticipated cost of future consumption opportunities, among other things.

In embodiments, a utility marketplace platform 100 may include a data repository 102. A data repository 102 (which may comprise a unified data repository, such as a database, but in embodiments may be distributed across various data storage facilities, including one or more cloud platforms, proprietary networks, or other storage configurations) may include a wide range of types of data obtained from various sources. This may include energy usage data 146, price data 148 and tax and credit data 154 (such as data relating to the availability of renewable energy credits, carbon credits, and the like). Price data 148 may include historical pricing data 150, real-time pricing data 152, and/or forward looking pricing data, such as day-ahead pricing data 190. Price data 148 may also include energy cost data 170, ancillary services cost data 168, other independent system operator (ISO) generated cost data 166, transmission utility price data 164, generation utility price data 162, and the like. Tax and credit data 154 may include federal tax and credit data 160, state tax and credit data 158, local tax and credit data 156, and the like. In embodiments, integration of tax and credit data 154 may enable the utility marketplace platform 100 to facilitate comprehensive optimization of energy consumption by consumers 132, including by accounting for taxes, renewable energy credits and the like at the federal, state and local level, so that consumers can act upon the "real" price (net of taxes and credits), when making energy consumption choices.

Energy usage data 146, price data 148 and tax and credit data 154 may include weather zone usage data 188, energy mix data 172, data from other sources 174 and data from ISO's 176. ISO's 176 may connect to transmission utilities 178 and generation utilities 180. Energy usage data 146 may include consumer grid energy usage data, electric vehicle energy usage data, battery usage data and the like. Consumer grid energy data may include home energy data and enterprise energy data.

In embodiments, energy usage data 146 may be received from an ISO 176. Energy usage data 146 may be received at intervals, for example a 15-minute interval. Energy usage data 146 may be received on an operating day (OD) plus 1. Energy usage data 146 may be made available to a utility marketplace platform 100 in an energy efficiency device. The utility marketplace platform 100 may use data sources, including energy usage data 146, consumer behavior data, gamification data (such as from a gamification engine 138 or gamification UI), energy mix data 172, weather zone usage data 188, pricing data 148, and other data sources 174 to predict various factors, including energy usage, prices, demand, production, and the like. Predicting various factors may include using data science and machine learning, such as provided by a prediction and machine learning engine 104, prediction engine 106 and the like.

In embodiments, a retail consumer energy marketplace may work cooperatively with smart meters that may measure electrical energy usage, such as in a home, office, apartment, and the like. Smart meters may also communicate with usage reading and/or regulating devices within the home, effectively behind the meter from the perspective of the electrical grid. Usage reading and/or regulating devices behind the meter may receive energy usage information being measured by the meter. These devices may also connect through a network, such as a WiFi network (e.g., a WiFi network in the home and the like), a cellular-type network and the like with a platform operating the marketplace. These devices and the marketplace may exchange usage, real-time pricing, capacity, raw energy source utilization, and related information about the energy being provided through the smart meter.

In embodiments, the usage reading and/or regulating devices behind the meter may use energy costs, capacity, raw energy sourcing, and related information to adjust how one or more devices that are associated with the usage reading and/or regulating device operate. Regulating how an energy consuming device operates, such as by controlling when it consumes energy and how much it consumes in a given timeframe, may contribute to regulation of consumption. Criteria may be set to guide the consumption of energy. In embodiments, criteria may include limits on cost of operation, carbon use (e.g., operating when renewable energy is used as a source of electricity), transmission and distribution grid congestion management, compliance with standards for electrical energy signal frequency, voltage, and the like.

In embodiments, matching usage with renewable generation sources including renewable sources offered over the grid and those available behind the meter, such as when a homeowner has solar panels, energy storage (e.g., battery) functionality, and the like. Additionally, behind the meter usage reading and/or regulating may facilitate better regulation of energy provided over the energy distribution network (e.g., electrical grid) by, for example, coordinating use of behind-the-meter energy production and storage resources with local distributed resource, and where applicable large scale grid connected resources may facilitate improving grid stability and the like.

Utility marketplace platform 100 may integrate supply-side pricing data received from an ISO on a 15-minute interval. Utility marketplace platform 100 may integrate price data received from an ISO 176 on an hourly basis for energy cost data 170, ancillary services cost data 168, and other ISO generated cost data 166. Energy platform 100 may integrate price data from transmission utilities 178 and TDSP 184 for the energy grid infrastructure to deliver electricity to consumers 132. Integration of pricing data may enable much more rapid responses by various players, including consumers, enabling them to save cost and enabling TDSPs to more efficiently use existing infrastructure and reduce the need for very expensive infrastructure improvements that are needed to address increasing peak demand levels.

Energy mix data 172 may obtain and track information about what sources of energy are supplying a grid that will supply energy that can be purchased by a consumer. For example, energy mix data 172 may indicate that only 5% of the energy on the grid at a given time is from renewable energy sources, the rest being from traditional sources like fossil fuels, in which case an environmentally sensitive consumer may refrain from using energy, such as by turning off appliances that consume a large amount of energy. Conversely, the energy mix data 172 may show that a high percentage (e.g., 50%) of energy on the grid comes from renewable sources, in which case the consumer may conclude it is a good time to consume energy to meet "green" or environmental objectives. This data 172 may allow a utility marketplace platform 100 to make a mix of energy production types visible in real-time to the end consumer 132. A consumer 132 may see the mix of energy that is available to be consumed at any point in time and may adjust behavior accordingly, such as to shift usage from when fossil fuels are the primary production types to times when renewable sources are predominant.

The data repository 102 may also connect to a supply-side portal 144, payment processing engine 140, gamification engine 130 and/or recommendation engine 136, such that any of the foregoing can consume data stored in the repository 102 and any of them may feed data to the data repository 102. The payment processing engine 140 may include processing of fees paid to energy merchants, such as utilities and other providers. Merchant fees 142 may be paid by credit card, debit card, wire transfer, PayPal, and other fee mechanisms. In embodiments, fees may account for or include payments via other forms of currency or value, such as points (such as obtained in games or contests managed by the gamification engine, loyalty points, or the like), distributed ledger-based currencies (e.g., Bitcoins, such as using the Blockchain system), and credits (e.g., renewable energy credits, carbon credits, pollution abatement credits, and other credits that may have identifiable monetary value and therefore may be exchanged or taken as or in lieu of merchant fees 142.

The data repository 102 may also connect to a machine learning engine 104, which may include a prediction engine and/or connect to one or more separate prediction engines 106. The prediction engine 106 may use various data, such as current state and condition data from various systems connected to the platform 100 and historical data from various sources in the repository 102, to make predictions of future states of various conditions of the marketplace served by the platform 100, such as the likely mix of energy sources at a given time period (e.g., predicting availability of wind sources if weather data indicates a likelihood of steady wind conditions, predicting availability of solar sources if weather data indicates the likely presence of a high pressure system, and the like), the likely price (such as based on historical pricing factors, such as when demand is typically high and when supply might be constrained (such as based on unavailability of renewable sources like solar power at night), the likely demand, the likely supply and other factors. The prediction engine can feed predictions to the machine learning engine 104 (or may be incorporated in it), so that predictions can be used, along with other data, such as current state data, to undertake machine learning with respect to any of a wide range of capabilities of the platform 100. For example, the machine learning engine 104 may be used to optimize recommendations made to consumers, to optimize the quality of predictions made by the prediction engine 106, to optimize user interfaces or message that are intended to affect consumer behavior, to optimize gamification features (such as by adjusting rewards based on their effectiveness in inducing favorable behaviors), to optimize financial outcomes (such as pricing, profits, cost savings, or the like), and others. Each of these items can be optimized by feeding state data, historical data, and the like to the engine, along with a model, map, rule, policy, or other representation or control mechanism for the activity or capability that is to be improved by machine learning, and the machine learning system 104 may adjust parameters, permutations, or other characteristics of the representation, rule, or the like based on measures of success that may be selected or specified by users of the platform, such as whether a given set of parameters tends to produce desired outcomes, such as inducing desired consumer behaviors, causing reduction in energy consumption, causing improvements in the energy mix, or others.

The data repository 102 may also connect to a pricing and billing engine 108, which may be used to provide prices (optionally automated and optionally optimized by machine learning) and to automatically handle billing, including on a micro-period basis, such as billing based on the wholesale energy prices applicable to the energy sources that were used to produce power for the applicable portion of an energy grid that supplied a consumer over a short period of time, such as in 15 minute periods or less.

The data repository 102 may also connect to a demand management engine 110. To manage demand via the demand management engine 110, a machine learning engine 104 may derive insights based on and related to various characteristics that may affect demand, such as time of day, season, geography, generator source distance to a consumer premises, gamification patterns, price patterns, production patterns, weather patterns, user behavioral information based on individual usage patterns and the like. These factors may allow identification of combinations of pricing, points, messages, and other factors that may affect demand.

The data repository 102 may also connect to and provide data to or collect data from an energy usage calculator 112. For example, the usage calculator 112 can calculate the energy mix associated with the energy consumed/purchased by the consumer, in order to provide overall usage and energy mix usage information for purposes of pricing, billing, prediction, award of points, tracking of credits, and other items handled by the platform 100 that are affected by the mix or overall usage of energy.

In embodiments, the machine learning engine 104 may optimize gamification features of a utility marketplace platform 100. Optimization of gamification features of a utility marketplace platform 100 may assist in producing desired modifications of the behaviors of consumers 132, such as causing reduction in overall energy usage, reduction in the cost of energy usage to consumers (such as by time-shifting usage to lower-cost time periods), improvements in the mix of energy to include a greater fraction of renewable energy sources, cleaner sources, or the like, causing greater responsiveness of the consumers to information, and many other factors. This may include optimizing points, credits, rewards, financial incentives, prices, or the like that are awarded or provided in connection with consumer activities, by optimizing messages, interfaces, or presentations to consumers relating to features that compose a game or game-like process, and by optimizing rules and other parameters of a game or game-like feature. For example, a machine learning system may randomize reward patterns among various possible patterns to determine what pattern of awards has the greatest impact on a consumer 132 or collection of consumers.

In embodiments, gamification may involve various forms of games, contests, and competitions. Competitions may be defined among customers that are represented by a meter (be that a residential meter, or larger meters for businesses), as well as between subsets of customers that share a meter. For instance, embodiments may include allowing members of one family (such as the kids in the family) to compete against each other by being able to track points, such as awarding points when a kid undertakes an action to react to a price signal, or the like. Through the user interface of the mobile application or a browser, the platform may engage with the individual players, who may become the beneficiaries of the points, which may encourage them to continue to use the platform, resulting in benefits for the whole family, including cost savings. In embodiments, the game may be designed to encourage specific behaviors, such as having players like kids do the work of turning devices in the home down or off at different times of the day, rather than installing electronic devices that achieve the same thing.

In embodiments, a machine learning engine 104 may be used to optimize gamification features based on what UI features work best, for example by determining what messages, what arrangements of icons, what timing of messages, and/or what graphics work best and what amounts of points, rewards, credits, price reductions, or the like should be awarded to produce desired modifications of behaviors of consumers 132. Feedback to optimize a machine learning engine 104 may be based on desired objectives, such as reducing overall energy usage, reducing the cost of energy, shifting the mix of energy production/consumption to a greener profile, reducing carbon footprint, or other metrics. It may be noted that greener energy is also typically less expensive, because green sources like wind and solar power have low marginal costs of production when environmental conditions allow them to produce power and because total supply is lower when these resources are available, among other reasons.

A machine learning engine may include machine pattern recognition. Using a machine learning engine for pattern recognition may improve a prediction engine 106, based on data collected in a utility marketplace platform 100. In embodiments, machine learning may improve the prediction engine 106 based on pattern recognition, which may recognize patterns that reflect many factors. Factors may include real-time pricing data, historical energy usage data, day-ahead pricing data, patterns in user behavior and patterns in other relevant factors like weather, aging of utility infrastructure, changes in energy infrastructure and storage, and many others. Patterns in consumer 132 behavior may be analyzed with machine pattern recognition, such as patterns relating to responses to price changes, responses to gamification incentives, responses to messages, and the like. Relevant factors may include weather-based patterns, patterns in time-of-day or weekly consumption, seasonal patterns, and many others.

In embodiments, various elements of the platform 100 may connect to and feed a notification engine 114 or take notifications from a notification engine 114. These may include the energy usage calculator 112, the pricing and billing engine 108, and various elements by which one or more entities or constituencies may interface with the platform. For example, the notification engine 114 may provide or receive notifications via an application programming interface (API) 116, a portal (such as a demand-side portal 134), or by an interface to a consumer's mobile device.

In embodiments, the pricing and billing engine 108 may include member-configured pricing alternatives. Member-configured pricing alternatives may provide various forms of pricing alternatives or packages that the users of the platform 100 (e.g., utilities and other merchants that supply energy) may wish to present to consumers 132. Pricing alternatives may be based on any one or a combination of one or more of the wholesale cost of energy, a retail price that includes a markup, one or more ancillary services costs, day-ahead market prices, real-time market prices, utility costs, smart-meter interval data, member-specific pricing, adjustments based on various reports (e.g., costs reported by the ISO ERCOT), adjustments based on all utility costs, applicable taxes and credits, payment processing fees, location of production, cost of transmission and the like.

In embodiments, real-time pricing and short time-interval (e.g., hourly and the like) pricing adjustment may present challenges associated with allocation of costs and charges that may be aggregated, may vary over different time frames (e.g., over many days, fixed time periods, several months and the like). In a consumer retail energy distribution network, some costs, such as independent service organization fees, regulatory fees, actual fees for estimated fees, and the like may be calculated and made available to an energy marketplace platform at times other than individual time intervals. Some fee information may be retroactive, such as when an estimated price is used for a specific time interval, operating day or the like and an actual price is provided after the time interval closes, such as in the case of an operating day interval the day after the operating day, although an actual price may not be available for several days or longer.

Ensuring pricing integrity of the platform may require handling these time-varying charges with algorithms that account for time variance in some cost information. In embodiments, an initial estimated charge for a consumer for a time interval, such as an operating day and the like may be calculated based on initial estimated usage information provided from an energy utility or the like (e.g., a retail energy service provider) that may have direct access to the consumer's energy meter and based on initial real-time energy pricing information for the energy designated by the consumer for the billing time interval, plus an estimate of other costs, such as regulatory and the like. In embodiments, these other estimates may be based on historical data and the like. Real-time price estimates may be based on geographic or other sectioning of a retail energy distribution network, sometimes referred to as a "load zone." Real-time prices may be updated more frequently than a billing time interval. In an example, real-time prices may be updated every 15 minutes, whereas a billing time interval may be an operating day, such as a contiguous 24-hour period of consumption, and the like.

In embodiments the initial estimated charge for a consumer for a billing time interval may be based on an estimate of usage received from an energy consumption measuring device or devices that measure energy consumption for some portion of the consumer's house hold and the like. Updates to the estimated consumption may be provided after the billing time interval from a utility or other source, such as the consumer's smart meter and the like. This updated information may replace or be used to adjust the initial estimated charge by recalculating consumption charges for the billing time interval. Other charges, such as ISO fees and the like may be provided as an aggregate for all consumers participating in the marketplace who receive energy service from the ISO. This fee may be spread over some portion of the consumers participating in the marketplace based, for example, on whether the consumer was participating in the marketplace for the billing interval to which the aggregated ISO fee applies. In an example, this fee, which is merely an example of other charges that may be retroactively provided to the platform, may be allocated across consumers of the marketplace based on consumption of energy during the billing time interval for which the fee applies.

In embodiments, some fees and/or adjustment to fees may only be available well after a consumer has been billed for and paid for a billing time interval. In an example, a fee adjustment may be received for a billing time interval (such as a day or the like) several months after the close of the billing time interval. Such a fee adjustment may be designated for a billing time interval that included consumers of the marketplace who are no longer consumers of the marketplace (e.g., consumers may have closed their account because they have moved to a different address and the like). In these cases, the fee adjustment may be an aggregate fee adjustment that may preferably be applied to all consumers who were consumers participating in the marketplace during the billing time interval that the fee adjustment applies to. This aggregated fee adjustment is divided into equal amounts for all customers of the marketplace during the billing time interval to which the fee applies. Those consumers who remain consumers of the marketplace may be charged the equal amount and any remaining portion may be charged to an operator of the marketplace.

In embodiments, reconciling of timing of charges on the account of the consumer may include different billing, invoices, true-ups, fees, and the like that may be accepted on different days but otherwise represent costs for the same operating day. By way of these examples, a customer's total costs for a single day may be made up of usage, price and true-up data that comes in anywhere from the day before to 180+ days after usage. The platform is able to manage these timing and reconciliation issues automatically. In many examples, the consumer for any operating day (OD) may be "shadow-billed" for the next day (OD+1) based on the initial estimated usage from the utility, initial real-time price data from the ISO, and other costs that may be estimated internally based on historical data. Over the next four days, those initial estimates may be finalized and the costs accrued on the OD may be revised. Over the next few months, the platform may receive from the utility or ISO true-up adjustments to usage, ancillary services costs, etc. that apply to the OD. It will be appreciated in light of the disclosure that these adjustments may be handled to keep data consistent across monthly billing statements and monthly/daily/hourly usage reports, while also allowing for adjustments that come to charges for customers after they are no longer consumers on the platform.

In embodiments, the platform may receive initial and final usage data per meter/customer. The platform may also receive market price data for each 15-minute interval or the like by geographic "load zone." In embodiments, the platform may receive a single line-item charge from the ISO for each OD, which may be aggregated across the entire customer pool (or certain portions thereof), for energy consumed. This single charge may be incorporated in what the platform is configured to calculate based on usage and interval wholesale prices or may be averaged and parsed across the existing pool of customers. In embodiments, a single line-item charge from the ISO for each OD may be received by the platform and aggregated across the entire current customer pool for each type of ancillary services charge. The platform may then allocate these charges across the customer pool on a pro-rata basis according to usage. All of the above charges may be received and calculated within 5 days of OD, and the platform may allocate them to the appropriate OD. In many examples, finalization of the charges may not occur until OD+5. By way of this example, a customer's previous month's charges may not be final until the 5th of the following month or the like. The platform may further receive true-ups, updates, further information, or the like to the prices, usages and ancillary services charges and may typically occur within 180 days of OD, but may occur even later than that. In many examples, when the platform receives charges that are a sufficient period after OD (i.e., a stale charge), the charges may be socialized across the pool of existing customers who were active customers on the OD no longer be current with the platform.

In embodiments, the pricing and billing engine 108 may include a pay-as-you-go billing infrastructure and offer pay-as-you-go billing to consumers 132. This may help eliminate or mitigate costs associated with billing and collections, which may help keep membership fees paid by consumers, low. Pay-as-you-go billing may optionally require consumers 132 to establish an account balance at the time the consumer signs-up to establish an account on a utility marketplace platform 100. For example, a consumer may establish an account balance between $75-$500 when signing up to establish an account. This initial balance may be debited (e.g., daily or more frequently) based on the energy consumption of the consumer 132. When the balance reaches a minimum amount, the account may be automatically recharged or may be recharged based on input or approval from a consumer 132. The utility marketplace platform 100 may allow the consumer 132 to see how much energy is being used and how much of the account balance is spent each day. The utility marketplace platform 100 may also project when the next recharge to the account will occur.

A utility marketplace platform 100 which offers pay-as-you-go billing may be of major assistance to consumers 132 with payment difficulties or in hardship cases. The assistance provided by such a utility marketplace platform 100 may also provide a benefit to regulators, who are typically responsible for consumers 132 that get into financial difficulty, while continuing to consume energy. Pay-as-you-go billing may match cost with the capacity of a consumer to pay. A primary benefit of matching energy cost with capacity to pay is that consumers 132 may have more control over their circumstances, which is consistent with large retailers' stated policy objective, although such retailers typically have difficulty actually correcting or addressing hardship cases. Consumers 132 in hardship may need to figure out how they can stay on track or get back on track with the ongoing cost of energy supply. In the event a consumer 132 cannot recharge an account balance, an energy retailer operating a utility marketplace platform 100 (much faster than an energy retailer not operating a utility marketplace), may become aware of a potential for payment difficulties and may be on notice that the consumer 132 may find the need for hardship help. This means an energy retailer operating a utility marketplace platform 100 may offer a hardship policy and consequential plan that shows flexibility to assist a consumer 132 in bringing cost and the consumer's capacity to pay in line as fast as possible.

An additional benefit of a pay-as-you-go policy is to avoid a debt building up without stakeholders, including the consumer 132, being aware of the scale of that debt. Post-pay retailers have to wait (e.g., up to 75 days) before they know if a consumer 132 is in difficulty, by which time further debt has accumulated by virtue of another substantial period of supply and consumption. It may be much easier to manage consumers 132 out of hardship or payment difficulties if there is no pre-existing debt, and it may be much more preferable for consumers to avoid large debt entirely, rather than finding out about the debt when it is too late to control it.

The policy of an energy retailer operating a utility marketplace platform 100 may be far more proactive than an energy retailer not operating a utility marketplace platform 100. For example, an energy retailer operating a utility marketplace platform 100 may offer to consumers 132 whose balance gets to $10 or less, to apply for a hardship plan. A hardship plan may show flexibility in recharge amounts so that the recharge amount may be reduced to $5, for example, or some other level agreed to with the consumer 132, from the current level. Showing flexibility with repayment is in essence shortening the collection cycle. If a consumer goes onto a hardship plan, after contacting the energy retailer operating a utility marketplace and being offered the plan, this plan may then be monitored, with the primary objective of avoiding a debt for which the consumer 132 would need to garnish future income to pay off. An energy retailer operating a utility marketplace may also encourage consumers 132 to come off of the hardship plan by increasing the consumer 132 account back to the pre-agreed levels.

In embodiments, the demand management engine 110 may connect to various mechanisms for communicating with the platform, such as the notification engine 114, one or more application programming interfaces (APIs) 116 and the demand-side portal 134.

In embodiments, the demand management engine 110 may provide automated, for example machine-based, management of demand for the utility marketplace platform 100, including managing real-time prices presented to consumers 132, managing access to the platform by providers and suppliers (including managing costs and rules of participation), managing gamification features, and managing other features that may affect demand for energy.

In embodiments, the notification engine 114 may also connect to one or more APIs 116 and a demand-side portal 134. The APIs 116 may include a supplier API 118 and a consumer API 120. A supplier API 118 may also connect to one or more systems or interfaces of supplier entities that connect with the platform 100, such as transmission utilities 178, generation utilities 180 and the like, which may interact (e.g., machine-to-machine) directly or programmatically via the API 118 or may interface with a supply-side portal 144 or other interface that includes components for human or human-aided interaction.

In embodiments electricity supply to retail customers, while provided over a fixed distribution grid, can be arranged to be provided through one of a plurality of retail electricity suppliers, such as retail suppliers who are authorized to do so through a regulatory body and the like. A retail electricity supplier facilitates logical access to energy provided over the grid (e.g., such as by arranging an agreement with energy providers to receive payment for the energy that a retail consumer consumes. An energy marketplace may be operated by a platform that performs a range of functions as described herein. In embodiments, integrating an energy marketplace with one or more retail energy suppliers may facilitate access by consumers to the benefits and features of the marketplace within today's current energy supply processes. A single marketplace may serve a plurality of consumers who contract with various retail electricity suppliers. A marketplace may be integrated into a retail electricity supplier. Alternatively, a single marketplace may be integrated into a plurality of electricity suppliers. Integration may enable retail consumers of the retail electricity supplier access to the features and benefits of the marketplace and/or the marketplace platform as described herein. An integrated marketplace platform may be privately branded so that the retail energy supplier appears to be the marketplace. In embodiments, an authorized supplier of energy such as a regulated retailer can integrate a portion or all of the platform. In embodiments, the platform may be configured as a real-time marketplace platform within the supply of electricity by an authorized retail electricity supplier. It will be appreciated that most electricity supply chains require retail electricity supply to be made available to retail customers only by way of retailers authorized to do so by an electricity regulator.

In embodiments, a consumer API may connect to and support interactions with a mobile app 122, such as for enabling the mobile app to be supplied with current data, such as to support activities of consumers 132 in the mobile app on the consumer's 132 mobile device. The mobile app 122 may include or reference a consumer profile 124 that may be used to configure elements of the mobile app, such as based on stated consumer preferences, demographics, geographic information, or other factors. The mobile app 122 may include gamification features, such as rendered in a gamification user interface (UI) 126 by which the consumer may engage in games, contests, or game-like interactions that make the platform 100 highly engaging and that influence consumer behavior with respect to energy consumption. This may include games that induce various kinds of behavior, such as time-shifting use of energy-demanding appliances, turning down heating and cooling, turning off lights, and the like. Games may encourage competition between customers with different meters (including in categories, such as by region, by type of customer (retail versus business), and the like, as well as between customers with the same meter (such as among members of the family). The gamification interface 126 may present a point system 128, a contest system 130 or the like, such as by expressing rules or guidelines for participating in game or contest. The mobile app 122 may run on iOS devices, Android devices or devices adapted for other mobile device operating systems.

In embodiments, a utility marketplace platform 100 may manage a point system 128. The point system 128 may encourage favorable energy consumption behavior by consumers 132. A point system may award different types of points. Different types of points may include a sign-on bonus, energy points, carbon points, gold hour points, and the like, each determined by a calculation that may factor in energy usage, the mix of sources, pricing, and other factors. With respect to a sign-on bonus, every consumer 132 connected to the utility marketplace platform 100 may receive a number of points (e.g., 1,000 points) upon sign-up to the utility marketplace. With respect to energy points, consumers 132 may receive energy points for responding to price signals and shifting their usage from high-price hours to low-price hours. Each day, their hourly usage profile (as a percentage of their total daily usage) may be compared to that of the overall market. A consumer may receive energy points when hourly usage is higher than the overall market in low-price hours and lower than the overall market in high-price hours (i.e., reacting to Green Hours or Brown Hours). With respect to carbon points, consumers 132 may receive carbon points for responding to emissions signals and by shifting their usage from high-emission hours to low-emission hours (i.e., again reacting to Green Hours and Brown Hours). Each day, their period (e.g., hourly) usage profile (such as a percentage of their total daily usage) may be compared to that of the overall market. A consumer 132 may receive carbon points when hourly usage is higher than the overall market in low-emission hours and lower than the overall market in high-emission hours. For the purposes of this calculation, emission levels may be based upon the percentage of total system load being served by wind generation, as published by the ISO. A gold hour may be a demand response program that rewards consumers 132 for curtailing usage during specific hours of high system demand. This may be administered through a third party contracted to a provider of a utility marketplace platform 100. Consumers 132 may be alerted to an upcoming gold hour and, if they participate by reducing usage during that hour, may earn substantially larger rewards on top of any energy points and carbon points earned. A utility marketplace platform 100 may perform points calculations.

In embodiments, the platform can deliver value to customers by helping control demand (as customers armed with price signal knowledge can do), including the ability to undertake arbitrage between day-ahead prices and real-time prices, which, as noted above, can be handled by the platform. In embodiments, the platform may include a feature (such as embedded within a demand response feature of the mobile application or other interface) providing the ability for customers to set the price for energy that will be consumed the next day by electing the next day's price on the day-ahead market. If, when the next day comes, the real-time price is lower, the consumer may choose to elect to reduce demand, buy back that amount of consumption at the real-time price, and capture the price difference.

Points calculations may take many forms, including the following. First, a Consumer's Daily Points may be calculated as $P_T = \Sigma_1^{24} [P_{E,i} + P_{C,i} + P_{G,i}]$ where $P_T$ may be the daily total of hourly points, $P_{E,i}$ may be hourly points earned by a consumer for reducing their energy cost by responding to price signals during hour i, $P_{C,i}$ may be hourly points earned by a consumer for reducing their carbon footprint by responding to emissions signals during hour i, and $P_{G,i}$ may be points earned by a consumer for participating in a Gold Hour during hour i.

Energy Points may be calculated as $P_{E,i}=UF_i \times p_i \times PF_E$ where $UF_i$ may be the usage factor during hour i (see explanation below), pi may be the wholesale cost of energy during hour i, and $PF_E$ may be a multiplier called the Energy Points Factor. The Energy Points Factor may be continuously calibrated to ensure that total points awarded by a provider of a utility marketplace stays within the budget for the rewards program.

Carbon Points may be calculated as $P_{C,i}=UF_i \times (1-R_i) \times PF_C$ where $UF_i$ may be the usage factor during hour i, $R_i$ may be the percentage of generation that comes from renewable sources during hour i, and $PF_C$ may be a multiplier called the Carbon Points Factor. The Carbon Points Factor may be continuously calibrated to ensure that total points awarded by a provider of a utility marketplace stays within the budget for the rewards program.

A Usage Factor may be calculated as $UF_i=S_i-M_i$. $P_E$, (points relating to energy savings) and $P_C$, (points relating to carbon reduction) where both are calculated using the same Usage Factor, $UF_i$. This may be the delta for each hour between a Net System Load Factor, $S_i$, and a Member's Load Factor, $M_i$. The Net System Load Factor may be calculated as $$S_i = \frac{Si}{\Sigma_1^{24} Si}$$

The Net System Load Factor, $S_i$, may be the percentage of the system's total daily load that occurred during hour i for the relevant market (the consumer's "Weather Zone"). Si may be the system's total load during hour i. The sum of all hourly Net System Load Factors in a day may be 100% ($\Sigma_1^{24} S_i=1$). A Consumer's Load Factor may be calculated as $$M_i = \frac{mi}{\Sigma_1^{24} mi}$$

The Consumer's Load Factor, $M_i$ may be the percentage of the consumer's total daily load that occurred during hour i. $m_i$ is the consumer's total load during hour i. The sum of all hourly Consumer's Load Factors in a day may be 100% ($\Sigma_1^{24} M_i=1$). Gold Hour Points may be calculated as $$P_{G,i} = \frac{(bi - m1)}{bi} \times PF_G$$

where $b_i$ may be the consumer's Baseline Usage during hour i, $m_i$ may be the consumer's actual usage during hour i, and $PF_G$ is a multiplier called the Gold Points Factor. Baseline Usage may be a calculation made by the TDSP specifically for measuring demand response performance. It may vary by market, but may typically be the average of the consumer's usage for the given hour over the previous 5-10 days.

In embodiments, a contest system 130 may provide points-based contests. Points-based contests may encourage favorable behavior by consumers 132 of a utility marketplace platform 100. Consumers 132 may opt-in to contests against other consumers 132. A consumer 132 may win a contest by earning the most points over a given period of time. A consumer 132 who wins the contest may receive a portion of the points earned by consumers who did not win the contest. Contests may be held among friends, across neighborhoods, across states, in time across the country and the like.

In embodiments, a mobile app 122 may allow energy providers to manage communications with consumers 132 in an energy management platform 100. Communications may include billing communication, usage communication, price signal communication, renewable energy content communication, energy efficiency programs/devices communication, other gamification activity communication and the like. Communications may also be facilitated among members and between members and non-members, such as by text message, chat features, e-mail, and the like.

In embodiments, price signal communication may include automated price notifications to consumers 132 for energy pricing changes. Price signal communication may indicate when renewable energy sources are available on the energy grid, which may also indicate when energy prices are low. Consumers 132 may choose to act on indications of renewable energy being available on the energy grid, in order to increase their use of renewable energy sources. Increasing their use of renewable energy sources may provide benefits to the consumer such as lower energy costs and a reduced carbon footprint. Price signal communication may include historical daily average, real-time (RT) price signals, current daily average price signals, day-ahead pricing data, and current RT price signals, among others.

In embodiments, a consumer profile 124 may include geographic/location information, demographic information, psychographic information, behavior information, preference information and the like. Behavior information may include tracking interactions with the platform such as responses to pricing, responses to messaging, responses to incentives and the like. Preferences may include expressed or inferred preferences. Expressed preferences may be based on surveys or use of in-app settings and inferred preferences may be based on similarity to other users, for example.

In embodiments, a consumer profile 124 may be used to personalize features of a utility marketplace platform 100. A consumer profile 124 may be used to tune UI features, pricing, gamification, and the like, such as based on demographic, psychographic, and geographic information, as well as expressed or inferred preferences. This may occur automatically, such as under the control of machine learning. In embodiments, human-supervised machine learning may be used, such as to assist a machine in identifying or classifying consumers, such as by determining that a consumer fits into a classification used by the platform. For example, consumers 132 might be classified as "green" customers, "luxury" customers, "cost-conscious" customers, hardship customers, or the like, which may result in different interface features, messages, gamification features, or the like being presented (such as under control of machine learning or based on rules) to the consumers 132. For example, a luxury consumer might be presented with travel rewards for changing behavior, while a cost-conscious consumer might be presented with opportunities for enhanced cost savings for the same behavioral change.

In embodiments, method and systems are provided for providing automated or machine-based recommendations to a consumer in a consumer retail utility marketplace platform 100. For example, consumer profiles, user behavior information, and similarity analysis (including collaborative filtering) can be used to make recommendations that are tuned to the profile of an individual or group of consumers, such as to suggest when to turn on a particular appliance, how to reduce overall energy consumption, how to reduce carbon footprint, and other factors.

In embodiments, a demand side portal 134 may connect with a recommendation engine 136, a gamification engine 138, a payment processing engine 140, a supply-side portal 144 and the various data sources listed elsewhere in this disclosure. In embodiments, the demand side portal 134 may present a consumer user interface (UI) to consumers 132. A consumer UI may be an online UI, a web UI a mobile UI and the like. The consumer UI may provide the consumer 132 with real-time and day-ahead information on the price of energy, the nature of the energy produced, for example by what energy production types, such as renewable versus fossil fuels), and historical and anticipated information.] Energy production types may include natural gas energy production, oil energy production, coal energy production, nuclear energy production, wind energy production, hydropower energy production, solar energy production and the like.

In embodiments, the demand-side portal 134 may allow energy providers to manage communications with consumers 132 in an energy management platform 100. Communications may include billing communication, usage communication, price signal communication, renewable energy content communication, energy efficiency programs/devices communication, communication about other gamification activities, and the like. Communications may also be facilitated among members and between members and non-members, such as by text message, chat features, e-mail, and the like.

In embodiments, a utility marketplace platform 100 may allow for differentiating types of energy consumption based on production type. Differentiating types of energy consumption based on production type may allow a utility marketplace platform 100 to educate a consumer 132 on hourly price signals from the beginning of the consumer's interactions with the platform 100. A utility marketplace platform 100 may do this by differentiating between different types of hours. Different types of hours may be green hours, brown hours, and the like. A green hour may indicate a period of low energy cost. A brown hour may indicate a period of high energy cost, a period where energy production produces more pollution, or the like.

In embodiments, the gamification engine 138 may also connect to an electronic data interchange provider (EDI) 182. An EDI 182 may connect to TDSP's 184. TDSP's may connect to smart meters 186. By virtue of these connections, smart meter data may come from TDSP's 184 to the utility marketplace platform 100. TDSP's 184 may collect, provide and make available to retail energy providers the smart meter data. TDSPs may publish the smart meter data and make it available through EDIs 182. TDSP's may provide other services.

In embodiments, rather than a pay-as-you-go model, energy may be provided on a flat, fee-based model, according to preferences of the energy providers who are members of the marketplace platform 100.

Figure 2:
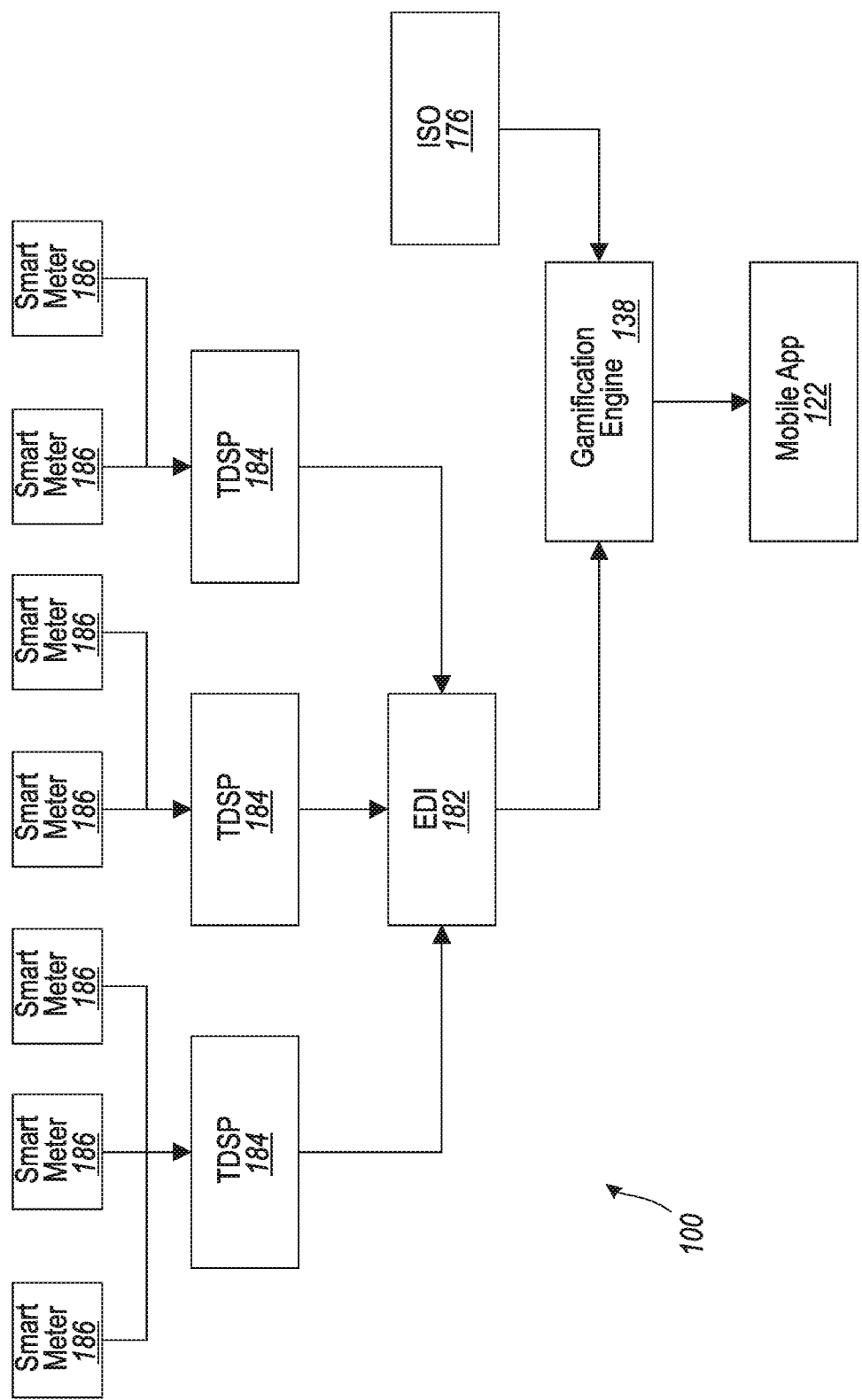
FIG. 2 provides a diagrammatic view of data flow for an embodiment of a gamification engine of the platform in accordance with the present disclosure.

FIG. 2 depicts a data flow for a gamification engine 138 data inputs and outputs for an automated utility marketplace platform or utility marketplace platform 100. Smart meters 186 may send data to TDSP's 184. TDSP's may send data to EDI 182. EDIs 182 may send data to a gamification engine 138. A gamification engine 138 may also receive data inputs from ISO's 176. A gamification engine 138 may process input data received from EDIs 182 and ISO's 176 and send output data to a mobile app 122.

Figure 3:
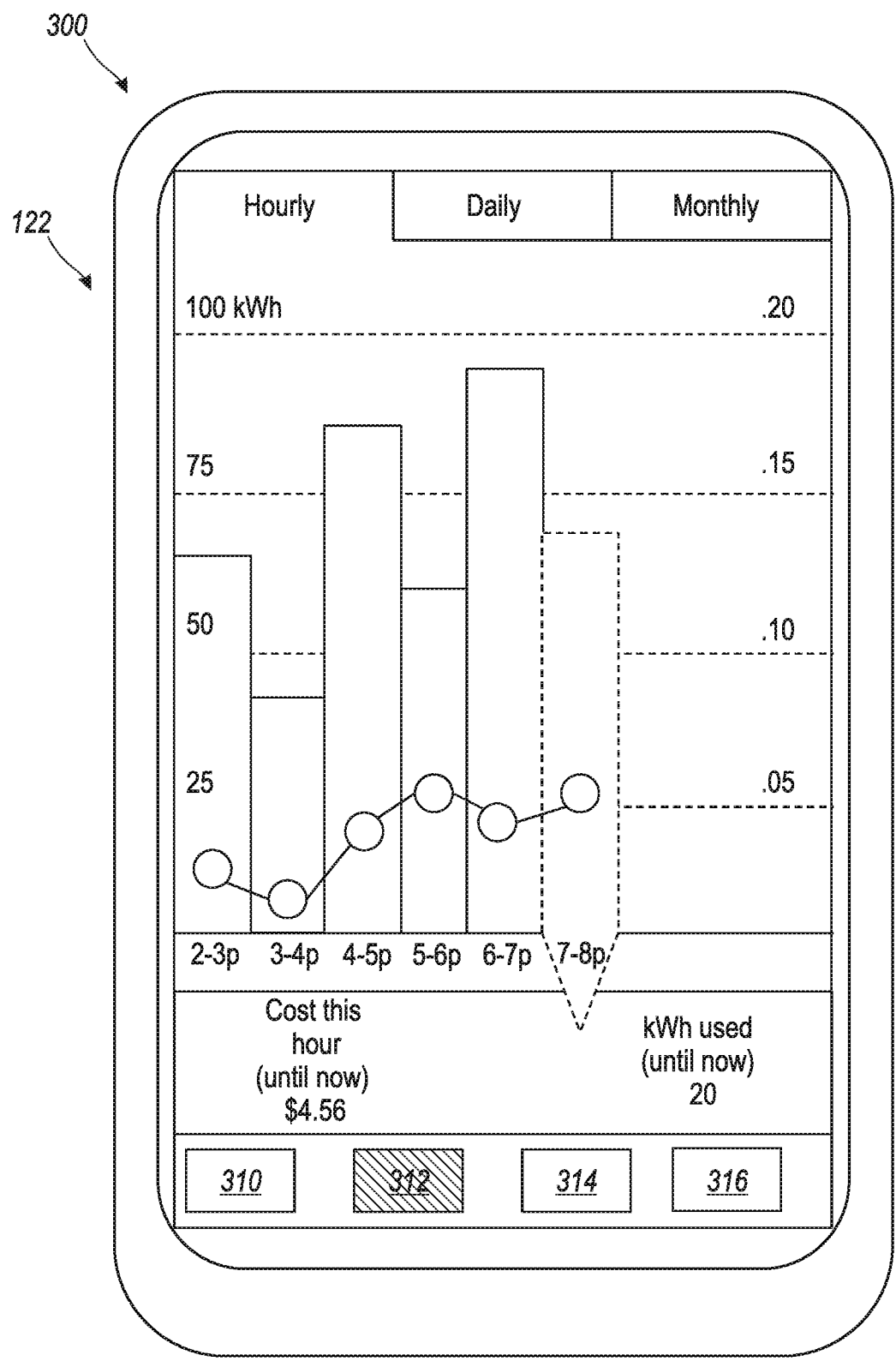
FIG. 3 depicts a diagrammatic view of a user interface of a mobile application that provides visibility into current characteristics of a utility marketplace from which the consumer can purchase energy in accordance with the present disclosure.

FIGS. 3-7 depict a user interface (UI) for a mobile app 122 for a utility marketplace platform 100. FIG. 3 depicts a cost usage UI 300 for a mobile app 122 for a utility marketplace platform 100. A cost usage UI 300 may include views 302. Views may include an hourly view 302, a daily view 304 and a monthly view 306. Views may display energy usage data 146 and price data 148. Views may also display a trendline 308. A trendline 308 may indicate energy usage trends, price trends and the like. A cost usage UI may also include a summary statistics section 310. A summary statistics section 310 may include a summary of cost, energy usage and the like. A cost usage UI 300 may also include menu items. Menu items may include a points menu item 312, a cost usage menu item 314, a billing menu item 316 and an account balance menu item 318.

Figure 4:
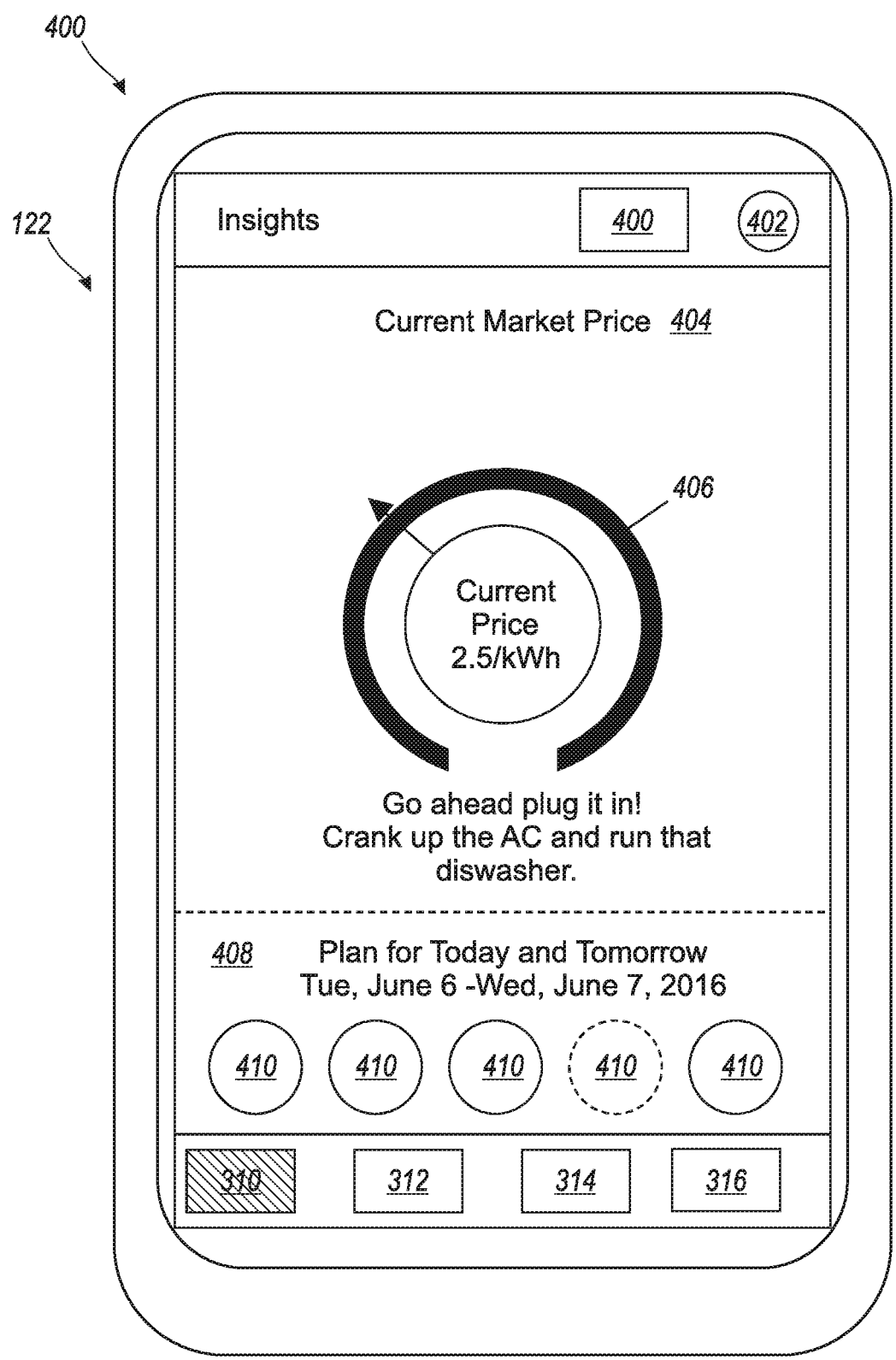
FIG. 4 depicts a diagrammatic view of the user interface of a mobile application showing a pricing signal and suggested behavior for a consumer energy user in accordance with the present disclosure.

FIG. 4 depicts a price signal UI 400 for a mobile app 122 for a utility marketplace platform 100. A price signal UI 400 may include a current price indicator 402. A current price indicator 402 may indicate the current price for a unit of energy, an indication providing context of the price within a range of prices and a message encouraging a consumer 132 to use more or less energy. A price signal UI 400 may also include a forecast 404. A forecast 404 may indicate times when energy prices may be low or energy prices may be high. A price signal UI 400 may also include menu items. Menu items may include a points menu item 312, a cost usage menu item 314, a billing menu item 316 and an account balance menu item 318.

Figure 5:
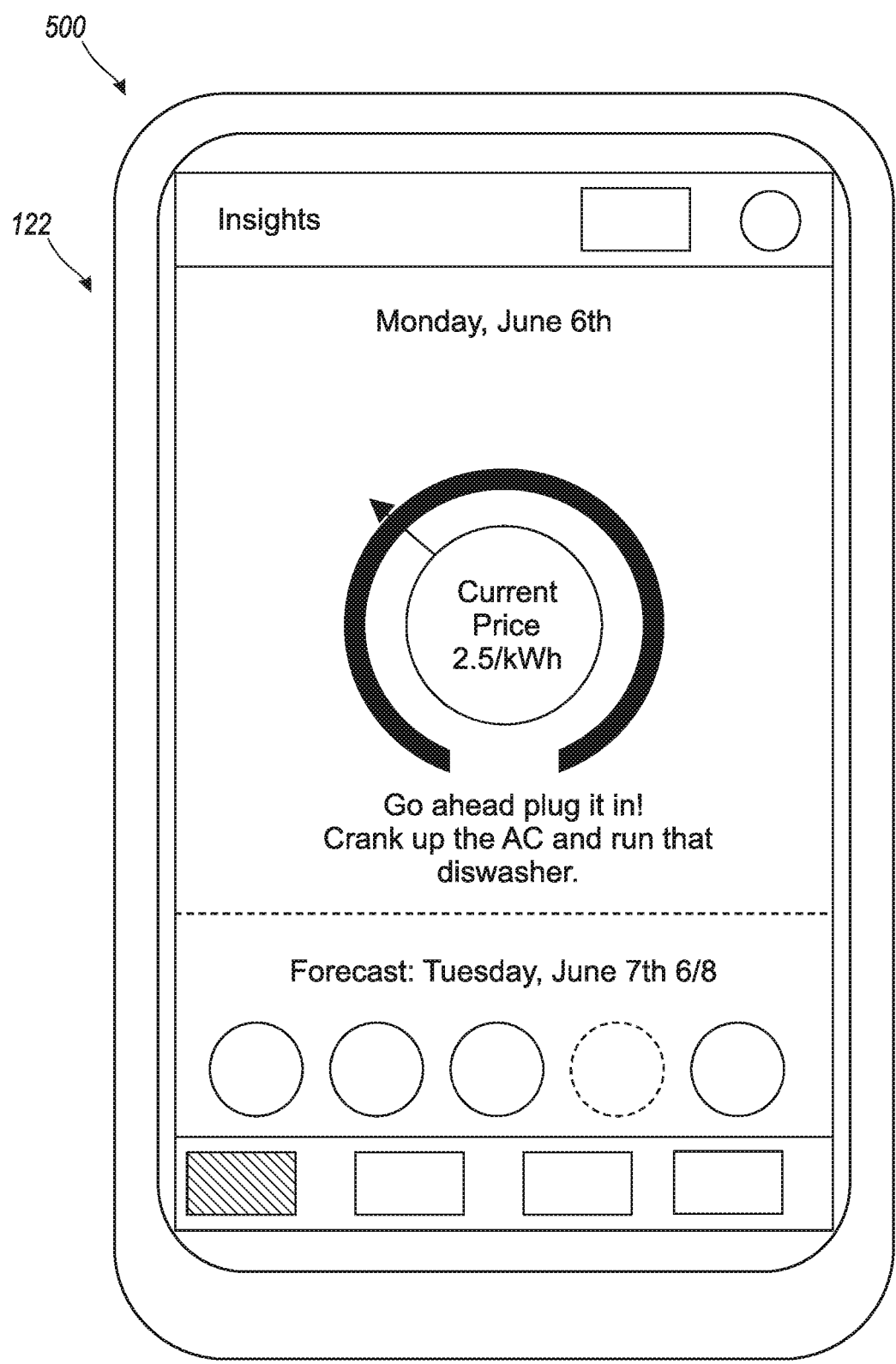
FIG. 5 depicts a diagrammatic view of the user interface of a mobile application showing a planning feature for energy consumption in accordance with the present disclosure.

FIG. 5 depicts an insights UI 500 for a mobile app 122 for a utility marketplace platform 100. An insights UI 500 may include a current price indicator 402. An insights UI may also display a points total 502 and consumer rank 504. A consumer may tap the points total 502 or consumer rank 504 to see additional detail. Additional points detail may include a points history and the like. Additional rank detail may include full ranking information and the like. An insights UI 500 may also include a planning display 506. A planning display 506 may include a plan for today, a plan for tomorrow and the like. A planning display may also indicate times 508. Times may notify consumers 132 of hour types. Hour types may include green hours, brown hours, and gold hours. An insights 1 UI 500 may also include menu items. Menu items may include a points menu item 312, a cost usage menu item 314, a billing menu item 316 and an account balance menu item 318.

Figure 6A:
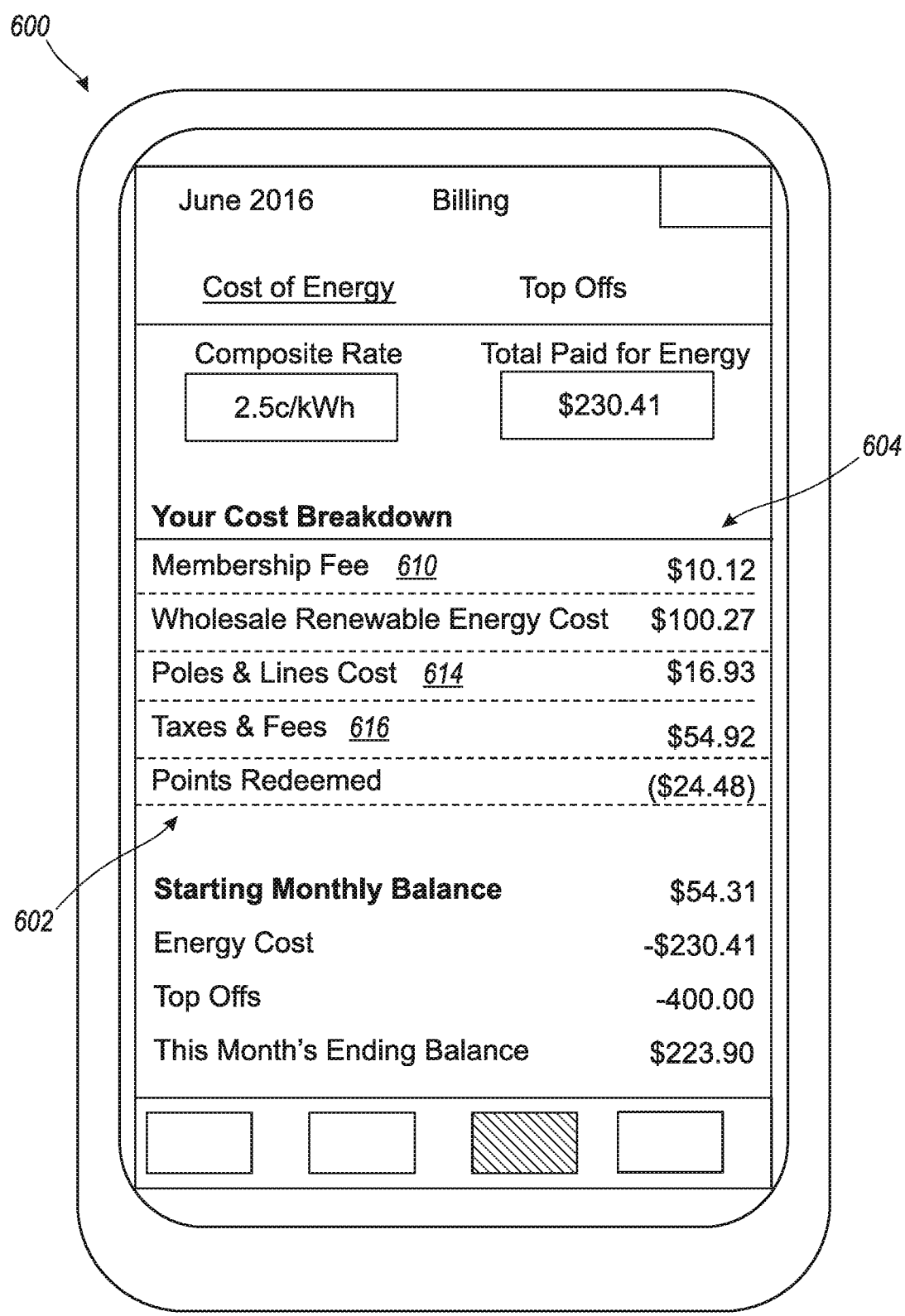
FIG. 6A depicts a diagrammatic view of the user interface of a mobile application containing billing information and features for a user of a utility marketplace in accordance with the present disclosure.
Figure 6B:
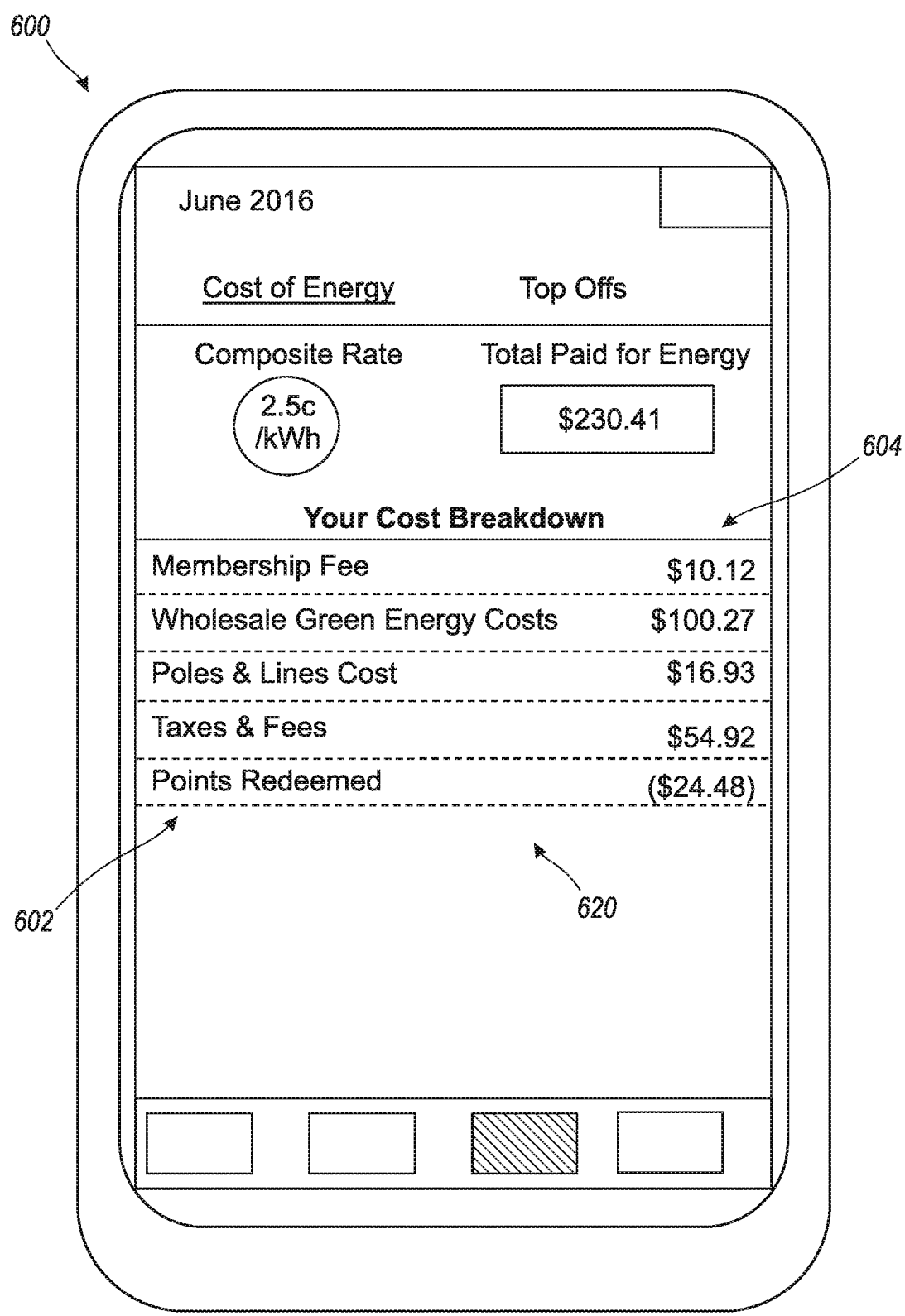
FIG. 6B depicts a diagrammatic view of the user interface of a mobile application providing additional information regarding the breakdown of costs for a user of a utility marketplace in accordance with the present disclosure.
Figure 6C:
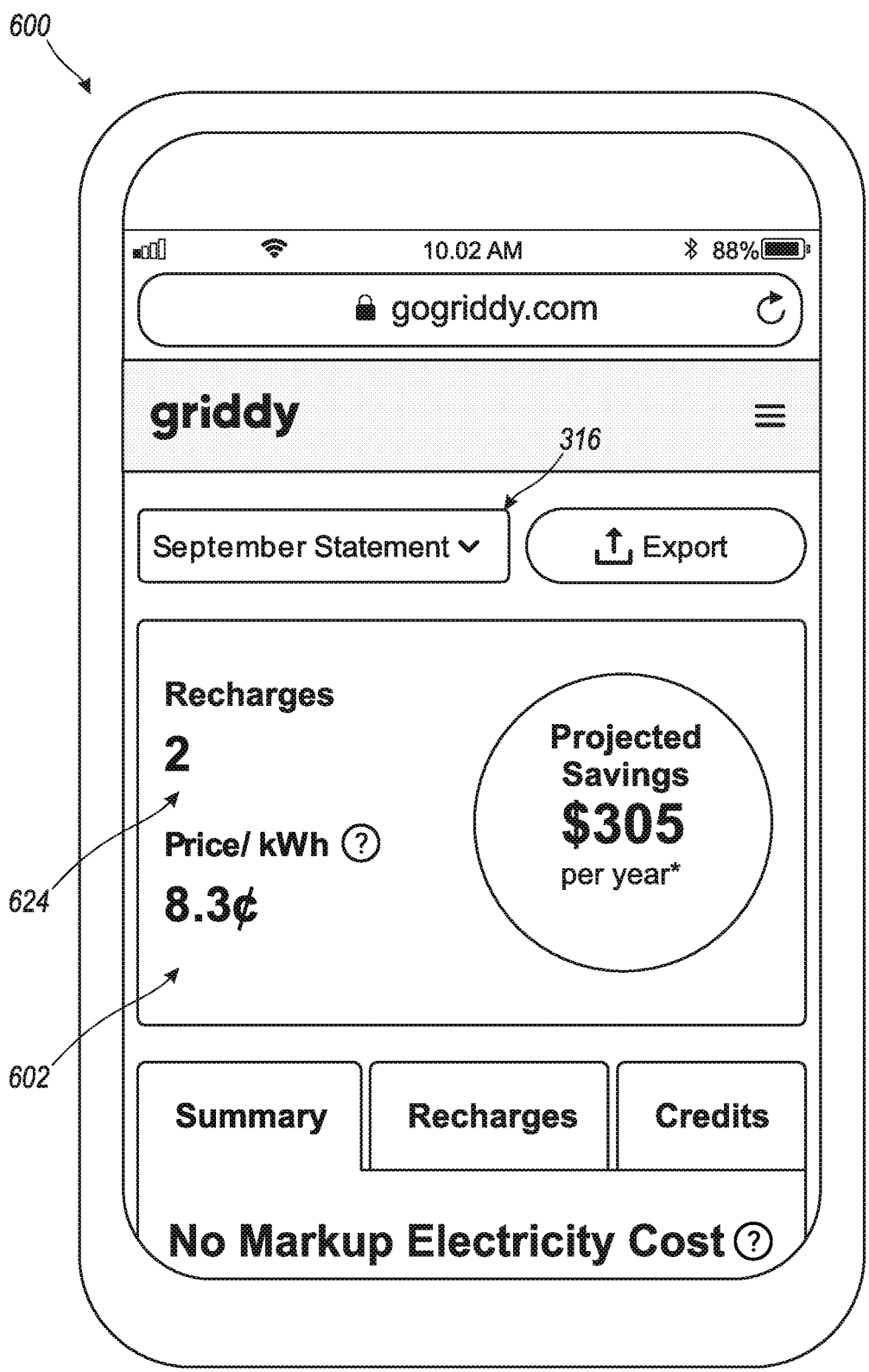
FIGS. 6C, 6D, and 6E depict further diagrammatic views of the user interface of the mobile applications in accordance with the present disclosure.
Figure 6D:
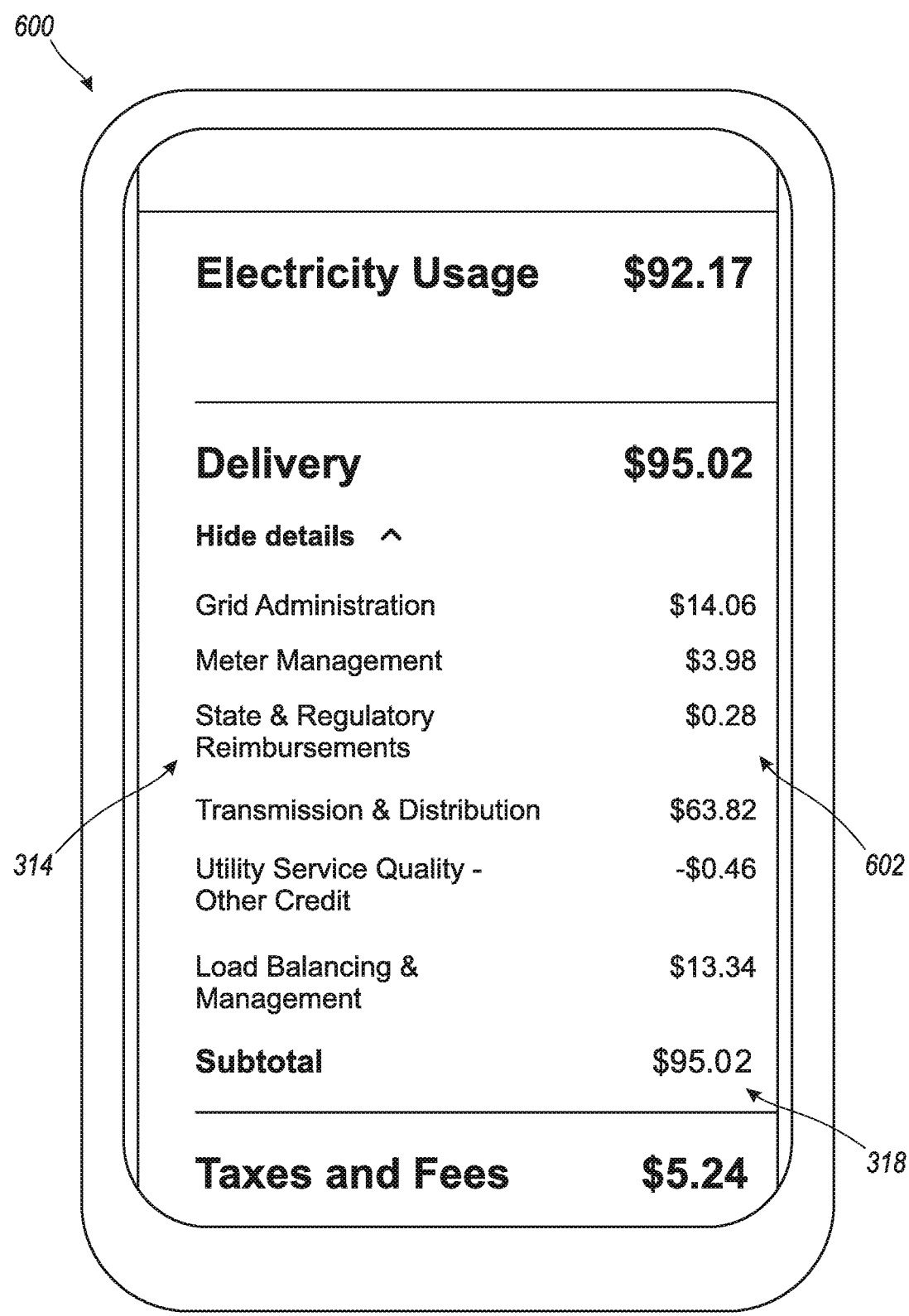
Figure 6E:
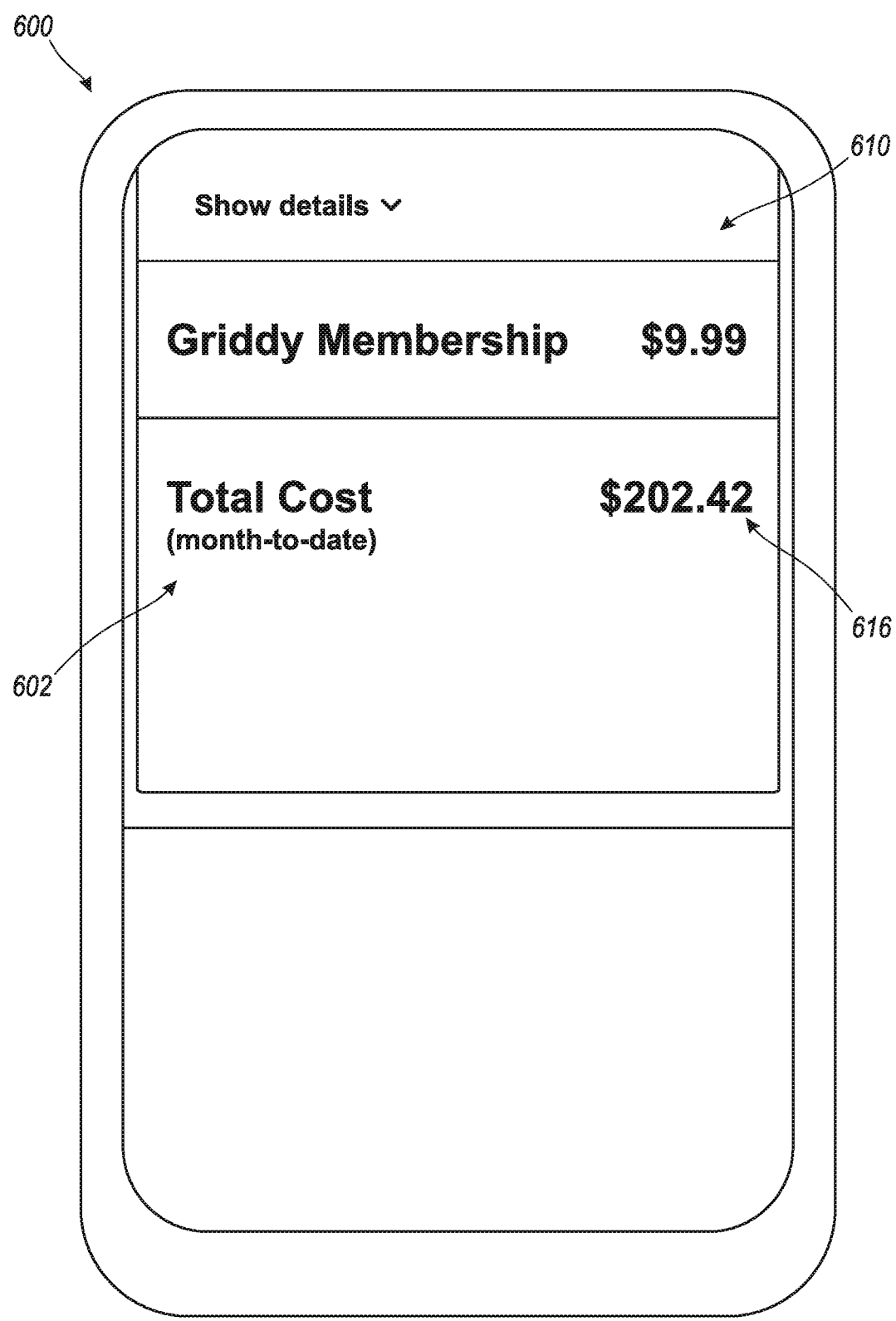

FIGS. 6A-6E depict a billing UI 600 for a mobile app 122 for a utility marketplace platform 100. A billing UI 600 may include a summary section 602 and a cost breakdown section 604. A summary section may include a composite rate 606 and a total price paid for energy 608. A cost breakdown section 604 may include a membership fee 610, wholesale green energy costs 612, poles and line cost 614, taxes and fees cost 616, points redeemed 618 and the like. As depicted in FIG. 6B, a billing UI may also include a monthly summary section 620. A monthly summary section 620 may include a starting monthly balance 622, a monthly energy cost 624, a top-offs cost 626 and a monthly ending balance 628. A billing UI 600 may also include menu items. Menu items may include a points menu item 312, a cost usage menu item 314, a billing menu item 316 and an account balance menu item 318.

Figure 7:
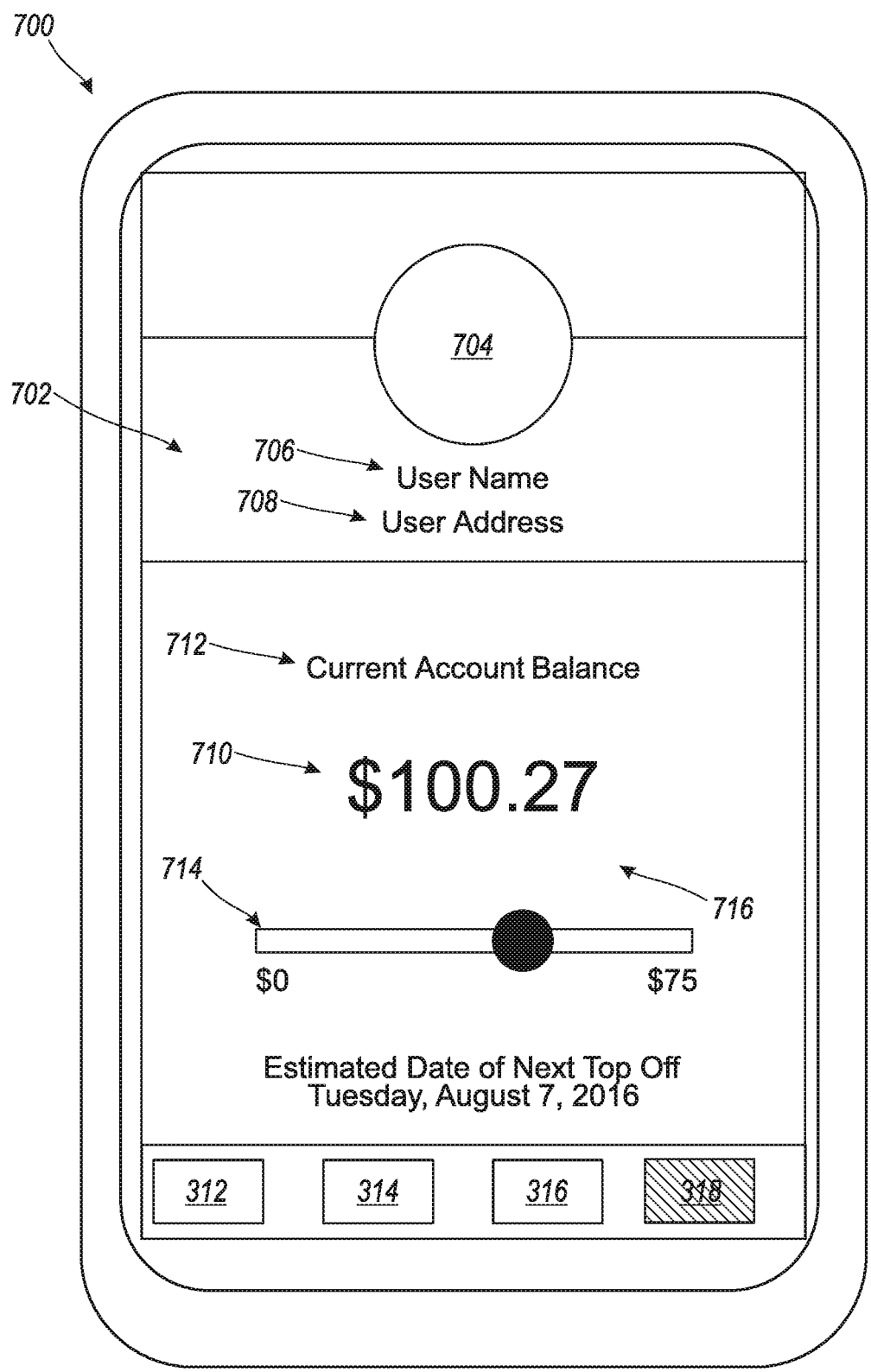
FIG. 7 depicts a diagrammatic view of a user interface of a mobile application showing account balance information for an account of a user of a utility marketplace in accordance with the present disclosure.

FIG. 7 depicts an account balance UI 700 for a mobile app 122 for a utility marketplace platform 100. An account balance UI 700 may include a user profile information section 702. A consumer profile information section 702 may include a user picture 704 a user name 706 and a user address 708. An account balance UI 700 may also include an account balance section 710. An account balance section 710 may indicate a current account balance 712, an indicator slider 714 and an estimated date of the next top-off of a user account 716. An account balance UI 700 may also include menu items. Menu items may include a points menu item 312, a cost usage menu item 314, a billing menu item 316 and an account balance menu item 318.

Figure 8:
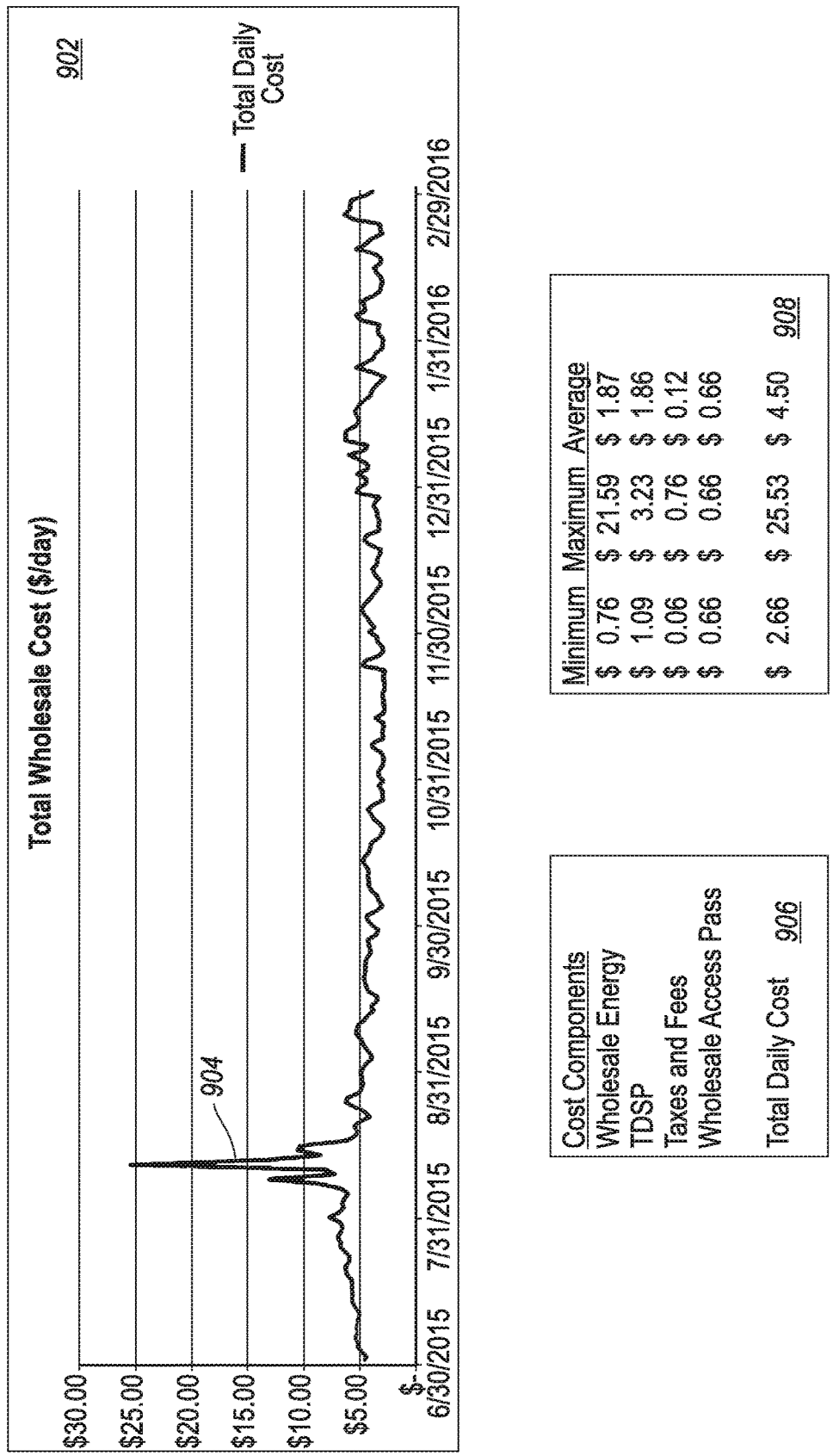
FIG. 8 depicts a diagrammatic view of a price analysis view showing cost components of a wholesale energy cost in a utility marketplace in accordance with the present disclosure.

A utility marketplace platform 100 may include wholesale price analysis, as depicted in FIG. 8. Wholesale price analysis may include a total wholesale cost 902. Total wholesale cost 902 may be represented by a wholesale cost trendline 904. Wholesale price analysis may also display cost components 906. Cost components 906 may include wholesale energy costs, TDSP costs, taxes and fees costs, wholesale access pass costs and a total daily cost. Wholesale price analysis may include cost breakdowns 908.

Figure 9:
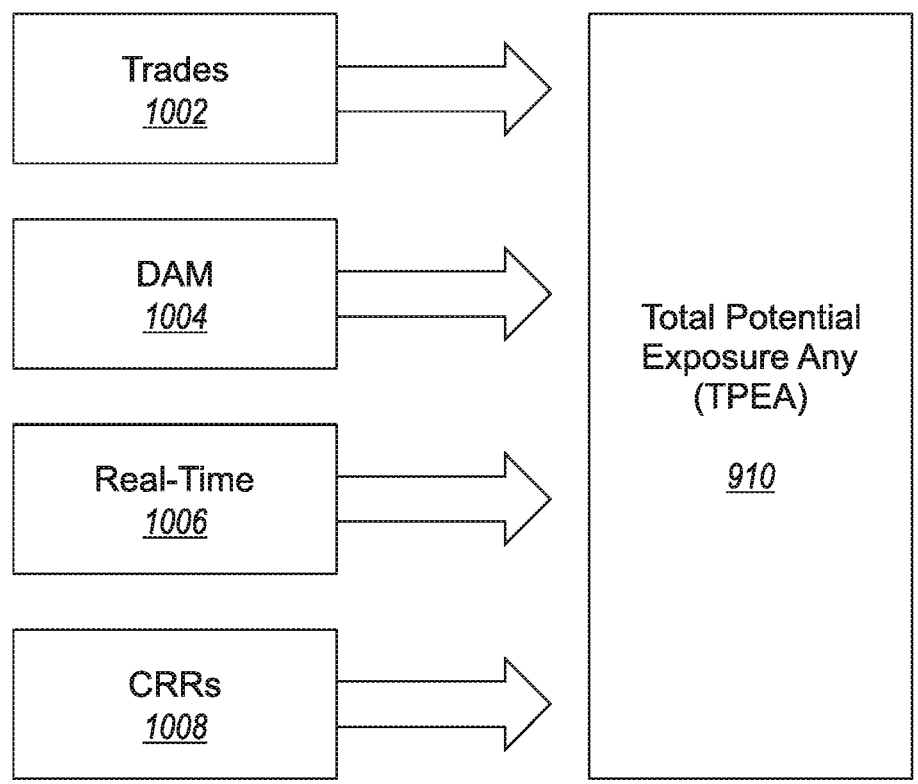
FIG. 9 depicts a diagrammatic view components of a total potential exposure analysis relating to a utility marketplace in accordance with the present disclosure.

Pay-as-you-go billing may offer unique protections against both credit and collateral risk. As previously described, a consumer 132 may be required to establish an account balance upon establishing an account on a utility marketplace platform 100. The consumer account may be recharged when the balance becomes reduced below a specified threshold. This pay-as-you-go billing structure may reduce total potential exposure (TPE) of an ISO. TPE is calculated by adding the unsecured credit limit of a consumer to the financial security of a consumer. An operator of a utility marketplace may only be subjected to total potential exposure any (TPEA) 910, as depicted in FIG. 9. TPEA 910 may be based on the settlement impact from various market activities. Various market activities may be trades 1002, day-ahead market (DAM) 1004, real-time pricing changes 1006 and congestion revenue rights (CRR) 1008.

In embodiments, other activities outside of a utility marketplace may be optimized based on information from the marketplace platform 100. This may include optimizing rooftop solar generation usage based on real-time retail energy market information. Because solar output may be favorable in the platform, it may make sense for consumers to optimize usage of rooftop solar generation at the home (or other local production capabilities, such as small-scale wind, geothermal and hydro-power), where consumption is behind the meter, rather than exporting energy to the grid, depending on price signals and current/projected usage. For example, the platform 100 might signal to a consumer to either consume its own energy, store it, or provide it to the grid, based on pricing conditions and other factors known in the platform 100. In embodiments, this may include optimizing across multiple local solar generators to get the best cost for the participating members. This in effect can be an optimized, virtual grid, which may comprise an element of a larger set of sources of supply that are understood by the platform 100.

In embodiments, the platform 100 may include extensions to further help consumers reduce or optimize energy consumption. For example, given that a price signal is handled in the platform 100, an extension of the platform 100 may provide control of devices 198 in a user's home remotely to react to price signals. This may occur in the mobile application 122 by a device control interface 190 or automatically under control of the platform 100, including through one or more device APIs 192, which may include APIs provided by one or more device manufacturers or installers 196 for control of devices). An example of a device that may benefit from control of usage timing is an electric vehicle, which if used frequently can double or treble the electricity usage of an average household, depending on when it is used. In embodiments, a household may be armed with a battery (e.g., a Tesla Powerwall™ battery), in which case electricity use control can be important, including cases where the user has its own energy generation (e.g., solar) and other cases where storage may be useful. Such embodiments can extend to include other high energy consuming devices in the home, such as the water heater, A/C systems, heating systems, dishwasher, dryer, and washing machine, among others.

In embodiments, the savings enabled by the platform may be sufficiently great to allow coverage of the capital cost of providing a battery, an electric vehicle, or the like. In embodiments, the platform 100 may be extended to provide control over such systems, which may be provided to members (or financed by financiers or manufacturers), such as under a fixed fee structure, or the like. In embodiments, financiers/manufacturers 196 may bid (such as through a bidding system 194 of the platform) to supply such items to members, who can choose to select them. Thus, the platform 100 may include a market pricing algorithm and matching system to match equipment suppliers with users, then manage individual energy use throughout the life of that product. As such, the platform 100 may extend to form an energy and transport supply platform 100, without requiring the operator to own a power station or electric vehicle.

In embodiments, a smart home system, such as a system that enables interaction among and control of home systems, such as energy-related systems (e.g., heating, air conditioning, ventilation, sunlight control, and the like) may interface with an energy marketplace platform to enable automated demand management of energy provided over a consumer energy distribution network, such as an electricity grid. Energy providers, may send production source information, such as the types of raw energy being used or predicted to be used to provide energy over the energy distribution network, to the platform. This information may be used by the platform to coordinate with smart home systems and the like to automatically adjust energy demand. By signaling to a home control system when energy costs are low/high or when distributed energy from raw renewable energy is or is predicted to be available, a home system may adjust demand of energy consuming systems in or associated with the home. In an example of automated demand management, energy from wind may be estimated to be available at a future time, thereby offering the option of reducing consumption of energy from other/non-renewable sources. This future availability of wind-based energy may be signaled to the platform that may coordinate with a home system to adjust operation of energy consuming devices, such as heating and cooling systems and the like to best use the renewable energy. IN another example, during a summer cooling season, a forecast of sunlight may also signal available solar-based energy being available over the distribution network. This combination of availability of energy and sunlight may be coordinated with a home control system to close automated window covers (e.g., skylight shades and the like) during the intense sunlight while adjusting the timing and/or operation of the home's air conditioning system to leverage the renewable energy.

In embodiments, a smart home system may further coordinate with the platform for optimizing a benefit to the home owner of returning energy generated by an energy production system under the homeowner's control (e.g., solar panels and the like) to the energy grid (e.g., electricity generated by solar panels, stored electricity, and the like). Energy costs, and therefore reimbursement from an energy company for providing energy to the grid by a homeowner may be affected by demand, typically being higher when demand is higher. Therefore, by providing demand-related signals from the platform, such as based on demand information captured by the platform from participants in the platform and the like, a smart home system may control timing of producing, storing, and returning energy to the grid. In an example, returning energy to the grid when energy costs (e.g., driven by demand) are high may provide a greater financial benefit to the homeowner than returning energy to the rid when energy costs are low.

Users of the platform may include customers with their own power generating capacity, such as from rooftop or other solar energy systems, as well as other systems such as small-scale wind power, hydropower, or geothermal power. References to solar power generation should be understood to encompass these other types of renewable energy generation, except where context indicates otherwise. Armed with price signals, customers with power generating capacity can manage usage in response. For example, if real-time prices are high, customers may reduce usage and increase electricity exports. Also, if the customer participates in the day ahead market (committing to provide energy the next day when tomorrow's prices are high), the customer has the option to, when the hour approaches and real-time prices are lower, consume energy in a normal way, buy back the generation sold the day before in the day-ahead market, and capture the benefit. The rooftop solar installation market has become highly competitive, essentially comprising a commodity (like many sources of electricity supply). In embodiments, solar installation and ongoing optimization may be undertaken using the platform 100. Installers/financiers 196 may bid to supply/manage installations to consumers 132, and the operator of the platform 100 may optimize with price signals the best economic outcome, taking into account grid prices versus battery storage capacity versus electric vehicle charging needs, household consumption needs, and the need to export to the grid, as the case may be.

Thus, the platform may factor in, and optimize, various forms of generation, in particular rooftop solar but also including technologies such as nano-paints, solar windows etc., as well as small scale wind energy, bio-energy, hydropower, thermal energy, and the like.

The platform 100 may also factor in the presence and availability of various storage technologies, such as batteries, phase change materials, and building materials, so that the system becomes a total energy management platform 100.

Figure 10:
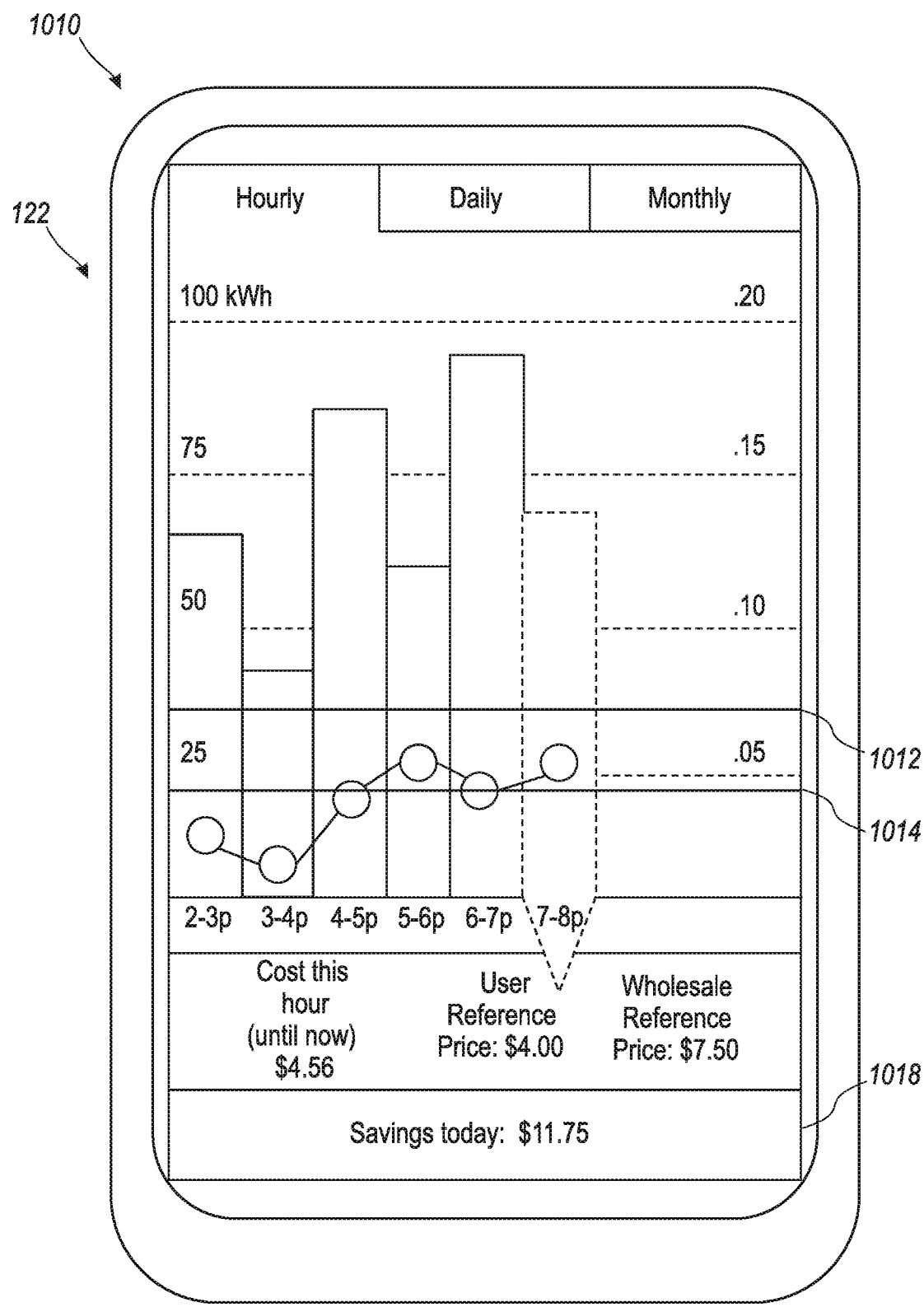
FIG. 10 depicts a diagrammatic view of the user interface of a mobile application providing constant price comparisons between a real-time price and a reference price in accordance with the present disclosure.
Figure 11:
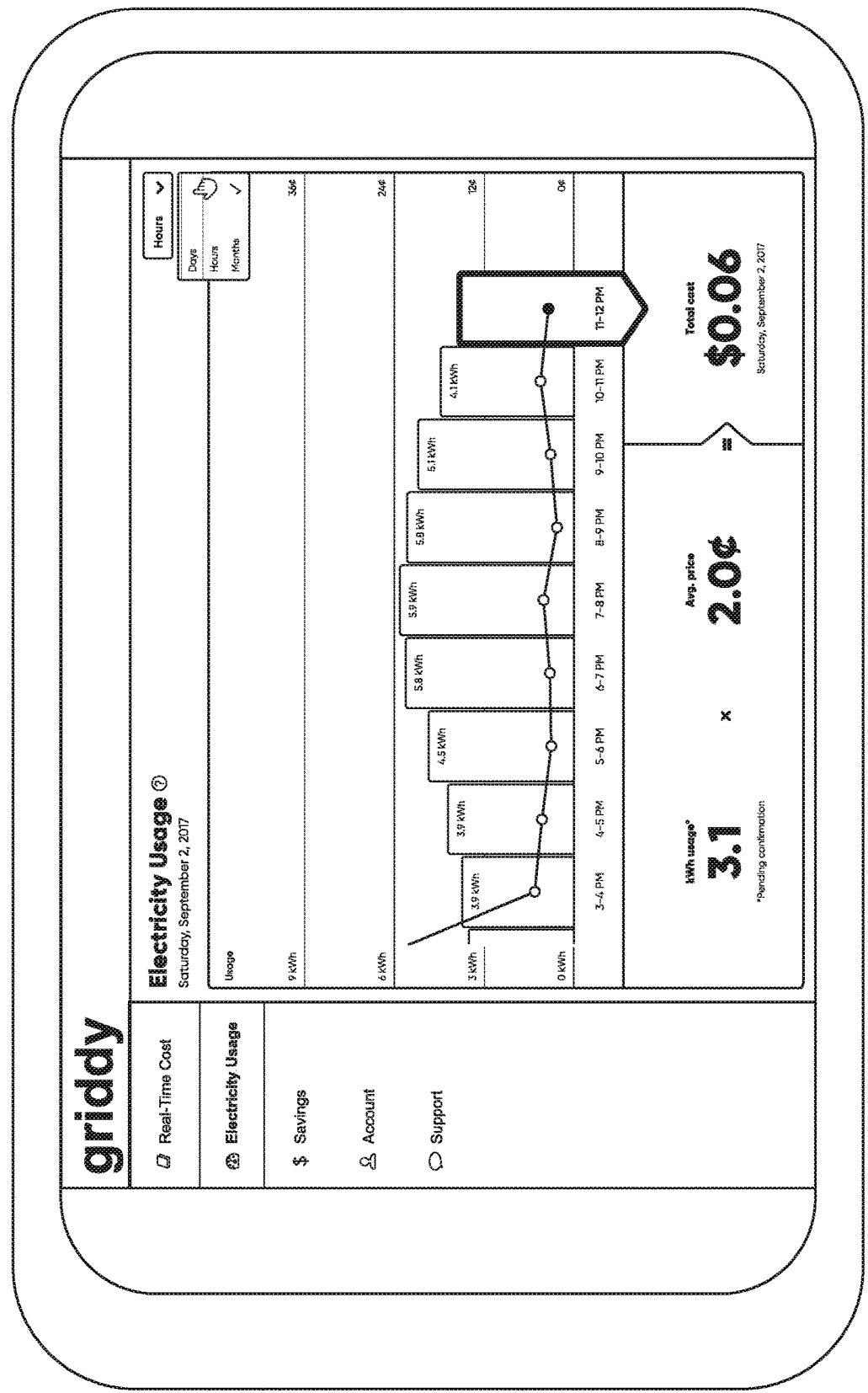
FIG. 11 depicts a diagrammatic view of the user interface of a mobile application providing electricity usage and costs over predetermined time intervals in accordance with the present disclosure.
Figure 12:
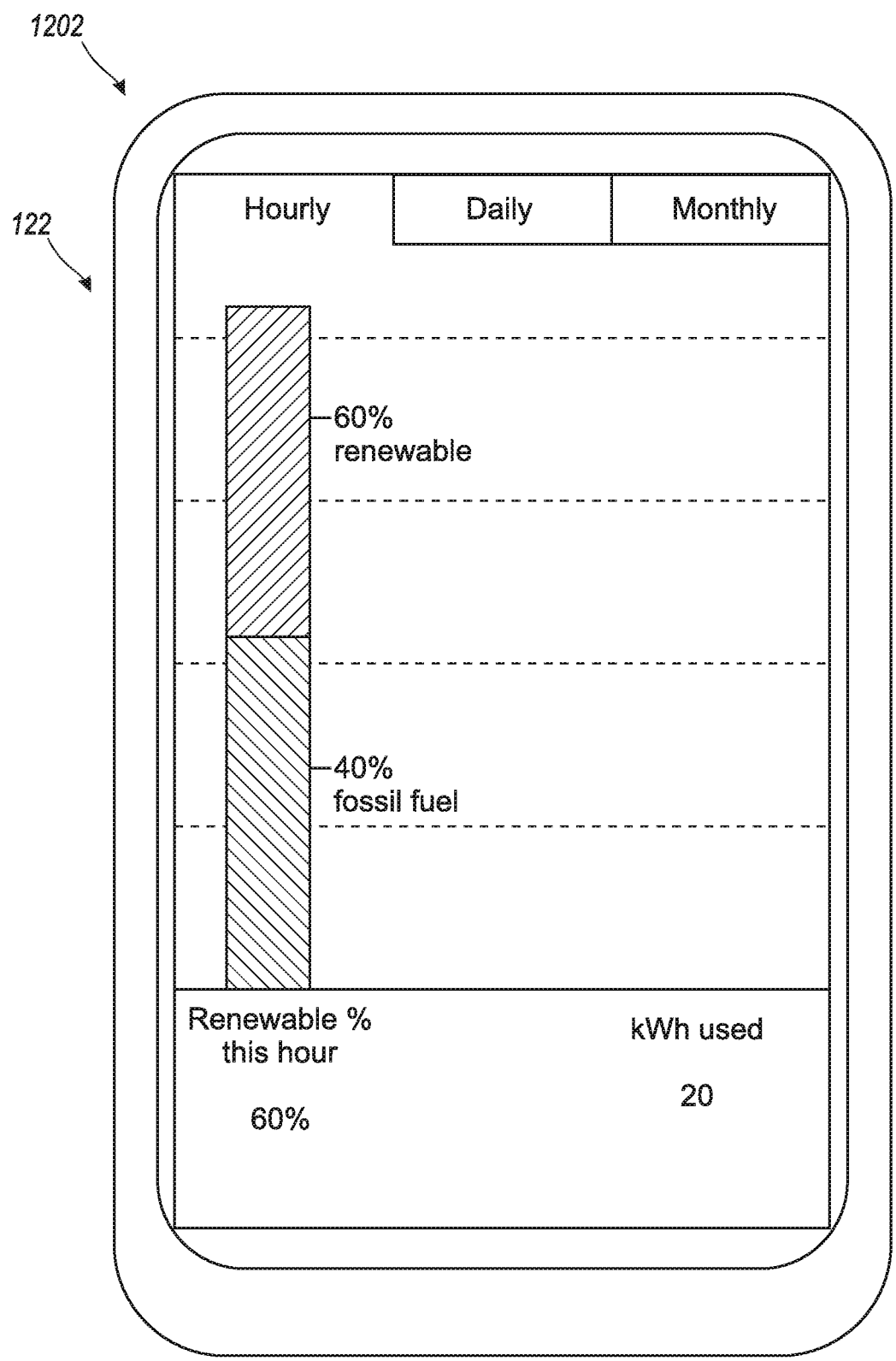
FIG. 12 depicts a diagrammatic view of the user interface of a mobile application providing a mix of electricity usage over predetermined time intervals in accordance with the present disclosure.
Figure 13A:
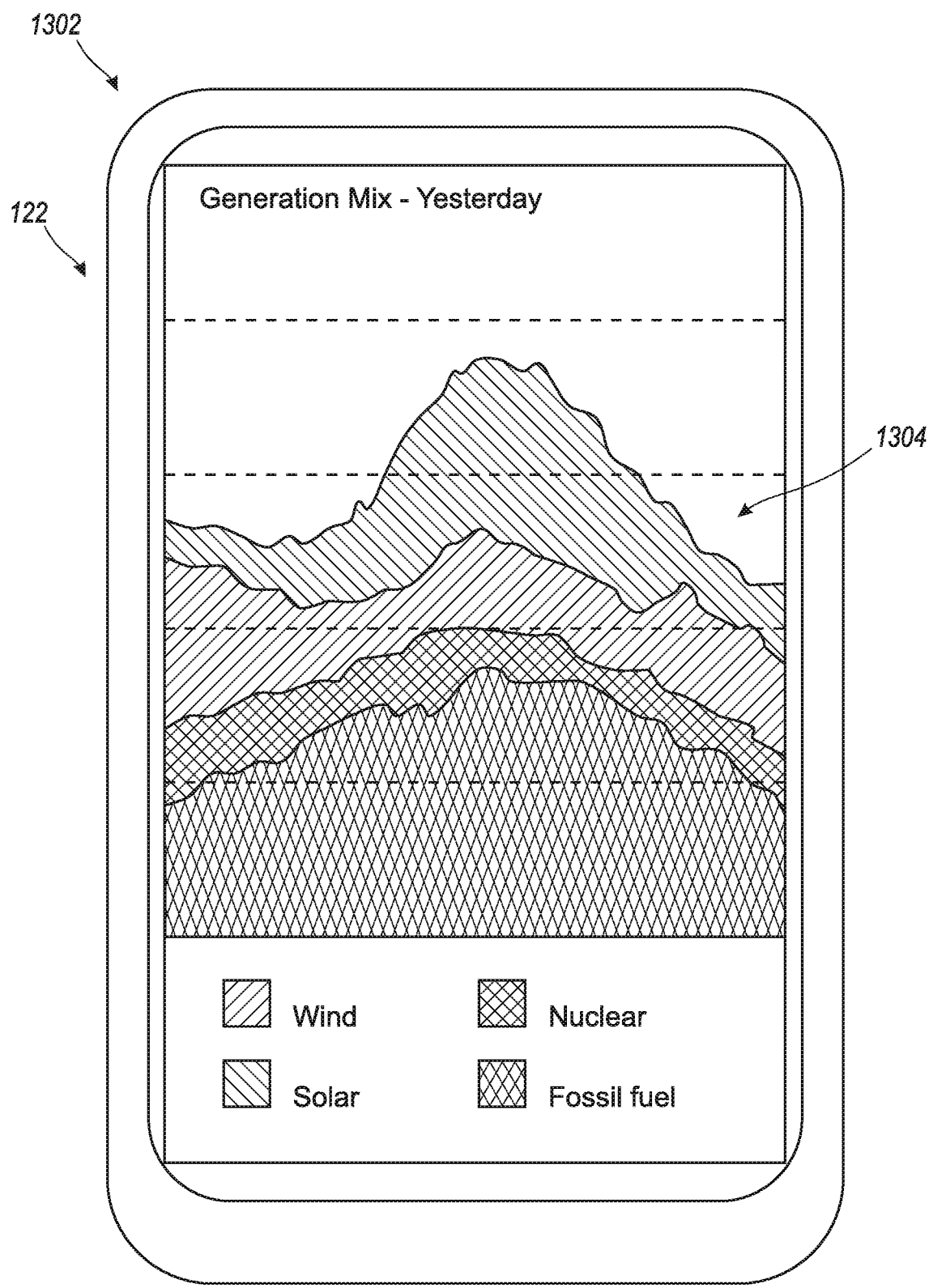
FIGS. 13A, 13B, 13C, and 13D depict a diagrammatic view of the user interface of a mobile application providing a mix of energy production over certain days or times of day in accordance with the present disclosure.
Figure 13B:
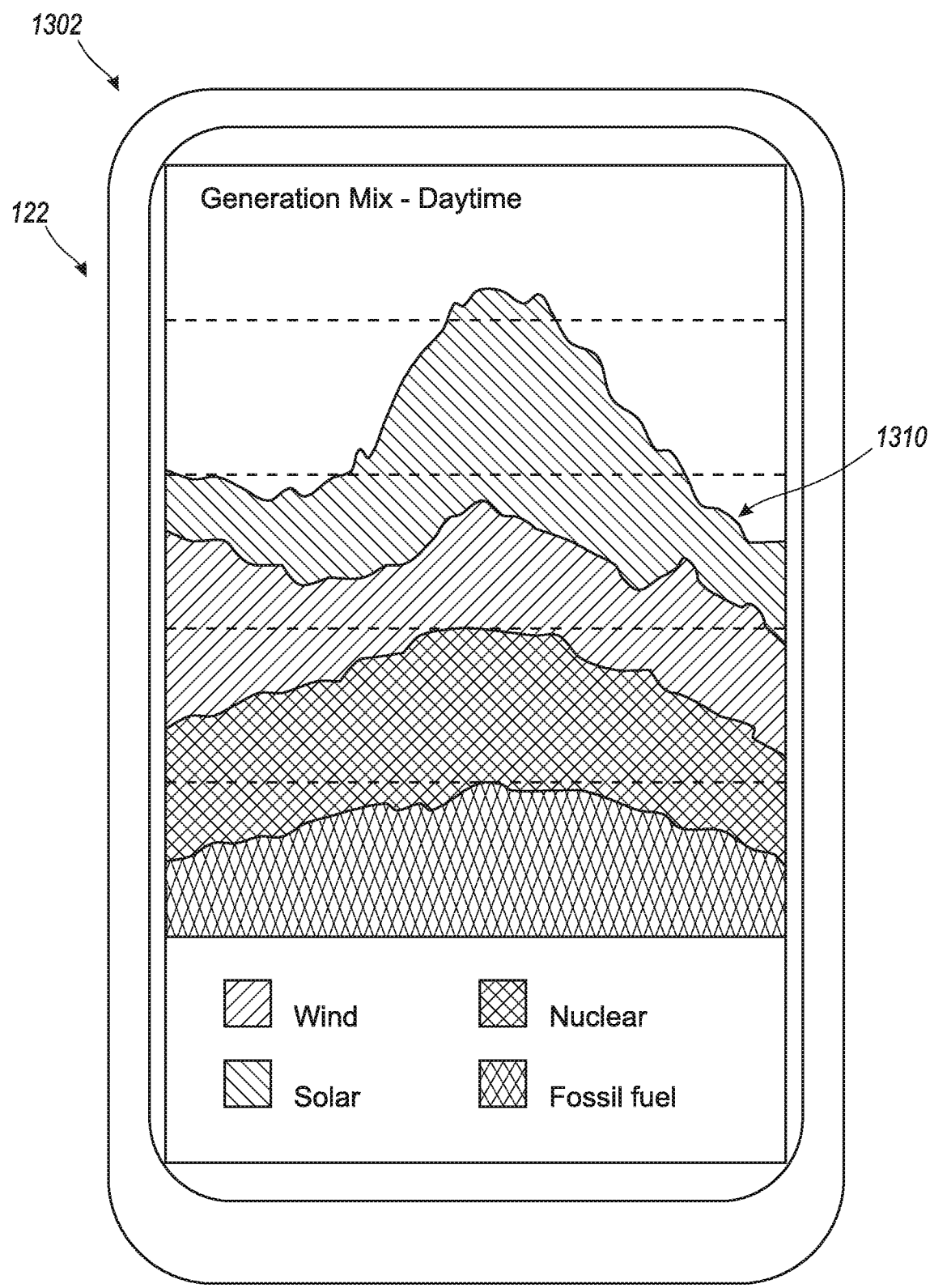
Figure 13C:
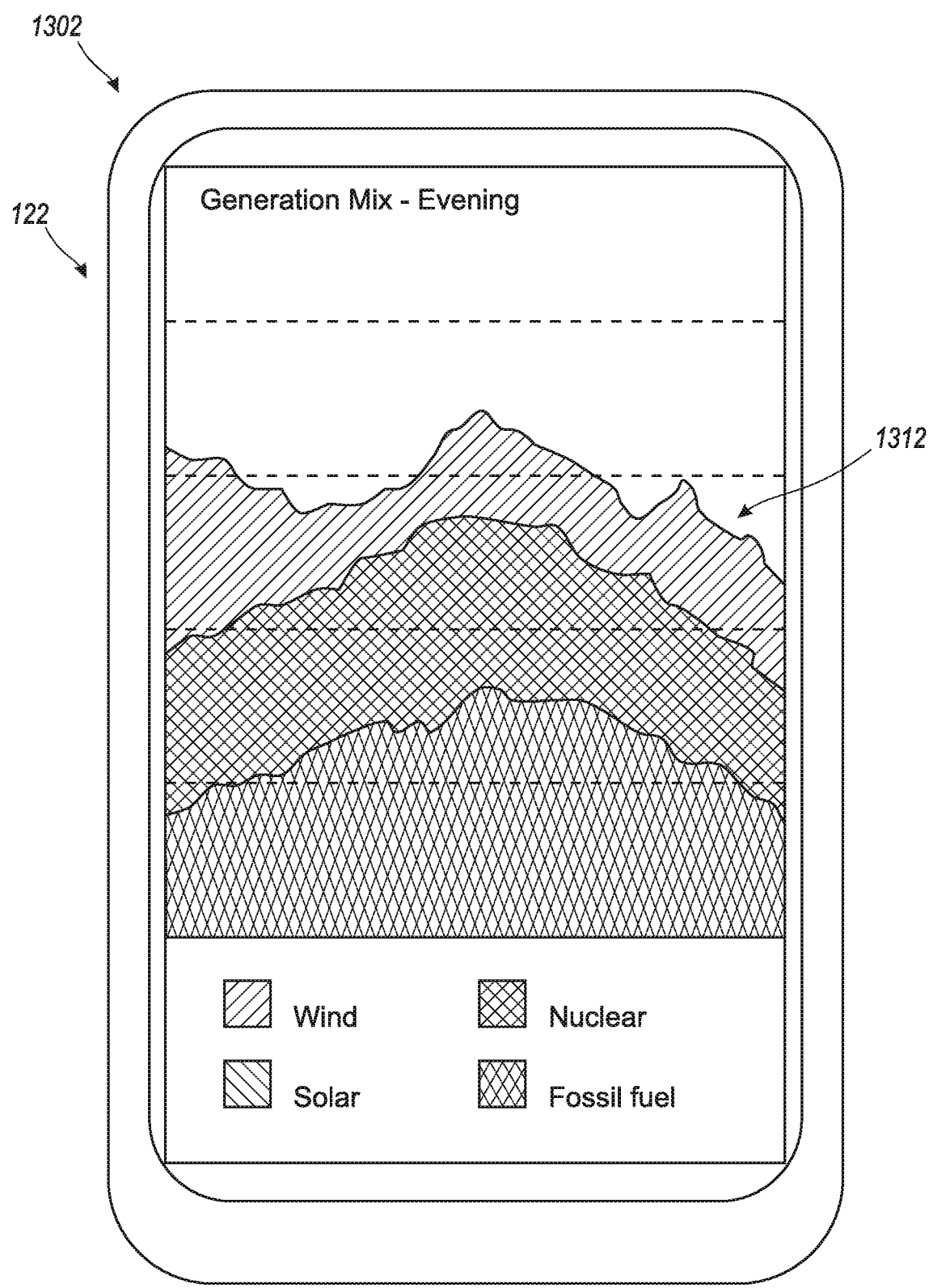
Figure 13D:
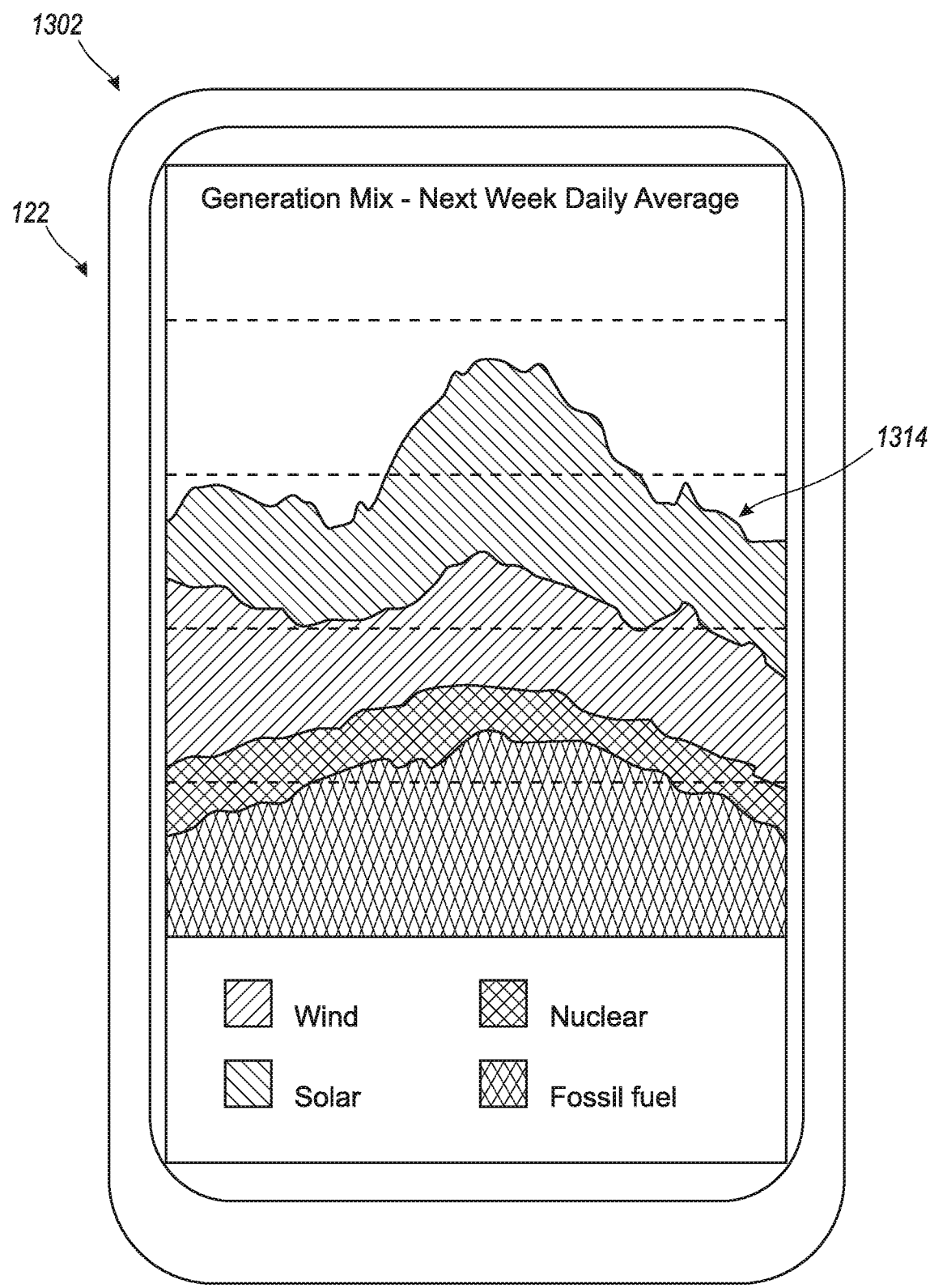
Figure 14:
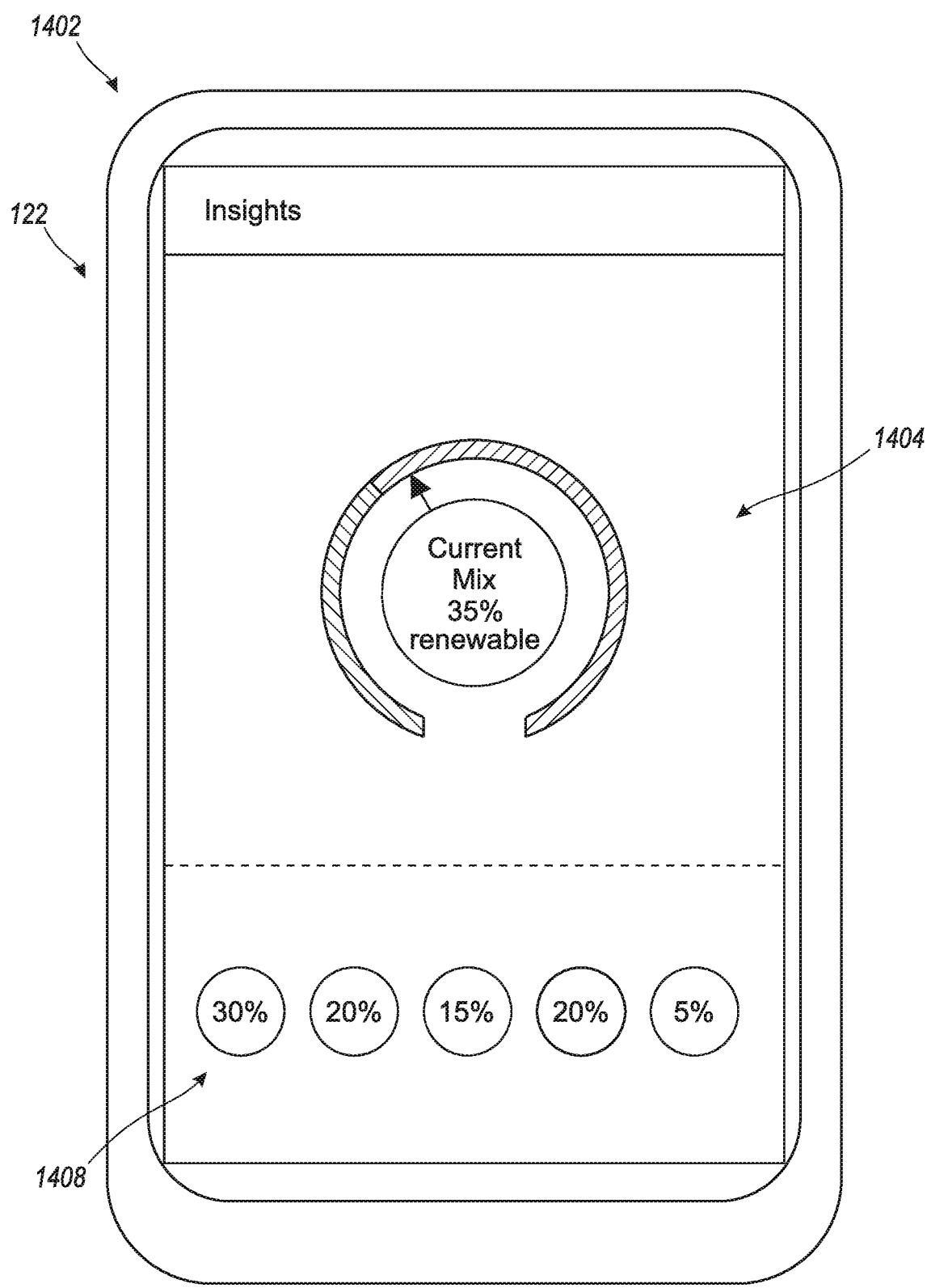
FIG. 14 depicts a diagrammatic view of a user interface of the mobile application providing a current mix of renewable energy production in accordance with the present disclosure.
Figure 15:
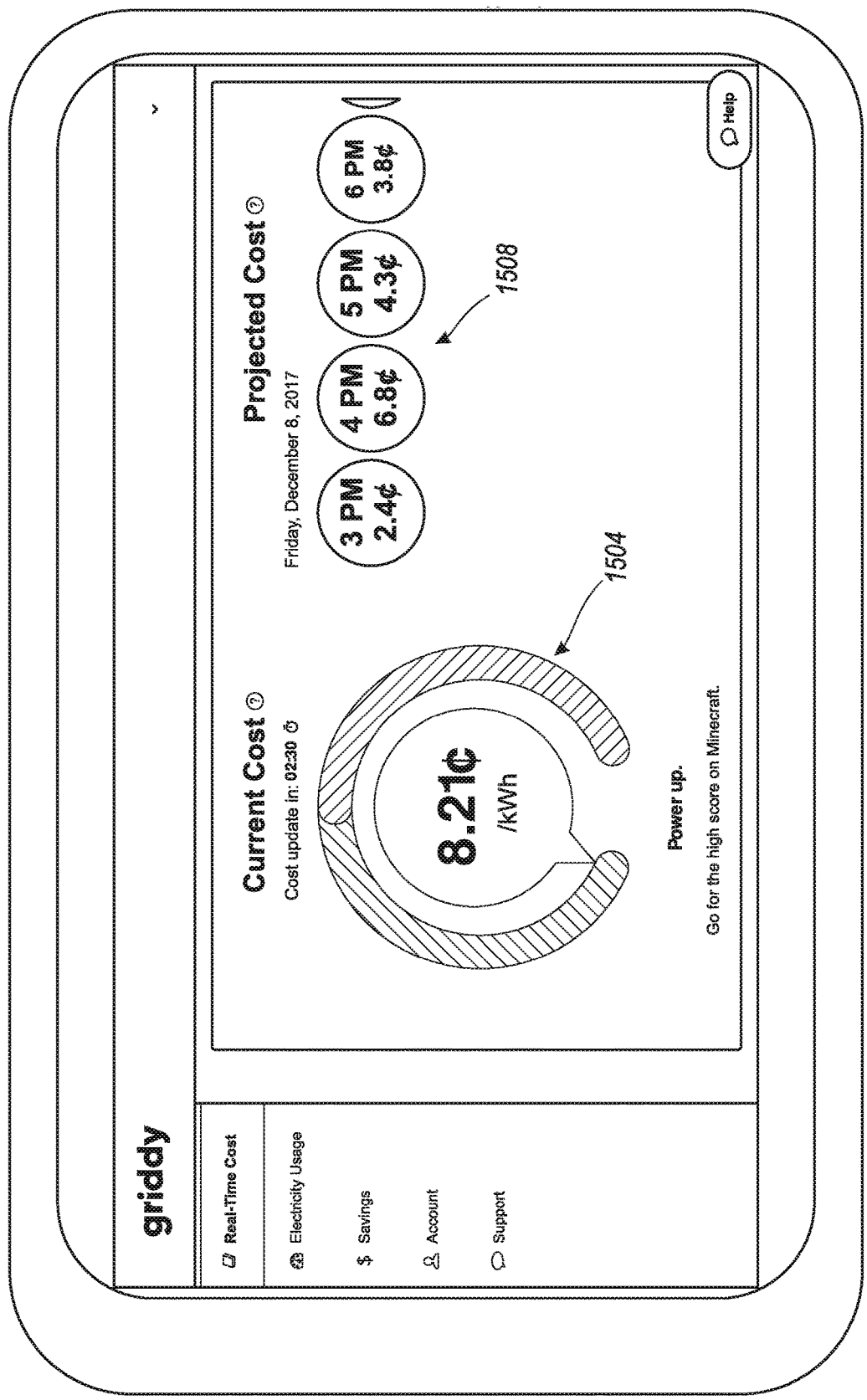
FIG. 15 depicts a diagrammatic view of a user interface of the mobile application providing a current cost and project cost information in accordance with the present disclosure.

FIG. 10 depicts a price comparison and reference screen 1010 for a mobile app 122 for a utility marketplace platform 100. A comparison may be made between a current price of energy and one or more reference prices. For example, a screen may show comparison of current cost to a wholesale reference price 1012, such as established by the average price by volume of the top five energy wholesale providers in that specific geographical area, or the like. Similarly, the reference price may be a user reference price 1014, such as showing the average price the user has paid for energy when using the platform. Various reference prices can thus allow a user to determine whether the current price being paid is relatively high or low, as compared to the general energy market price and/or the user's own experience. The comparison information can include additional information, such as the consumer's savings 1018 (e.g., by day, by month and by year), such as measured against the reference price. Reference prices may take various forms, such as including rolling averages, such as an average price paid by the consumer over a defined period (e.g., three months), a rolling average wholesale energy price over a defined period, and the like. Reference prices may be aggregated across providers or shown separately for each provider. Comparison may also be by device, such as showing the cost of energy used by a given appliance, vehicle, or the like, compared to others and compared to reference prices.

In embodiments, a savings calculator may combine various cost metrics to produce a savings estimate based on actual charges for energy consumes in real-time. A savings may be calculated for each time interval for which the various cost metrics are available and may be accumulated over time to generate a running savings calculation for a consumer of energy over a retail energy distribution network or grid. In an example, real-time whole rates for energy may be compared to a benchmark rate, such as fixed average rates for each time interval. A savings calculation may be a result of referencing these rates and the actual rates experienced. A savings for each time interval may be calculated and displayed in a user interface. A running savings total over time may also be calculated and displayed. In embodiments, such a savings calculation may indicate a potential savings available to the consumer based on actions taken by the consumer, such as by the user selecting one or more sources of raw energy and the like.

The various embodiments disclosed herein produce data that can be mined for a myriad of value-producing purposes, including device design by manufacturers, device selection and replacement at the consumer's home, grid management by the ISOs, and power station optimization. Home automation of energy use can be effected through increased control (such as enabled by the IoT), using information from the platform. Also, investment in grid infrastructure (such as new peak load investment as infrastructure needs replacement and new infrastructure projects reflect changes in population densities and usage habits) can use information from the platform 100, such as to predict changes in peak demand that may result from aggregate changes in user behavior. In embodiments, real time data mining may be used to better match generation operation with load demand, sidestepping or complementing the conventional ISO function of using marginal cost to balance the grid. Also, as rooftop solar becomes a bigger part of the energy mix in high solar markets, data collection on the generation side at the home can be collected, aggregated and fed into the real-time generation/load balancing process.

In markets where deregulation has not as yet taken hold (such as California and many other US states), utilities supply power on a regulated basis, meaning the price is set and approved by the regulator from as short as monthly to as long as once per year. Utilities often have some recognition of the need for time of day-based pricing blocks, but these blocks typically lack immediate reference to real-time market prices; instead, they rely on a backward looking formula to approximate when load is likely to exceed conventionally priced generation. However, these blocks often lag real changes in generation and load profiles, sometimes by years. This has been true, for example, in California, where there are many cases of actual negative wholesale prices (such as during good solar generation times of the day), but the utilities still have peak load pricing at those time.

Also, the utilities often use multiple tariff structures (e.g., a utility may offer as many as 1,000 or more different residential plans across its territory, including multiple plans for residential customers, which in turn are different if the customer has solar on the roof, which in turn are different depending which district the customer lives in). There is typically no automatic process to put the customer on the best tariff, leaving the customer to choose a plan that may or may not be the best fit for the consumer. In embodiments, the platform 100 may help facilitate the billing process for a consumer, including putting the consumer on the plan that comes closest to approximating a more frequent (e.g., hourly) price signal. This can provide value to consumers even where pricing is fixed over longer durations of time.

In some cases, states that otherwise regulate electricity prices allow Consumer Choice Aggregator (CCA) programs that may allow an operator of the platform 100 to offer a changing price product (such as a pay-as-you-go product) as an alternative for a consumer to buying from a regulated utility.

Figure 16:
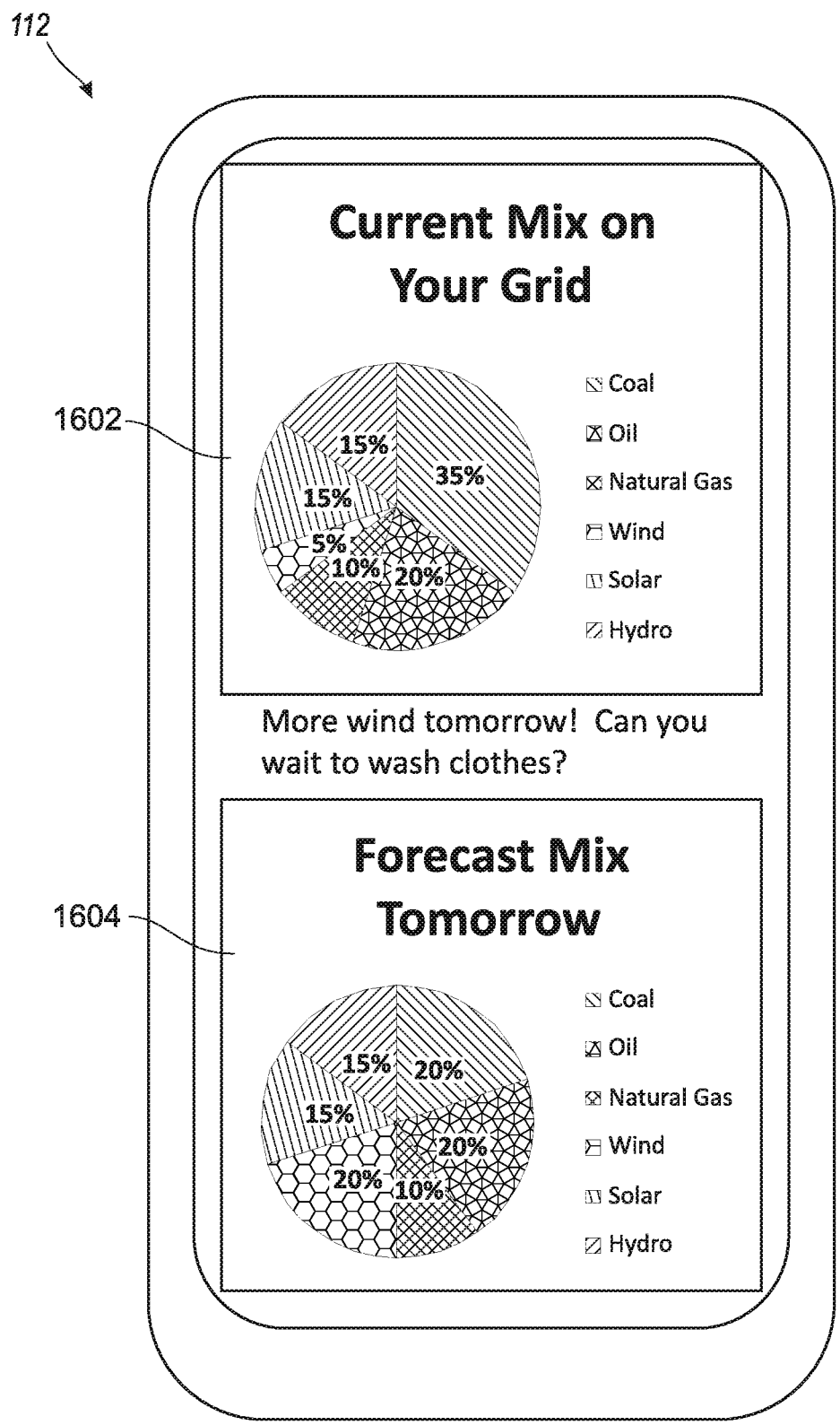
FIG. 16 depicts a diagrammatic view of a user interface of the mobile application providing a current mix on the grid forecasted mix on the grid for energy production in accordance with the present disclosure.

Referring to FIG. 16, an embodiment of a user interface of the mobile application is provided in which a consumer 132 is presented with a visual display showing a current mix 1602 of the raw energy sources being used to power the grid from which the consumer 132 is consuming power and a visual display showing a forecast mix 1604 for the following day. In this illustrative example, the platform 100 uses a weather forecast to anticipate the presence of more wind power within the raw energy mix on the following day and provides a message that informs the consumer 132 and prompts the consumer 132 to consider shifting a consumption activity (in this case washing clothing) to the following day, when the consumer is more likely to consuming energy produced by renewable energy.

Figure 17:
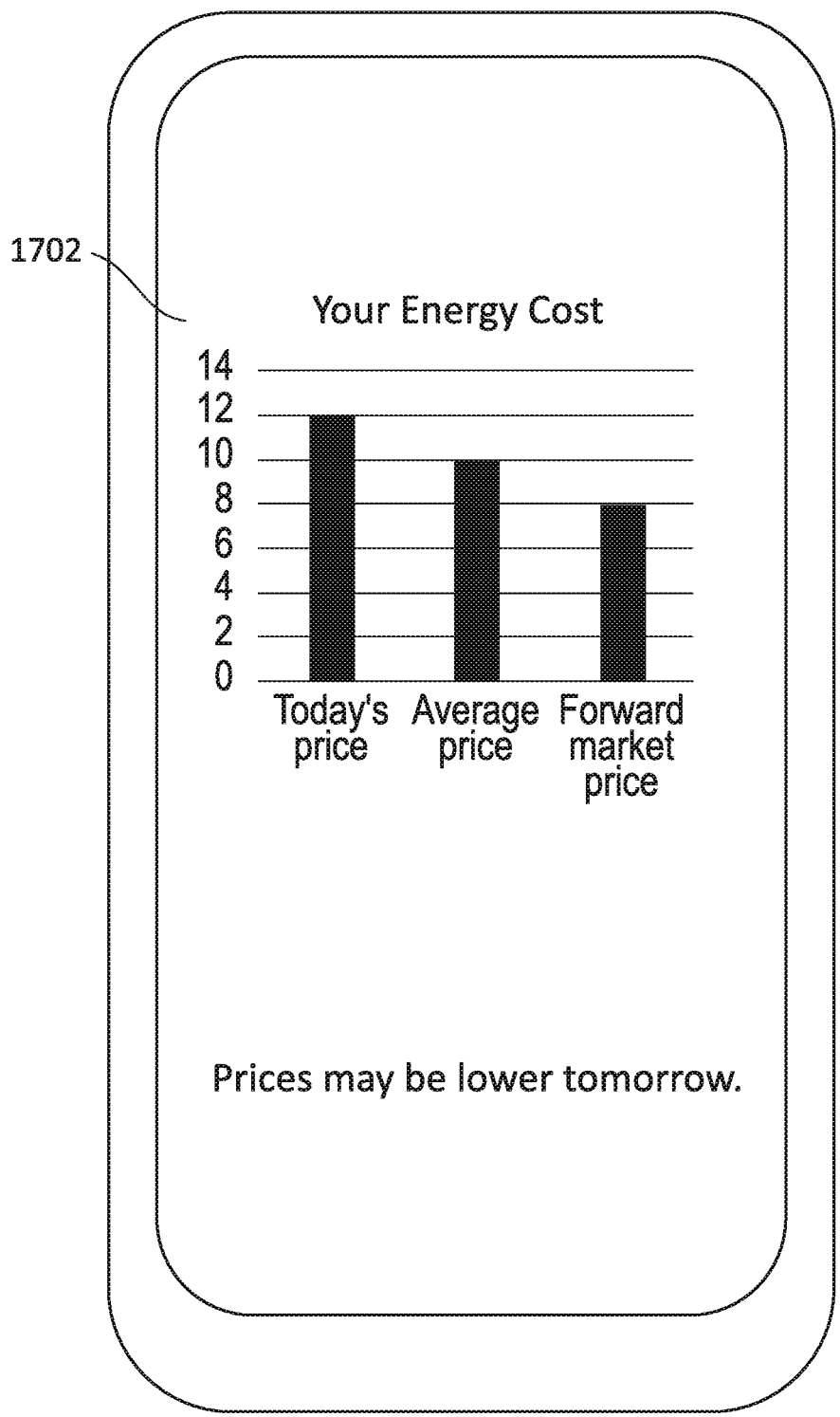
FIG. 17 depicts a diagrammatic view of a user interface of the mobile application providing a user energy costs including today's costs, average costs, and forward market costs in accordance with the present disclosure.

FIG. 17 shows an example of an interface wherein pricing for energy is displayed in a visual element 1702, with current, average, and forward market prices, along with a message about the prices that may prompt a user to consider time-shifting energy consumption. Similar displays may be provided at different time intervals, such as hourly intervals, minute-by-minute intervals, and the like.

Figure 18:
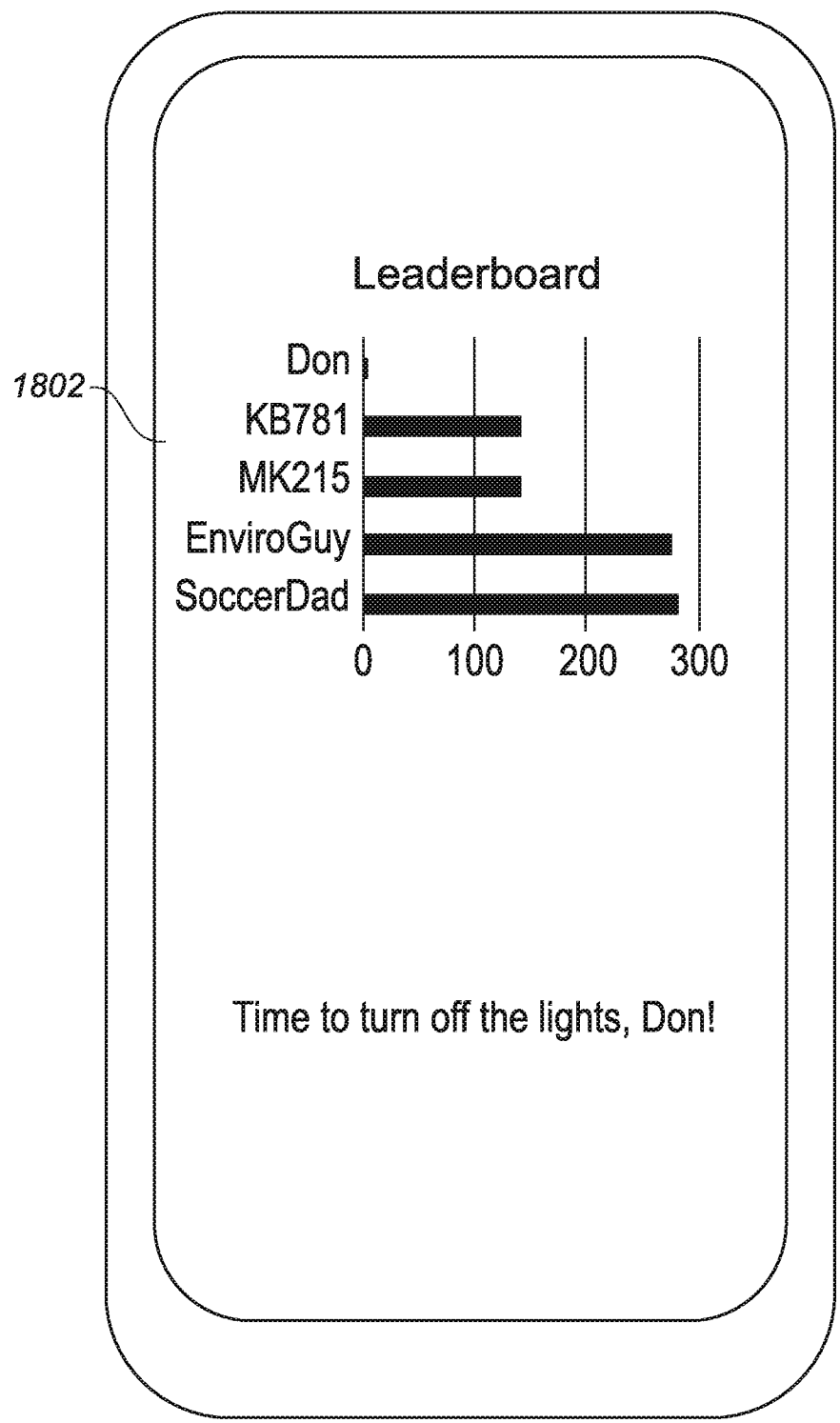
FIG. 18 depicts a diagrammatic view of a user interface of the mobile application providing a leaderboard for a gamification engine in accordance with the present disclosure.

FIG. 18 shows an example of an interface wherein a leaderboard 1802 is displayed, such as showing current standings for any of a wide variety of multi-player games as described herein, such as a consumption-based game. The interface may include a message, such as encouraging a player to take an action that may help achieve a higher score.

Embodiments of a machine learning engine 104 or artificial intelligence may include a wide variety of systems, including expert systems, model-based systems, deep learning systems, rule-based systems, and systems using various kinds of neural networks, as well as hybrids of the foregoing.

Feedback or inputs to machine learning systems can be collected from the various systems and components of or connecting to or integrating with the platform 100 as described throughout this disclosure and the documents incorporated by reference herein, such as the gamification engine 138, the recommendation engine 136, data from a data repository 104, one or more marketplaces, one or more systems tracking consumer behavior (such as using the mobile application described herein or consuming energy), and the like. Data may be collected using the Internet of Things, such as from cameras, sensors, or other devices located in a consumer's home, vehicle, or the like, such as to allow a machine learning engine 104 to learn about energy consumption behavior as indicated by recognition, classification, and/or prediction of states of consumer energy consumption behavior, energy consumption by particular appliances, devices, or systems, energy efficiency of particular items, patterns in energy usage, and the like.

In embodiments of the present disclosure, including ones involving expert systems, self-organization, machine learning, artificial intelligence, and the like, may benefit from the use of a neural net, such as a neural net trained for pattern recognition, for classification of one or more parameters, characteristics, or phenomena, for support of autonomous control, and other purposes. References to a neural net throughout this disclosure should be understood to encompass a wide range of different types of neural networks, machine learning systems, artificial intelligence systems, and the like, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic—neural network systems), Auto-encoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neo-cognition neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GCU) neural networks, auto encoder neural networks, variational auto encoder neural networks, de-noising auto encoder neural networks, sparse auto-encoder neural networks, Markov chain neural networks, restricted Boltzmann machine neural networks, deep belief neural networks, deep convolutional neural networks, de-convolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

In many embodiments, an expert system or neural network may be trained, such as by a human operator or supervisor, or based on a data set, model, or the like. Training may include presenting the neural network with one or more training data sets that represent values (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the conditions, states, and systems described throughout this disclosure, such as involving behavior of a consumer 132 in response to dynamic conditions, such as the shift of energy mix, energy pricing, situations in a game, weather, or the like.

Combinations among any of the pairs, triplets, or larger combinations, of the various neural network types described herein, are encompassed by the present disclosure. This may include combinations where an expert system uses one neural network for recognizing a pattern (e.g., a pattern in weather, a pattern in consumer behavior, a pattern in pricing for energy, a pattern in the mix of sources of energy available, a pattern within a game managed by the gamification engine 138, or the like) and a different neural network for self-organizing an activity or work flow based on the recognized pattern (such as providing an output governing autonomous control of one or more of the systems, workflows, or other components of the platform 100 in response to the recognized condition or pattern). For example, a neural network might recognize a pattern in consumption across a large group of consumers 132 that indicates a likely increase in demand for wind energy on the next day, and a second neural network may control a parameter of the system that promotes purchasing by a consumer 132 of the wind energy in a forward market, so that the consumer 132 is less likely to experience an adverse impact of an increase in the price that may result from the predicted shift in demand. Many such variations are possible and are encompassed by this disclosure, as would be understood by one of skill in the art. This may also include combinations where an expert system uses one neural network for classifying an item (e.g., identifying what item is consuming energy in a home) and a different neural network for predicting a state of the item (e.g., an energy consumption state, an operational state, a resting state, an anticipated state, or the like) or another state in the platform 100 (e.g., the likely position of the consumer who owns the item within a game managed by the gamification system 138). Modular neural networks may also be provided for situations where an expert system uses one neural network for determining a state or context (such as a state of a consumer 132, an energy consuming device or machine, a vehicle, an energy producing system, a market, the weather, or the like) and a different neural network for self-organizing a process involving the state or context (e.g., a data storage process, a gamification process, a user behavior process, a process within a user interface, a purchasing process, a consumption process, a production process, or many others).

In embodiments, a gamification engine 138 of the platform may support a wide variety of games, including challenge games (such as point-based games, extreme behavior challenges, reward-based games, content production challenges and many others).

In embodiments, the gamification engine 138 of the platform 100 may include a user interface that displays a leaderboard 1802 indicating the position of a consumer 132, such as one using the mobile application described herein, relative to other players in a game. For example, the leaderboard 1802 might show standings or final results for a gaming involving energy consumption. In embodiments, a game may involve overall consumption of energy, so that the consumer 132 with the lowest consumption wins. For such a game, the gamification engine 138 may provide rewards to the top player, to a top set of players, or the like. As the goal of such a game may be to help consumers generally reduce energy consumption, the platform 100 may experiment with different reward systems, such as varying total rewards, the pattern of allocation of rewards, and the like, to determine which reward patterns induce the desired outcome. This may include varying reward patterns using A/B testing, genetic programming, or similar techniques, where results from a set of trial games are returned to a system to select favorable approaches and de-select unfavorable approaches, so that favorable approaches emerge over time. In embodiments the variation and selection may be managed by the machine learning system 104. In embodiments, a game may be optimized by managing the gamification engine 138 under the control of or with input from the machine learning system 104, such as by having the machine learning system 104 learn to vary game parameters, such as user interface elements, reward allocations, timing of games, duration of games, and other elements.

In embodiments, the gamification engine 138 may enable a challenge-based game, where a consumer 132 or group of consumers 132 is challenged to achieve an objective, such as achieving a threshold level of energy consumption for a given time interval, achieving a given level of production of energy consumption for a given time interval, achieving a target fraction of utilization of renewable energy with in the mix of energy consumed by the consumer 132, achieving a reduction in the fraction of energy consumed from fossil fuels by the consumer 132, and the like. Challenges may include ones similar to "hyper-miling," where vehicle drivers attempt to achieve maximum levels of gas mileage by virtue of favorable driving patterns. This may include, for example, operating a household of a certain type with a minimal amount of overall energy consumption, operating a household with a minimal amount of fossil fuel energy consumption, achieving a set of regular tasks with the lowest amount of energy consumption for the most favorable fraction of renewable energy consumption, and the like.

In embodiments, the gamification engine 138 may enable content production challenges, such as contests in which consumers 132 are prompted to produce content that may be helpful in achieving one or more overall goals of the platform, such as reduction of overall consumption of energy or improvement in the mix of energy consumed by a group of consumers. This may include text content, such as essays, tweets, taglines, logos, and the like, as well as audio and visual content such as YouTube™ videos that may be presented to other consumers within the platform 100 to encourage favorable behavior. Such contests may also tend to improve the behavior of the participating consumers 132, as psychological research suggests that individuals tend to act in ways that confirm their prior statements in response to surveys. As with other games, variation of the parameters of a content production challenge (such as type and allocation of rewards, type of content produced, timing of the game, and the like) may be managed using machine learning 104 including based on feedback, such as based on the effect of content produced on behavior, the effect of running the contest on behavior, the effect of rewards on behavior, or the like.

In embodiments, the gamification engine 138 may enable question-based games (including surveys, quizzes, trivia contests, multiple choice questions, and others), such as contests in which consumers 132 are prompted to answer questions relevant to topics that may be relevant to one or more overall goals of the platform, such as reduction of overall consumption of energy, increasing production of renewable energy by consumers, improvement in the mix of energy consumed by a group of consumers, or the like. This may include questions on facts about energy consumption (such as relating to consumption by using particular devices or appliances, the effects of weather on energy consumption, and the like), energy conservation (such as relating to home insulation practices), energy production (such as relating to the mix of energy sources, the effects of weather on production and the like), impacts of energy usage (such as effects of burning fossil fuels, benefits of saving energy), the energy grid (such as helping understand impacts of reaching peak capacity, causes of blackouts and brownouts, and the like) and others. Such games may tend to improve the behavior of the participating consumers 132, as individuals acquire knowledge that may cause them to shift behavior (such as to an energy mix that is better for the environment, or to a consumption pattern that saves the consumer money spent on energy, in turn reducing peak demand for energy that may allow infrastructure savings for grid providers. As with other games, variation of the parameters of a question-based game (such as type and allocation of rewards, type of questions asked, topics covered, difficulty of questions, timing of the game, and the like) may be managed using machine learning 104 including based on feedback, such as based on the effect of such games on behavior, the effect of particular topics on behavior, the effect of allocation of rewards on behavior, or the like.

In various embodiments, challenge type games, quiz-type games, content production games and others, including ones with a leaderboard among a group of consumers (such as presented in a user interface of a mobile application or other user interface of the platform 100) may relate to specific consumption activities, such as challenging users to achieve a target level of energy consumption, a target level of energy reduction, a target fraction of renewable energy as a source, a target reduction in usage of fossil fuel as a source, or the like for a particular type of consumption, such as consumption for home heating, consumption for charging a vehicle (where the challenge may account for electricity used as well as gasoline in the case of hybrid vehicles), consumption for home cooling, consumption for refrigeration, consumption for hot water heating, consumption for appliances (collectively, or for specific appliances, such as ovens, stoves, microwaves, refrigerators, freezers, hair dryers, washers, clothes dryers, or the like), and consumption for cleaning, among others. For example, an individual consumer 132 might be challenged to reduce energy used for washing clothing by 20% over the course of a month and might be rewarded by a benefit within the platform (such as a credit for purchase of energy, or the like). In another example, a group of consumers 132 might be challenged to determine which consumer can achieve the greatest reduction in overall energy consumption over the period of a week. As with other games, variation of the parameters of a consumption game (such as type and allocation of rewards, type of challenge conducted, timing of the game, duration of time intervals involved in a challenge, and the like) may be managed using machine learning 104 including based on feedback, such as based on the effect of the challenge on behavior, the effect of different rewards on behavior, or the like.

In embodiments, challenge type games and others, including ones with a leaderboard among a group of consumers (such as presented in a user interface of a mobile application or other user interface of the platform 100) may relate to specific production activities, such as challenging users to achieve a target level of energy production from available energy sources under control of the consumer 132, such as renewable energy sources like rooftop solar installations, wind power installations, hydropower installations, and the like. This may include games involving overall energy production and games involving specific types of production. For example, an individual consumer 132 might be challenged to increase energy provided to the grid by 20% over the course of a month and might be rewarded by a benefit within the platform (such as a credit for purchase of energy, or the like). In another example, a group of consumers 132 might be challenged to determine which consumer can achieve the greatest amount of energy production by solar power for the grid over the period of a week. As with other games, variation of the parameters of a production-based game (such as type and allocation of rewards, type of challenge conducted, timing of the game, duration of time intervals involved in a challenge, and the like) may be managed using machine learning 104, including based on feedback, such as based on the effect of the game on behavior, the effect of different rewards on behavior, or the like.

In embodiments, challenge type games and others, including ones with a leaderboard among a group of consumers (such as presented in a user interface of a mobile application or other user interface of the platform 100) may relate to specific net energy activities that involve both consumption and production by the consumer 132, such as challenging users to achieve a target level of net energy utilization (calculated from a combination of consumption of energy available from the grid and production from available energy sources under control of the consumer 132, such as renewable energy sources like rooftop solar installations, wind power installations, hydropower installations, and the like). This may include games involving overall energy production and games involving specific types of consumption and/or production. For example, an individual consumer 132 may be challenged to increase energy provided to the grid by 20% over the course of a month and reduce energy consumed from the grid by 20% during the month, and the consumer 132 may be rewarded by a benefit within the platform (such as a credit for purchase of energy, or the like, including any of the reward types or allocations described throughout this disclosure). In another example, a group of consumers 132 might be challenged to determine which consumer can achieve the greatest amount of energy production by solar power for the grid over the period of a week while not increasing consumption of power from the grid during the week. As with other games, variation of the parameters of any net energy game (such as type and allocation of rewards, type of challenge conducted, timing of the game, duration of time intervals involved in a challenge, and the like) may be managed using machine learning 104, including based on feedback, such as based on the effect of the game on behavior, the effect of different rewards on behavior, or the like.

In embodiments, various challenge type games and other types of games, including ones with a leaderboard among a group of consumers (such as presented in a user interface of a mobile application or other user interface of the platform 100), including games intended to involve consumption behavior, games intended to involve production behavior, and games intended to involve net energy behavior, among others, may account for the location of a consumer 132. Such location-based games may involve tracking specific consumption activities (such as described in connection with the description of consumption-based games above or other consumption activities and behaviors mentioned throughout this disclosure) and specific production activities (such as challenging users to achieve a target level of energy production from available energy sources under control of the consumer 132, such as renewable energy sources like rooftop solar installations, wind power installations, hydropower installations, and the like), as well as net energy activities involving calculations involving consumption and production. Location-based games may account for geographic locations of consumers, such as involving homes within a location. Location-based games may account for geographic locations users of the mobile application described herein, such as involving consumers who are using devices located within a geo-fence, are within range of a known location such as based on location of a cellular infrastructure element, an access point, a beacon, or the like. A wide variety of location technologies known to those of skill in the art may be used to determine the location of a consumer, such as GPS tracking, cellular triangulation, beacons, access points, lighting systems with proximity detection, Internet of Things (IoT) systems, and others. Location-based games may account for grid location, such as involving consumers 132 who receive energy from the same grid, or consumers 132 who receive energy that is provided from the same raw energy sources. For example, consumers 132 in a region served by the same grid with the same raw energy sources may be assigned to a game (of any of the types described throughout this disclosure) with other such consumers 132, so that competition in a game is against similarly situated players. This may be of particular value for leaderboard games involving the mix of energy, where consumers may time their consumption to improve their energy mix, but do not benefit relative to other players just because the energy mix on an applicable grid is favorable overall. Location-based games can also factor in weather, such as assigning players to a game based on the players being located in locations that are currently experiencing similar weather, such as heat, humidity, temperature, wind (such as influencing heating consumption as affected by wind chill and influencing wind energy production for production or net energy games), sunlight (such as influencing the ability to produce solar energy in production or net energy games), rainfall (such as influencing the ability to produce hydropower or solar energy), and the like. Location-based games may include combinations of the above, such as involving players from different locations that have similar current grid conditions (e.g., involving similar energy mix, energy prices, and the like, as well as combinations thereof), that have similar weather, and the like. As with other games, variation of the parameters of a location-based game (such as the locations involved, the size of locations involved (including geographic locations, geo-fence locations, grid locations, weather regions, and the like), the number of consumers, the type and allocation of rewards, type of challenge conducted, timing of the game, duration of time intervals involved in a game and the like) may be managed using machine learning 104, including based on feedback, such as based on the effect of the game on behavior, the effect of different rewards on behavior, the effect of a game for consumers in a given location (such as contrasting with playing the same game in another location) and the like.

In embodiments, the gamification engine 138 may enable timing-based games (including challenges, question-based games, location-based games, and others, optionally with leaderboard or similar features), where the game is configured to induce changes in the timing of energy consumption and/or energy production patterns of consumers 132. Timing may be relevant to overall goals of the platform 100, such as shifting consumption away from times of peak demand (to reduce the incidence of blackouts, brownouts and the like), shifting production of energy delivered to the grid to such times or peak demand (also to reduce incidence of blackouts, brownouts or the like), shifting consumption to times where the mix of energy sources used to power the grid s move favorable for environmental reasons (such as times where the fraction of renewable sources is higher relative to fossil fuel sources), shifting consumption to times where energy prices are more favorable, and the like. Timing-based games may include games that reward activities that indicate time-shifting, such as running appliances during late night hours during periods of hot weather or during daytime hours during very cold weather. This may include rewarding or favoring shifts in consumer behavior relative to historical patterns, relative to patterns for similar consumers, or the like. Such games may tend to improve the behavior of the participating consumers 132, as individuals acquire habits that may cause them to shift behavior (such as to an energy mix that is better for the environment, or to a consumption pattern that saves the consumer money spent on energy, in turn reducing peak demand for energy that may allow infrastructure savings for grid providers). As with other games, variation of the parameters of a timing-based game (such as type and allocation of rewards, type of questions asked or challenges presented, timing of the game, and the like) may be managed using machine learning 104 including based on feedback, such as based on the effect of such games on behavior, the effect of particular timing rewards on behavior, the effect of allocation of rewards on behavior, or the like.

In any of the embodiments described herein, a game (including question-based games, location-based games, timing-based games, consumption-related games, production-related games, net energy games, and others) may be configured with one or more weights, such as applying to one or more of the factors by which a user may gain points or otherwise improve performance. The weights may be applied, for example, to particular questions, to consumption behaviors, to production behaviors, or the like. For example, among a wide range of possible weights, a net energy game may weight each kilowatt of consumption with a coefficient of one and each kilowatt of energy produced by a consumer 132 for return to the grid with a weight of one-half. In all such embodiments, such weights may optionally be managed using machine learning 104 including based on feedback, such as based on the effect of such weights on overall outcomes, on behavior of various types, or the like. In embodiments, weights may be adjusted by random variation and testing, such that weights used in games with favorable outcomes are promoted and others are de-selected, resulting on continuous improvement of the weighting of game elements to achieve an outcome.

As noted with respect to location-based games, various types of games described herein (including question-based games, location-based games, timing-based games, consumption-related games, production-related games, net energy games, and others) may be filtered to involve contests or challenges among groups of similar users, such as based on various factors, which may include age, gender, location (geographic, geo-fence, or grid-based), weather, type of home, size of home, price of home, demographic category, occupation category, and others. For example, a game may be configured such that a leaderboard is presented that presents a user against all users, or against a cohort of similar users that is configured by applying one or more filters. In one such illustrative example, a user may be challenged to achieve the lowest possible net energy score (subtracting production from consumption) and may filter the leaderboard to see how the user compares to other users on the same grid who have similar production capabilities (e.g., solar panels rated within a range of kilowatt capacity). In embodiments, an operator of the platform 100, a sponsor, or the like may configure a game that offers rewards that are based on a game that is targeted to a filtered set of users, such as users in large homes in a geographic area. As with other elements, application and selection of filters, and combinations thereof, may be managed and improved by the machine learning system 104, such as by varying filters over a number of trials and selecting filters that tend to promote overall outcomes, such that favorable combinations of filters are selected/advanced and other combinations are demoted/de-selected.

Various aspects of the platform 100 may use an understanding of the similarity of a consumer 132 to other consumers 132, such as selection of filters to establish a group for game, allocation of rewards to the highest performing consumers among similar consumers within a game, presentation of similar users on a leaderboard, and the like. Similarity may be based on various factors described in connection with filters above, such as age, gender, location (geographic, geo-fence, or grid-based), weather, type of home, size of home, price of home, demographic category, occupation category, behaviors (such as indicating price sensitivity, concern for particular environmental topics) and others. This may include various clustering techniques by which each consumer 132 is represented as an object having a set of attributes, and within a cluster the position of a node representing a consumer 132 is determined by calculating a distance from another user by applying weights to each of the attributes, such that similar consumers are found near each other within a cluster and different consumers are farther apart in the cluster. Similarity may be determined by a similarity model, such as one involving a calculation of similarity that applies weights to various attributes. Similarity may be determined by collaborative filtering, such as by having consumers 132 answer questions about various topics and grouping consumers 132 who have similar responses. Similarity may be determined by tracking user behavior, such as energy consumption behavior, energy production behavior, net energy behavior, behavior within the mobile application, behavior indicating attitude toward environmental issues, behavior indicating sensitivity to price changes, behavior indicating sensitivity to energy production types, and the like, including any of the types of behavior described throughout this disclosure. Machine learning 104 may be used to improve a clustering approach, a similarity model, a collaborative filtering approach, a behavior tracking approach, or the like, such as by adjusting one or more rules, weights or other parameters used within them through a series of trials under feedback regarding outcomes of the platform 100 (such as impacts on consumption, production, energy savings, financial savings, and others). This may involve any of the machine learning and artificial intelligence techniques described throughout this disclosure.

A wide variety of types of rewards may be managed by the gamification engine 138, such as credits for future energy consumption, rebates or cash back, reduction of prices paid for winning consumers, loyalty points, cryptocurrency coins, status-based awards (such as badges for specific activities and for cumulative activities, goods (such as new appliances that help with energy consumption, systems that produce energy for the grid, and the like), enhanced features for the mobile application, access to advanced levels of a game (such as with higher prizes), access to content (such as entertainment content), and others.

Embodiments of the platform 100 may be configured to track, observe, account for, manage, and/or influence behavior of users, including consumers 132, such as overall consumption behavior, consumption behavior with respect to a particular activity (in home, in a vehicle, for completion of a particular task, in using a particular appliance or the like), production behavior (such as returning energy to the grid), location behavior (including geolocation, location on a grid, and the like), behavior within a user interface (such as interacting with user interface elements, interacting with game elements, replying to communications, and the like), and other types of behavior as described throughout this disclosure.

In embodiments, user behavior may be tracked by a variety of techniques and systems, including tracking behavior of the user when interacting with the mobile application described herein (such as by storing interactions and sequence of interactions with the user interface), tracking transactions with the platform 100 (such as purchases of energy in current or forward markets, sales of energy in current or forward market and the like), tracking consumption and production behavior (overall and with respect to particular items, devices, elements, topics, or systems as described herein) by measuring energy utilization (such as with a smart meter, and IoT system, or the like), tracking location (such as by GPS, beacons, access points, lighting systems with proximity location capability, cellular triangulation systems, vehicle location systems, peer-to-peer location systems, and others), tracking sentiment (such as by surveys, by secondary indicators of interest and the like), tracking interaction with content and advertising (such as by clickstream tracking and analysis, pixel tracking within content objects, and the like, such as indicating whether a user reads all of a text item or watches all of a video), taking input from external systems that track user behavior (such as systems used by content providers, advertisers, and the like, such as ones that provide demographic and psychographic information about individuals) and others.

By tracking user behavior (including internal tracking via various sub-systems or components of the platform and/or by taking inputs from external systems), the platform 100 can make available a variety of inputs and information to an operator of the platform 100 or other user, such as dashboards, reports, alerts, and the like, so that the operator or other user can respond to and manage individual, group, or aggregate behavior, such as to recognize one or more problems or opportunities that may be evident from the track information, to recognize a pattern in behavior that can be influenced by or considered in connection with managing the platform 100, to predict some aspect of future behavior or outcome related to the platform 100 or some activity managed by the platform, or the like. For example, an operator may observe that users respond well to presentation of pricing information at a certain time of day (such as a time when appliances typically used by the user) and arrange to time future communications of price information in appropriate time windows. As another example, an operator may observe that a user is most likely to reduce overall consumption in a competitive situation with other similar users, so that user may be presented with a number of opportunities to enter games and challenges. Thus, for a wide range of purposes, a user interface of the platform 100 may provide tracking analytics across a wide range of user behavior.

Information resulting from tracking user behavior may be provided to the machine learning system 104, such as to improve various aspects of the platform, including classification of states, recognition of patterns, prediction of future states, and automated control of one or more components, systems, interfaces, workflows, or the like.

User behavior may be observed, tracked and provided as feedback in a variety of feedback and/or feed-forward loops to improve various aspects of the platform 100, where some aspect of the platform 100 that involves or influences behavior is iteratively modified (optionally in response to a recommendation or input from machine learning 104 and/or under control of machine learning 104), thereby inducing further observation as behavior changes in response to the modification of the applicable element of the platform 100. Such feedback and/or feed-forward loops may include observation and iteration involving elements that occur within the mobile application of the platform 100, such as the visual experience, an audio experience, text content, location of user interface elements, flows of action or information, reactions to gaming elements (e.g., what quiz questions influence behavior most, what rewards are most effective, what mix of rewards is most effective and the like), reactions to current pricing, forward market, and forecast pricing, reaction to current and forecast energy mix, and the like. Such feedback and/or feed-forward loops may include observation and iteration involving elements that occur outside the platform 100, such as involving location of the user (e.g., by observing the location of user device and inferring information about the user, such as to determine and "away from home" state and whether home energy consumption is managed accordingly), the location of a vehicle (such as one that is charged at the user's home) and the like. Such feedback and/or feed-forward loops may include observation and iteration involving elements that in a home or other facility that is connected to the platform 100 (such as where a smart meter provides information to the platform 100), such as based on presence detection at a home, observation of multi-home migration behaviors, and the like. Such feedback and/or feed-forward loops may include observation of a wide range of behaviors described throughout this disclosure, including changes in behavior at least in part based on influence of the platform 100, such as consumption behavior, which include observation of overall consumption, by major type of consumption (e.g., heating and A/C, hot water, major appliances, vehicle charging, and the like), time shifting of consumption, the energy mix involved in consumption, off-grid consumption (such as energy used driving a car), multi-home consumption behavior, relative energy efficiency (such as by season, including compared to similar users or groups), movement among locations, and many others.

Such feedback and/or feed-forward loops may include observation of a wide range of production behaviors described throughout this disclosure, including changes in behavior at least in part based on influence of the platform 100, such as storage (and timing of storage), providing renewable energy production to the grid, refraining from consumption to enable higher production to grid, and the like.

Consumption and production behaviors may be combined in various forms to yield observations of net energy behavior, which can also be considered and involved in one or more feedback and/or feed-forward loops, such as to recommend, provide input, or provide automated control of one or more functions of the platform 100.

User behavior may be explicitly involved in machine learning, such as using AB testing techniques where different options are presented to users and behavioral outcomes tested (such as presenting different displays of pricing and energy mix information to see which ones elicit the most behavioral change, presenting different game flows and rewards in games to see which ones induce behaviors, presenting similar elements at different time intervals to see the impact of timing on user behavior, and the like.

User behavior tracking may be used as feedback for genetic programming systems in the machine learning system 104, such as described in connection with various embodiments described herein. For example, variants of combinations of text and/or visual presentation elements, user interface flows, pricing, timing, rewards, filters (such as of groups based on similarity as described elsewhere in this disclosure), whether resulting from random variation or from explicit configuration by an operator of the platform 100, can be compared at least in part based on an outcome related to user behavior. This may include situations where the objective of the operator of the platform 100 or a user of the platform 100 is to influence user behavior (in which case the behavioral information can be directly provided as feedback to the machine learning system 104) and situations where a different overall objective is sought (such as improvement in the ability of producers to meet demand), but where user behavior has a potentially strong influence on the other outcome. Through variation and selection of combinations of the elements described above, favorable ones can be promoted, thereby improving the odds of having a desired influence on user behavior or on an overall outcome.

In embodiments user behavior tracking may be provided to a user behavior model, which may be used by an operator of the platform 100 or other user to understand, predict, and react to user behavior and/or to provide an input to, be maintained by, be integrated with, take an input from, or otherwise interact with the machine learning system 104. The user behavior model may be populated with data about consumers 132, such as information about the various attributes noted herein (such as described in connection with determining similarity among users) and behavioral attributes or traits, such as sentiment about particular topics (such as sentiment about renewable energy or fossil fuel usage, sentiment about conservation, sentiment about efficiency, and the like), reactivity to events or stimuli (such as price elasticity of energy demand, sensitivity to changes in energy mix, sensitivity to rewards, responsiveness to messaging, and the like). In the model, a consumer 132 may be represented as an object, with a variety of attributes, such as stored in an object-oriented or relational database. The user behavior model may include one or more rules, which may include deductive or inferential rules that help predict other attributes for a user where some attributes are known. The model may be improved by machine learning 104, such as by updating or varying the model based on feedback of outcomes from situations where the model is used. Thus, the platform 100 may include a system that provides intelligent outcomes based on a combination or hybrid of a model-based system and a machine learning system 104.

User behavior may be used to feed various embodiments of the machine learning system 104, such as involving deep learning, combinations of deep learning with rule-based or model-based systems or other expert systems, neural networks of various types described herein and as would be understood by one of ordinary skill in the art, and the like.

User behavior may be used as a feedback to improve or enable one or more classifiers, such as a neural network or other machine learning system 104 that is trained to classify one or more items or elements relevant to the platform 100, such as classifying a type of user, a type of energy consumption, a type of behavior, an object (such as an energy consuming device or energy producing device), a pattern of energy transmission, a pattern of location (such as movement of a consumer between two homes), and the like. Classifiers may include vision-based classifiers, such as involving machine vision for object recognition, such as recognizing an appliance or other energy consuming device by using a camera or other visual sensor to help assign a portion of an energy consumption load measured by a smart meter to that item. Vision-based classifiers may also be used to classify elements related to a user, such as by using a camera of a mobile device to capture an image of a user's face, the analysis of which may be used to determine the user's reaction or sentiment with respect to a presentation element in a user interface of the mobile application of the platform 100, such as a game element, or the like. Classifiers may include signal-based classifiers, such as classifying signals received from IoT devices that help classify consumption activities, production activities, user behavior, or the like. In all such cases, information from user behavior tracking or other output tracking may be used to improve classifiers. Classifiers may be trained, such as by a training set of data from human classification of similar data. Classifiers may be supervised, such as by human supervisors that provide feedback.

User behavior may be used as feedback to improve or enable one or more prediction systems such as a rule-based prediction, model-based prediction, expert system prediction, deep learning system, neural network or other machine learning system 104 as described throughout this disclosure that is trained to predict one or more items or elements relevant to the platform 100, such as predicting states or changes in states of energy consumption, energy production, energy demand, energy supply, game play, energy prices, the mix of raw energy sources, responsiveness to events or stimuli, and others. For example, a prediction system may predict how much a challenge game will reduce energy consumption for a participating portion of the grid; how much a display of an unfavorable energy mix will cause users to time-shift consumption to a time that is expected to have a more favorable energy mix; how much a predicted spike in a forward market for energy will affect current consumption, and many other factors. In all such cases, information from user behavior tracking or other output tracking may be used to improve one or more prediction systems. Prediction systems that involve machine learning 104 may be trained, such as by a training set of outcome data involving similar patterns. Prediction systems may be supervised, such as by human supervisors that provide feedback. Prediction systems may use user behavior or other feedback information from the platform 100 or from external systems to predict a wide variety of information, such as the energy mix preferred by a consumer 132 or group, consumption behavior by a consumer 132 or group, reaction to prices, reaction to interface elements, reaction to gaming elements, location of energy consumption (such as where a user is living between two or more homes), type of energy consumption, and many others.

In embodiments, machine learning 104 may use tracking information about user behavior to improve or enable a combination of a classifier and a prediction system. In such embodiments, a classifier may be used to recognize and/or classify a pattern (such as a pattern or reaction of a consumer 132 or group to a change, such as a change in energy mix, energy pricing, weather, or the like) and the prediction system may be used to make a prediction that is based at least in part on the pattern.

Whether using user behavior information or other information within the platform 100 or from one or more external systems, classifiers and prediction systems may be used to classify and/or predict various patterns, states, and changes in states, such as consumption patterns and states, production patterns and states, location patterns and states, user patterns and states, device patterns and states (such as based on decays in efficiency as an appliance ages), and many others. User behavior and other information may be used within the platform to understand user patterns and states, such as relating to price-sensitivity, preference states for energy mix, preference states for comfort (such as at what temperature the user prefers to keep the interior of a home during a given season), and the like.

Classification and/or prediction of patterns may be used to understand (and optionally calculate) similarity in patterns (including behavior and other dynamic patterns) of various relevant actors, items, and objects relevant to the platform 100, such as consumers 132 and other users, homes and other facilities that use energy, facilities and systems that produce energy, energy mix patterns (such as by region), weather, prices, and the like. For example, various statistical, econometric, and signal processing techniques, such as linear regression, Bayesian analysis, and a wide range of other techniques may be used to analyze information to predict future outcomes. Classification and recognition of patterns may be undertaken and/or improved by machine learning 104, including deep learning.

Patterns classified, recognized or predicted in the platform 100, or used to make predictions within the platform 100 may further include consumer energy usage patterns, such as based on time of day, day of week, season, weather patterns, regional or geographic patterns, or the like. Patterns may include consumer energy source selection patterns, patterns in pricing differences, patterns in total overall energy cost, patterns in responsiveness to pricing alerts or other messages, patterns in consumer generated energy (e.g., solar) usage, and patterns in consumer generated energy sell-back to the grid, among others. Patterns may also include ones related to allocation of energy demand to providers who use different raw energy sources, including based on relative price of energy from different raw energy sources and/or based on availability of energy from the different raw energy sources. Patterns may include gamification patterns, such as reward types, reward allocations, reward amounts, filters used to arrange groups into games, and the like. Patterns may include price patterns for different raw energy sources for a given energy grid. Patterns may include patterns relating to the impact of other factors on energy prices, such as supply patterns, weather (e.g., outdoor temperature, hours of daily sun, wind patterns, water flow patterns, and the like), current and near-term usage and demand patterns, historical usage and demand patterns, and the like. Patterns may include maintenance patterns, such as for maintaining grid infrastructure, maintaining consumption devices, maintaining production devices, and the like.

Figure 19:
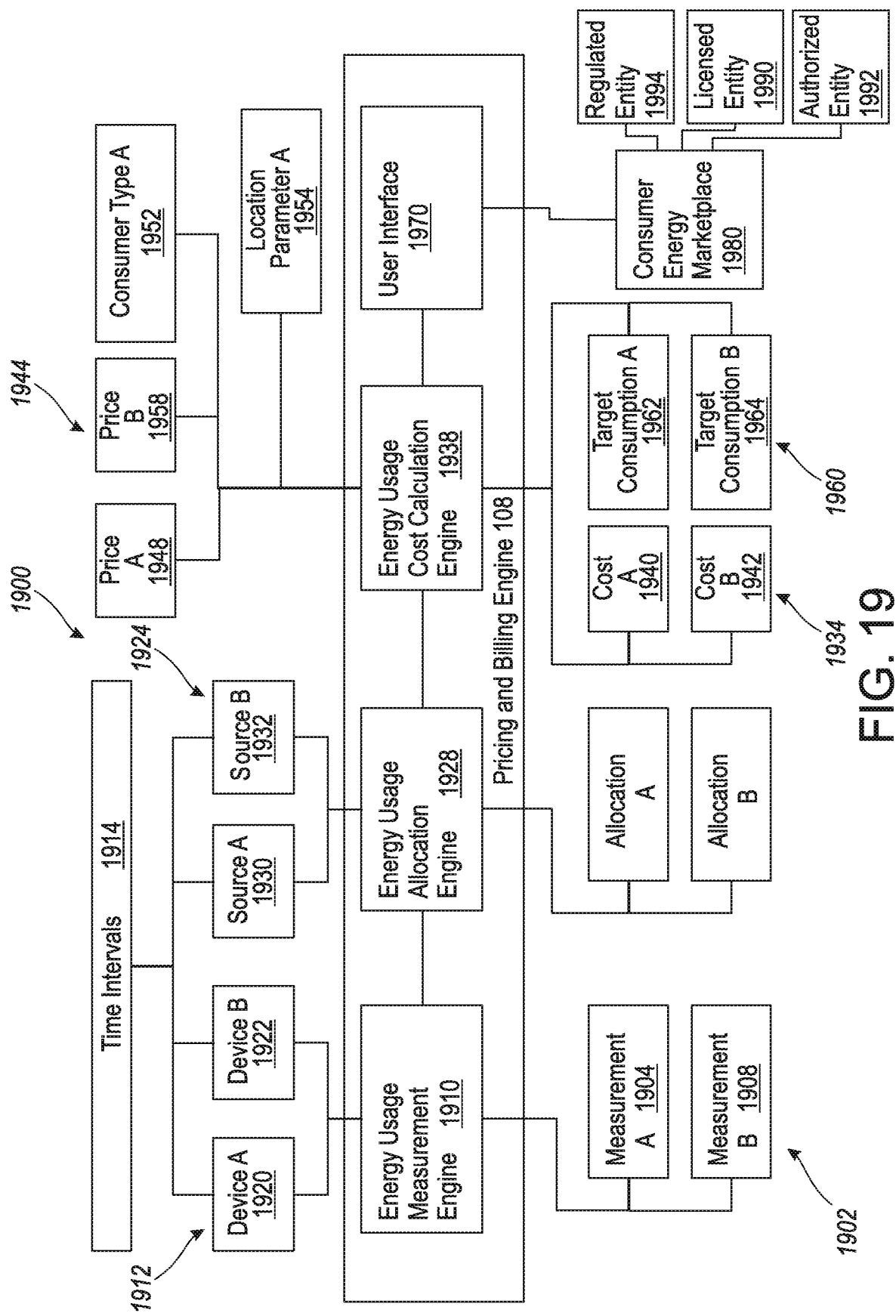
FIG. 19 depicts a diagrammatic view of a consumer market energy marketplace to determine energy measurement, usage, and calculation in accordance with the present disclosure.

As depicted in FIG. 19, the utility marketplace platform 100 may allow a consumer to manage energy consumption. The pricing and billing engine 108 of the utility marketplace platform 100 may allow the consumer to manage energy consumption by gathering energy usage measurements 1902. The measurements 1902 may include measurement A 1904, measurement B 1908, and the like. The measurements 1902 may be associated with the consumer using an energy usage management engine 1910. The energy usage measurements 1902 may be collected by energy usage management engine 1910 across one or more energy consumption devices 1912 over discrete time intervals 1914. The energy consumption devices 1912 may include energy consumption device A 1920, consumption device B 1922, and the like. The pricing and billing engine 108 may then allocate the collected energy usage measurements 1902 to one or more sources of energy 1924 for each discrete time interval 1914 using an energy usage allocation engine 1928. The sources of energy 1924 may include a source of energy A 1930, a source of energy B 1932, and the like. The sources of energy 1924 may be fossil fuel sources (such as oil, natural gas, coal, and the like), renewable energy fuel sources (such as wind, solar, hydropower and the like), nuclear energy fuel sources or other sources of various types described throughout this disclosure.

The pricing and billing engine 108 may then calculate costs of energy usage 1934 for each of the discrete time intervals 1914 using an energy usage cost calculation engine 1938. The costs of energy usage 1934 may include a cost A of energy usage 1940, a cost B of energy usage 1942, and the like. The costs 1934 may be processed and calculated using actual energy prices 1944 for energy purchased at price intervals from each of the sources 1924. The actual energy prices 1944 may include a price A 1948, a price B 1950, and the like. The costs 1934 may also be processed and calculated using real-time energy cost data that may be tracked by the pricing and billing engine 108 for each of the sources 1924. In embodiments, the pricing and billing engine 108 may aggregate the costs 1934 based on each of the sources of energy 1924 for each of the time intervals 1914.

In embodiments, one or more of the costs 1934 may be based on or associated with a consumer type 1952, that may be stored in the consumer profile 124, of the consumer. The consumer type 1952 may be a retail consumer type, business consumer type, industrial consumer type, energy provider consumer type and the like.

In embodiments, the costs 1934 may be calculated based on or associated with a consumer parameter. A consumer parameter may be a location parameter 1954 that may indicate a geographic region, such as a zip code, state, county of a state, a multi-state region and the like. In embodiments, the cost 1934 may be calculated based on the available sources of energy 1924 that originate in a geographic region indicated by the location parameter 1954. In embodiments, the cost 1934 may be calculated based on a target total consumption of energy 1960 from sources of energy 1924. The target total consumption of energy 1960 may include individual or bundled consumption of energy target A 1962, consumption of energy target B 1964, and the like. The target total consumption of energy 1960 may be aligned with an actual total consumption of energy from one of the sources of energy 1924 at one of the discrete time intervals 1914.

Figure 20:
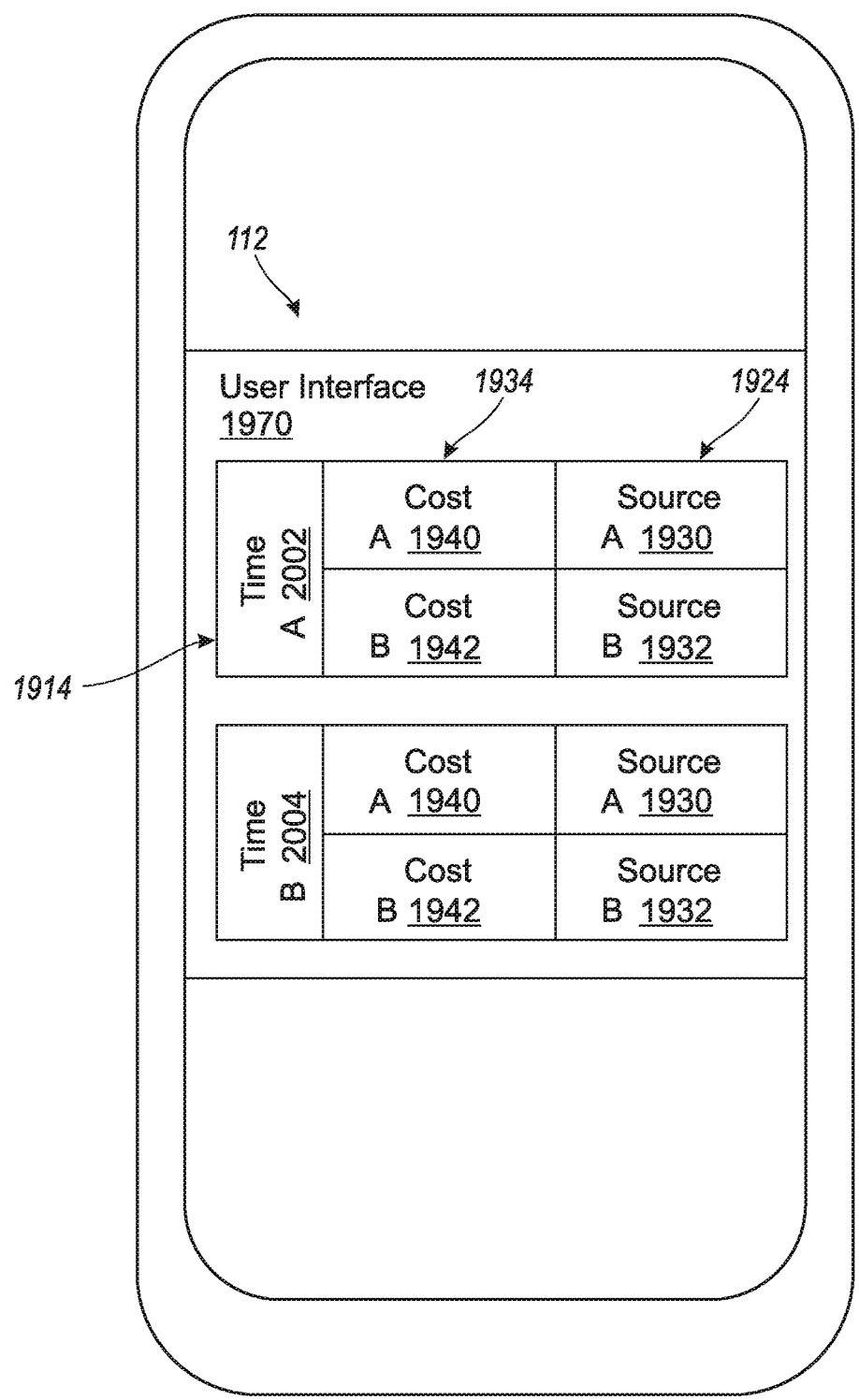
FIGS. 20, 21, and 22 depict a diagrammatic view of a user interface of the mobile application providing different time intervals for a cost of a source of energy in accordance with the present disclosure.
Figure 22:
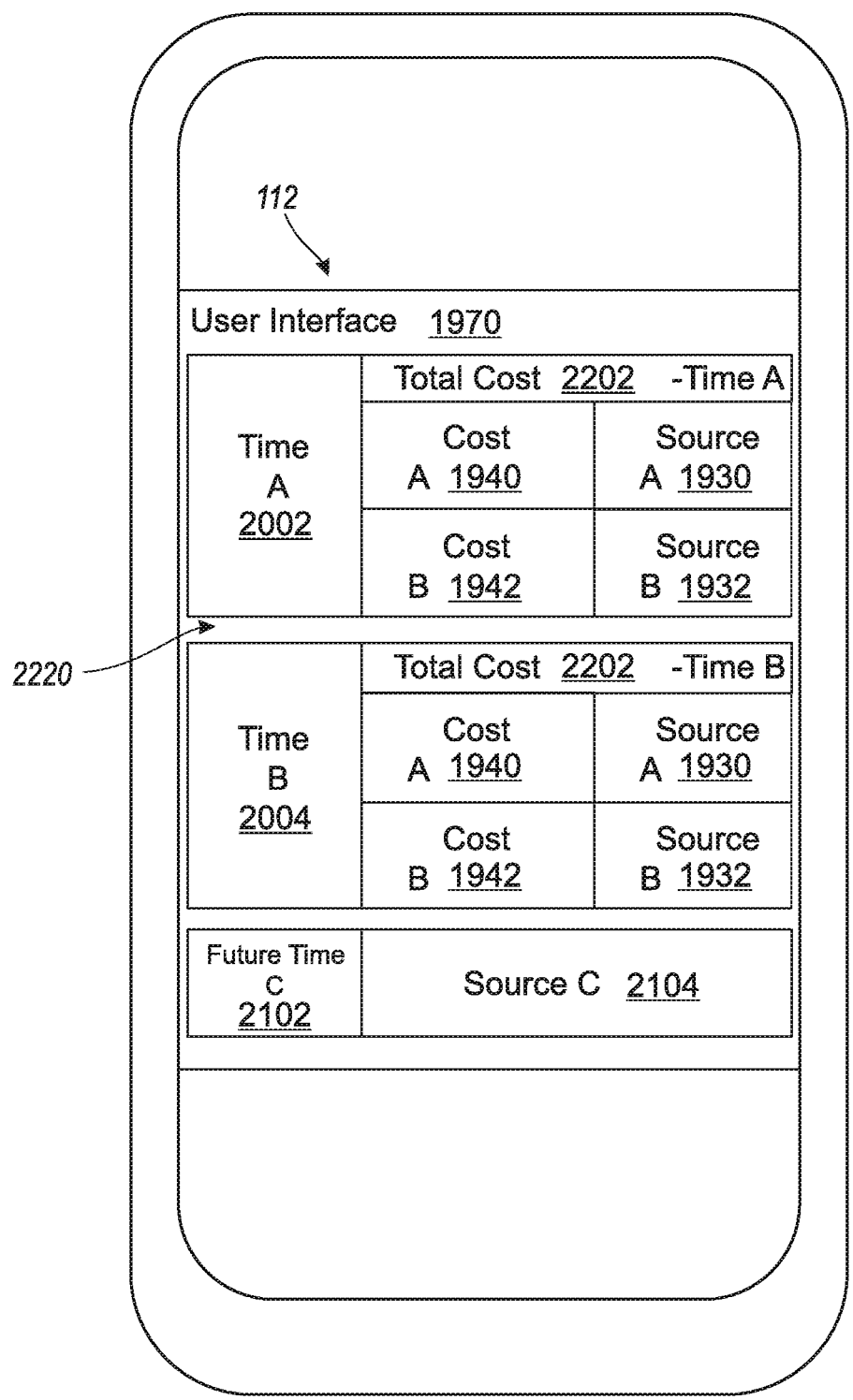

The pricing and billing engine 108 may then present to a consumer of the utility marketplace platform 100 the calculated cost of energy usage 1934 for each of the sources of energy 1924 for each of the discrete time intervals 1914, using a user interface (UI) 1970 and also depicted in FIG. 20 that may connect to the consumer API 120 of the utility marketplace platform 100. With reference to FIG. 20, the time intervals 1914 may include a time interval A 2002, a time interval B 2004, and the like. In embodiments and with reference to FIG. 19 and FIG. 22, the calculated cost of energy usage 1934 may be an aggregated cost 2202 based on a total cost of energy usage 2204 from one of the specific sources of energy 1924 for one of the time intervals 1914 such a time interval 2210, as depicted in FIG. 22. The total cost of energy usage 2204 may include, a cost of energy usage at a time A 2220, a time B 2222, and the like.

In embodiments with reference to FIGS. 1A, 1B, and 19-22, the cost may be presented based on the consumer type 1952 of the consumer. In embodiments, the cost 1934 may be presented based on a geographic region indicated by a location parameter 1954 of the consumer. In embodiments, the presented cost 1934 or aggregated cost 2202 may be normalized for one of the targets of total consumption 1960.

Figure 21:
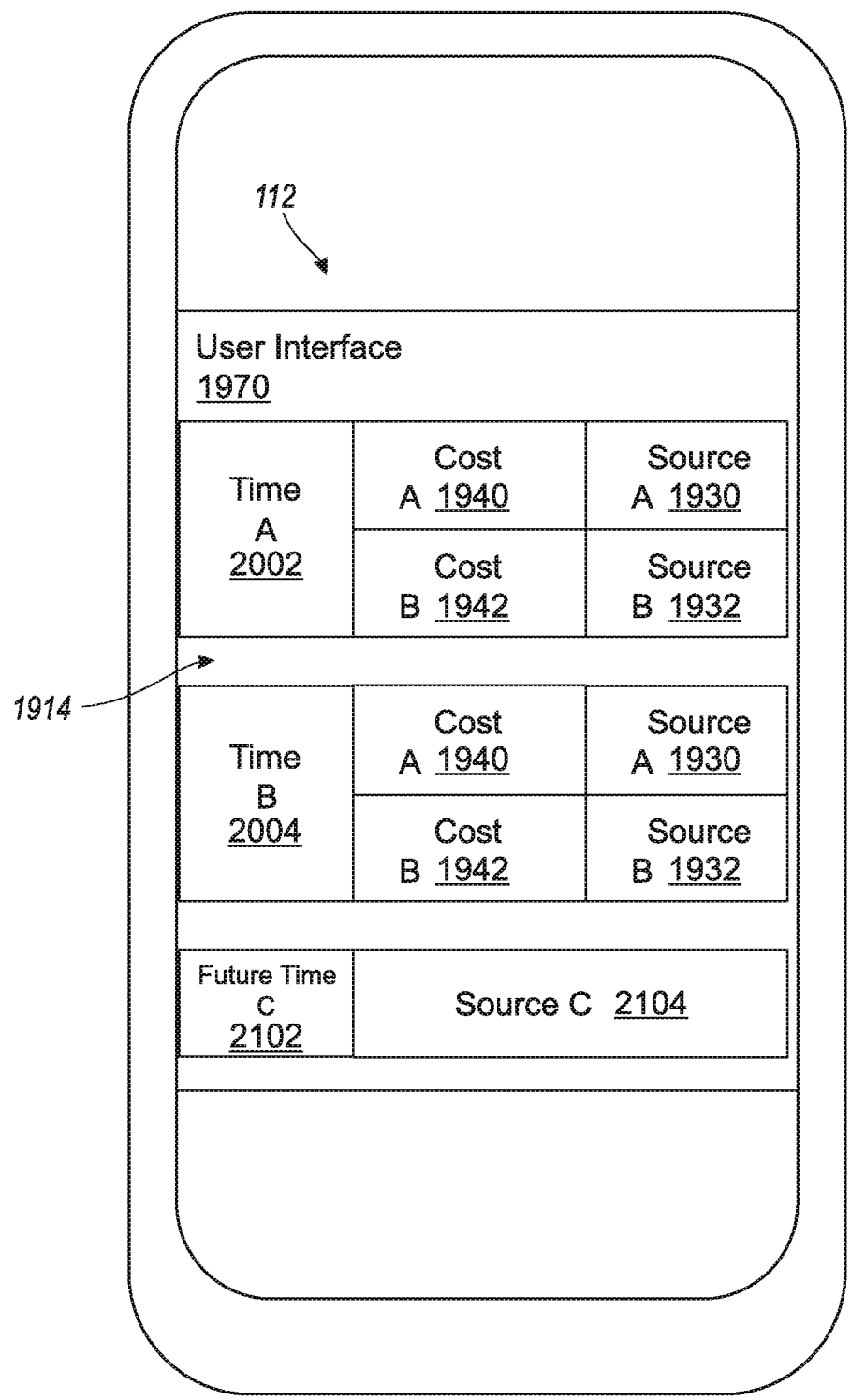

In embodiments, the UI 1970 may also be populated by data from a consumer energy marketplace 1980. As depicted in FIG. 21, the consumer energy marketplace 1980 may allow the consumer to select to allocate one or more energy sources to a discrete future time interval 2102.

Figure 23:
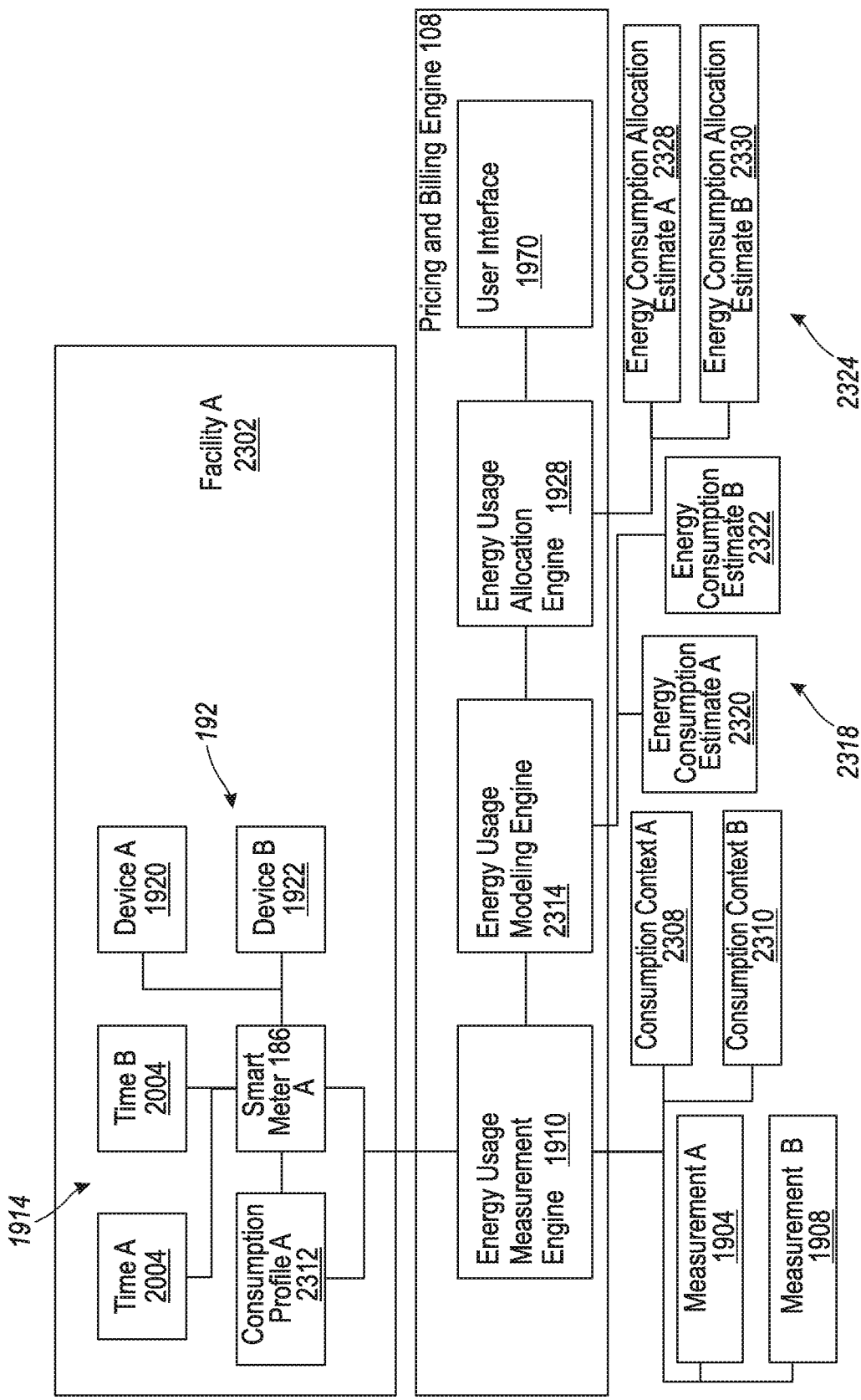
FIG. 23 depicts a diagrammatic view of a facility in which consumption at devices are measured and calculated in accordance with the present disclosure.
Figure 25:
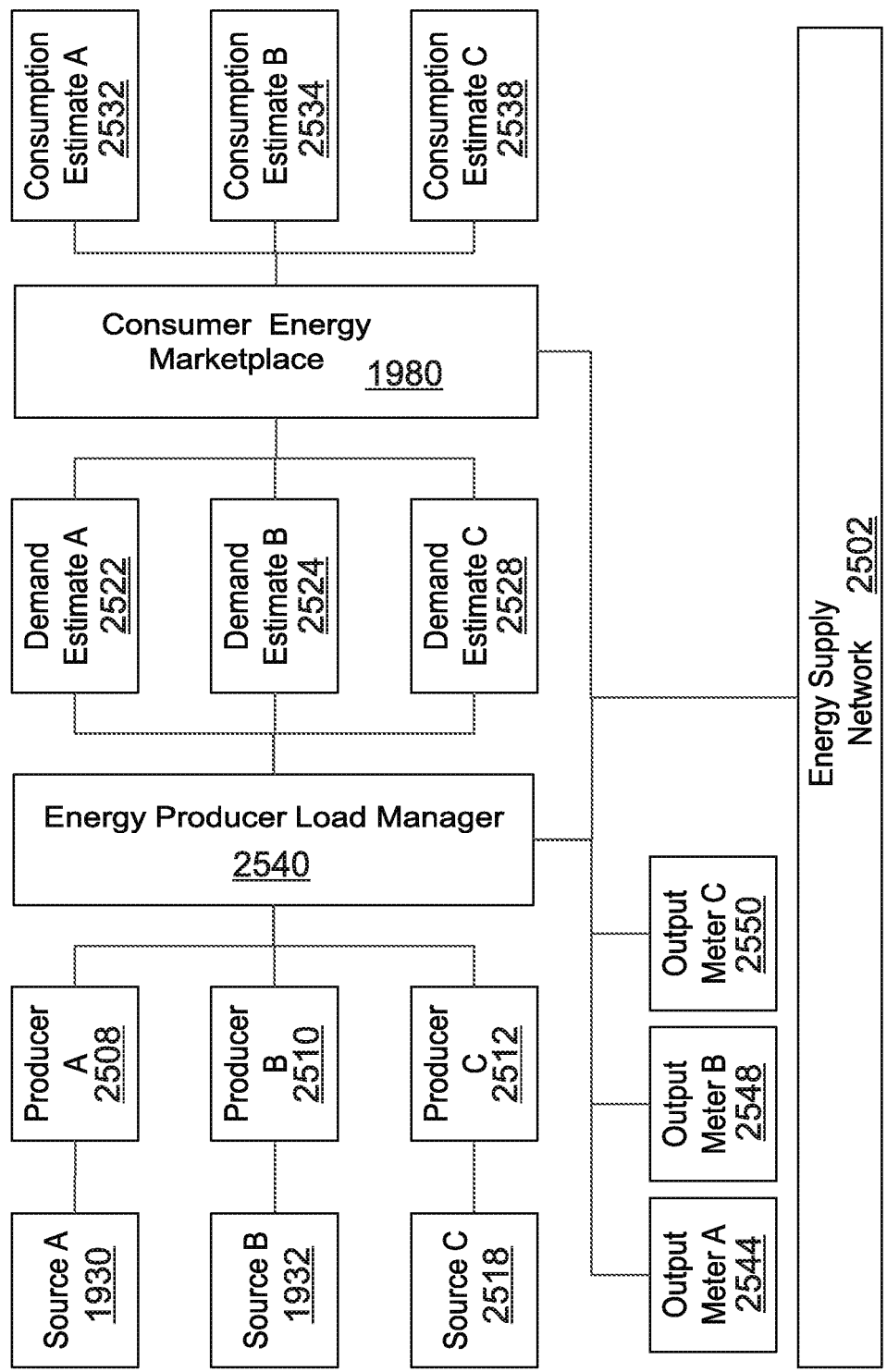
FIG. 25 depicts a diagrammatic view of an energy supply network with multiple output meters in accordance with the present disclosure.

In embodiments and with reference to FIG. 23 and continuing reference to FIGS. 1A, 1B, and 19-22, the utility marketplace platform 100 may allow a consumer to manage energy consumption at a facility 2302 using a smart meter 186. The smart meter 186 may collect energy consumption measurements, such as electrical energy consumption measurements, from one or more of the devices 1912 located at the facility 2302.

The pricing and billing engine 108 of the utility marketplace platform 100 may allow the consumer to measure energy consumption at the facility 2302 by gathering energy usage measurements 1902 from the smart meter 186 using an energy usage management engine 1910. The energy usage measurements 1902 gathered from the smart meter 186 may be measurements 1902 for adjacent time intervals 1914.

The energy usage management engine 1910 may also determine an energy consumption context 2304 for at least one of the adjacent time intervals 1914 for each of the devices 1912 in the facility 2302. The energy consumption context 2304 may include an energy consumption context A 2308, an energy consumption context 2310, and the like, and may be determined by measuring one or more factors that indicate an energy consumption profile 2312 of one of the devices 1912. Factors may include energy flow into one or more of the devices 1912. In embodiments, factors may be received as factor measurement data over a network from a networked computing device. The factor measurement data may measure a condition associated with one or more of the devices 1912.

In embodiments, the devices 1912, 1920, 1922 may be a water heater, such as tankless, storage-tank based and on-demand water heaters. The water heater may include a heating element, such as gas or electric heating element. Conditions associated with the water heater may include the flow of water through the water heater, temperature of the water through the water heater, temperature of the water into the water heater, a set temperature for the water heater, temperature of water flowing out of the water heater, a portion of the time interval that the water heater is actively heating water in the water heater, a portion of the time interval that the water heater is consuming energy and the like.

In embodiments, the devices 1912, 1920, 1922 may be an air conditioner. Conditions associated with the air conditioner may include an outdoor temperature proximal to the air conditioner, indoor temperature proximal to the air conditioner, an air filter blockage, and the like. The air filter blockage condition may include an estimate of the blockage, based on an amount of time the air conditioner circulation fan operates.

In embodiments, the devices 1912, 1920, 1922 may be a home heating system. Conditions associated with the home heating system may include an outdoor temperature proximal to the heating system, indoor temperature proximal to the heating system, an air filter blockage, and the like. The air filter blockage condition may include an estimate of the blockage, based on an amount of time the heating system circulation fan operates.

The pricing and billing engine 108 may then use an energy usage modeling engine 2314 to apply the energy consumption context 2304 to energy usage models for the devices. By doing this, the energy usage modeling engine 2314 may produce energy consumption estimates 2318 for each of the devices for at least one of the adjacent time intervals including energy consumption estimate A 2320, energy consumption estimate A 2322, and the like.

The energy usage allocation engine may then allocate a portion of the measured energy consumption to each of the devices 1912. These energy consumption allocation estimates 2324 may be based on the energy consumption estimates 2318 determined by the energy usage modeling engine 2314. As such, an energy consumption allocation estimate A 2328 may be based on the energy consumption estimate A 2320, an energy consumption allocation estimate B 2330 may be based on the energy consumption estimate A 2322, and the like.

In embodiments and with reference to FIG. 24 and continuing reference to FIGS. 1A, 1B, and 19-23, the pricing and billing engine 108 may then report an energy consumption 2402 for the facility 2302 through the user interface 1970. The energy consumption 2402 reported for the facility 2302 may be presented as the estimated consumption for each of the devices 1912, as well as a residual energy consumption portion 2404. The estimated consumption for each of the devices 1912 may include an energy consumption allocation estimate A 2410, an energy consumption allocation estimate B 2412, and the like. The residual energy consumption portion 2404 may be determined from an unallocated portion of the measured energy consumption for the facility 2302. In embodiments, the energy consumption 2302 for the facility 2302 may be reported with energy cost information 1934 for the adjacent time intervals 1914 that are applicable to the measured energy consumption 2302. In embodiments, the energy consumption 2302 for the facility 2302 may be reported with the energy sources 1924 for the adjacent time intervals 1914 that are applicable to the measured energy consumption 2302.

In embodiments and with reference to FIGS. 1A, 1B, 24, and 25, the utility marketplace platform 100 may include an energy supply network 2502. The energy supply network 2502 may supply energy to consumers and include multiple energy producers 2504 such as an energy producer A 2508, an energy producer B 2510, an energy producer C 2512, and the like. The energy supply network 2502 may a natural gas network, renewable energy network, nuclear energy network, coal energy network, electricity network, oil energy network and the like. The energy producers 2504 may produce energy suitable for distribution over a residential network using a number of different raw energy sources 1924 including the energy source A 1930, the energy source B 1932, and an energy source C 2518, and the like.

The energy supply network 2502 may connect to the consumer energy marketplace 1980. The consumer energy marketplace platform 1980 may calculate aggregate demand estimates 2520 for each of the raw energy sources 1924 used by the energy producers 2504. The aggregate demand estimates 2520 may include an aggregate demand estimate A 2522, an aggregate demand estimate B 2524, an aggregate demand estimate C 2528, and the like. The aggregate demand estimates 2520 may be based on aggregated consumer energy consumption estimates 2530. The aggregated consumer energy consumption estimates 2530 may be allocated to each of the raw energy sources 1924 as specified by consumers. As such, an aggregated consumer energy consumption estimate A 2532 may be allocated to the raw energy source A 1930, an aggregated consumer energy consumption estimate B 2534 may be allocated to the raw energy source B 1932, an aggregated consumer energy consumption estimate B 2538 may be allocated to the raw energy source C 2518, and the like, as specified by consumers.

The energy supply network 2502 may also connect to an energy producer load manager 2540. The energy producer load manager may control energy flow from the multiple producers 2504 to the energy supply network 2502. The energy producer load manager 2540 may control the energy flow based on the demand estimates 2520 received from the consumer energy marketplace 1980, for each of the different raw energy sources 1924. In embodiments, energy output meters 2542 may measure amounts of energy provided to the energy supply network 2502 for each of the multiple energy producers 2504, at an entry point into the energy supply network 2502. The energy output meters 2542 may include an energy output meter A 2544, an energy output meter B 2548, an energy output meter C 2550, and the like.

Figure 26:
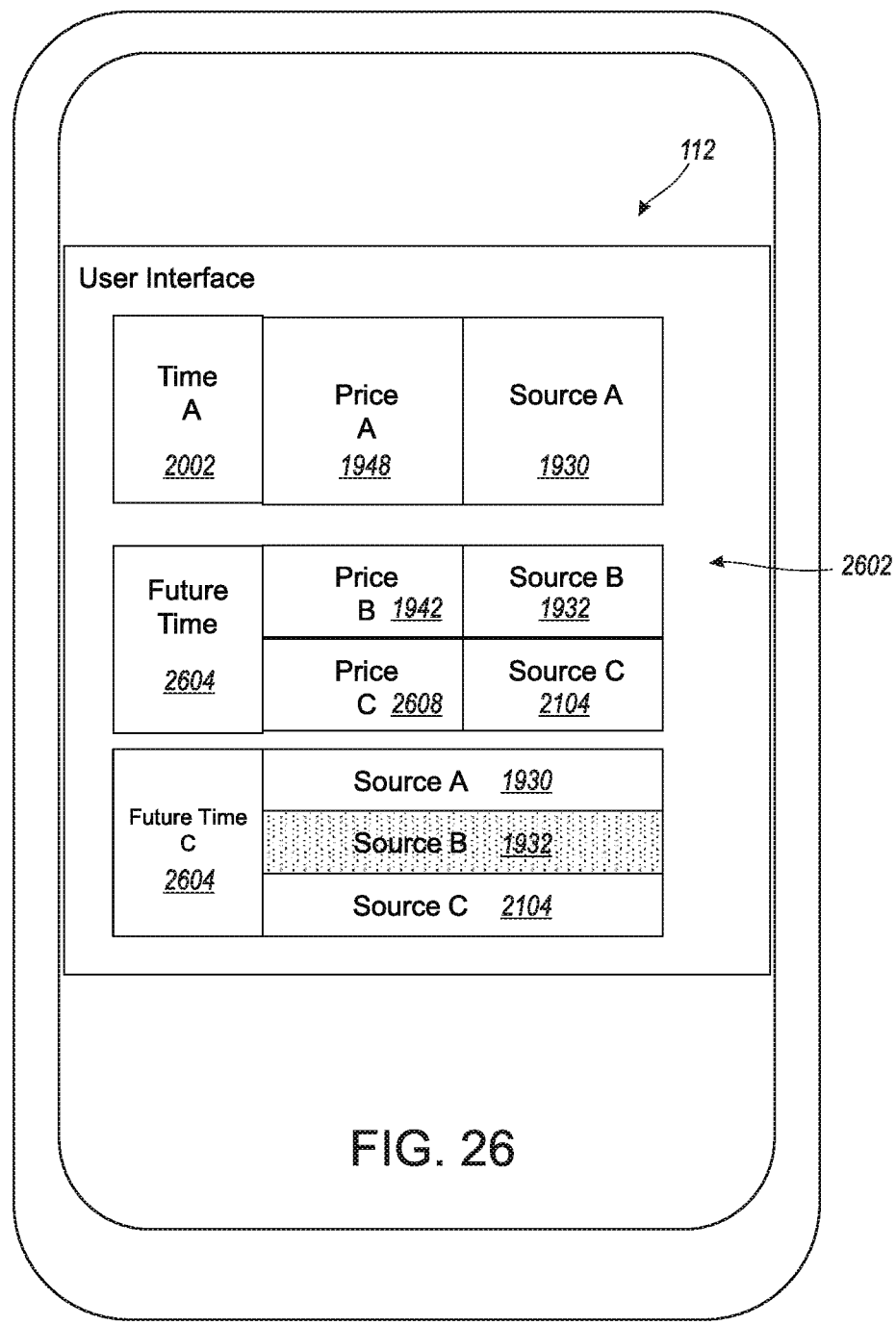
FIGS. 26, 27, and 28 depict a diagrammatic view of a user interface of the mobile application providing different time intervals, future time intervals, price trends for different sources, different energy mixes for a cost of a source of energy in accordance with the present disclosure.

In embodiments and with reference to FIG. 26 and continuing reference to FIGS. 1A, 1B, and 19-25, the UI 1970 may include visual elements 2602 that may allow a consumer to access the energy marketplace 1980. The visual elements 2602 may represent prices of energy 1944 for types or sources of energy 1924 available to the consumer from the energy supply network 2502. The visual elements 2602 may also include costs of energy 1934 at a future time 2604 for the cost B 1942 from energy source B 1932, a cost C 2608 from energy source C 2104, and the like. At another exemplary future time 2610, visual elements 2602 may represent the sources of energy 1924 available to the consumer from the energy supply network 2502 that relate to the costs estimated at future time 2604. Among the sources of energy such as source A 1930, source B 1932, source C 2104, and the like, the UI 1970 can highlight source B 1932 because it is the cleanest and/or most inexpensive source at the time. The UI 1970 may also allow a consumer to select one or more of the energy sources 1924 to be used in the future time intervals 2604, 2610. The selected energy sources 1924 may then be used to produce energy for consumption by the consumer in the future time intervals 2610, by being allocated for use by the consumer in the future time intervals 2610.

Figure 27:
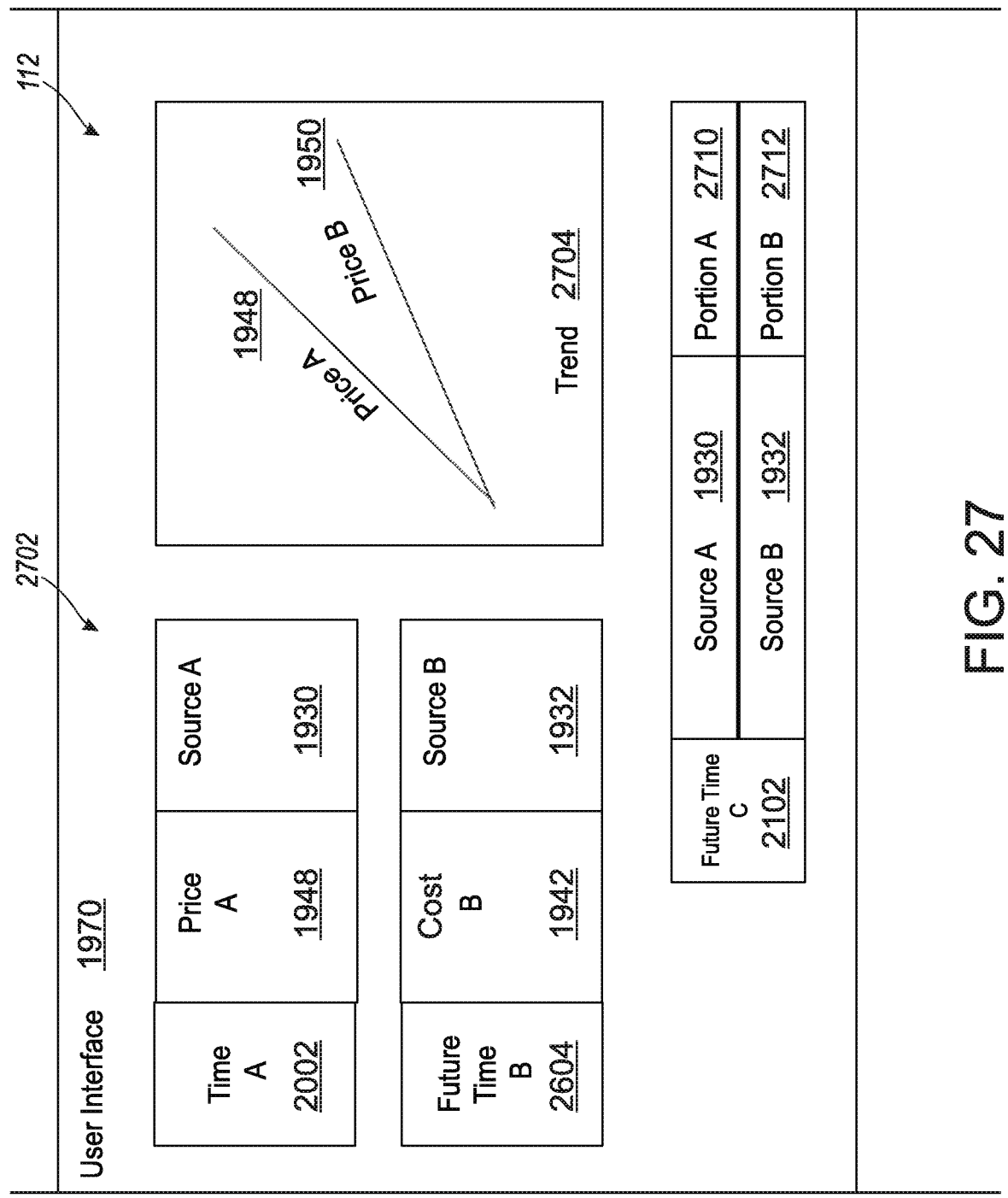

In embodiments and with reference to FIG. 27 and continuing reference to FIGS. 1A, 1B, and 19-26, the UI 1970 may also include one or more visual elements 2702 representing an indication of a trend direction 2704 of price A of energy 1948 for the energy source A 1930 compared to, for example, the price of energy B 1950 for the energy source B 1932. In doing so, the UI 1970 may further detail prices of the energy available to empower the consumer to decide when to use what sources of power over many different time intervals 1914.

Figure 28:
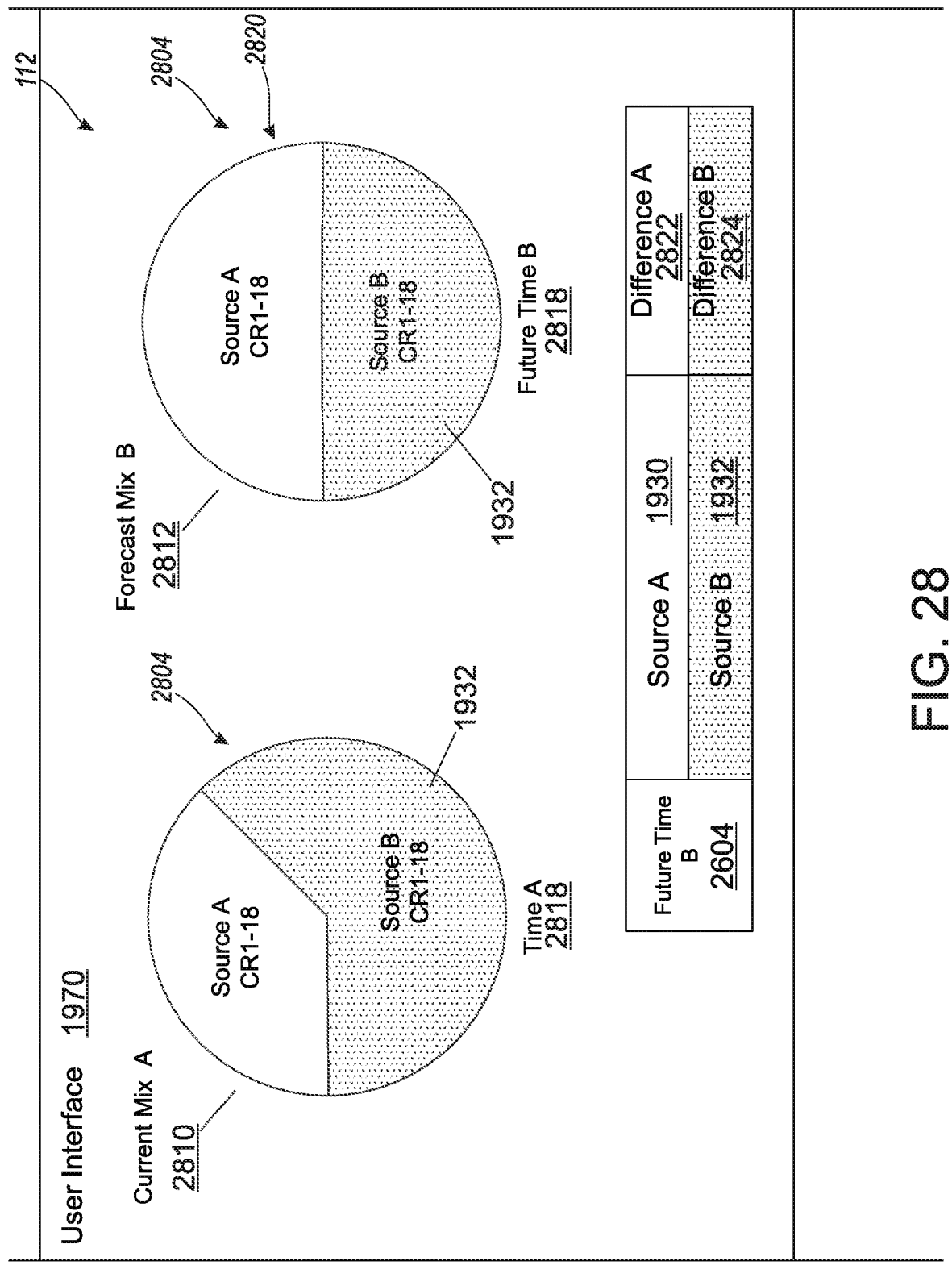

In embodiments and with reference to FIG. 28 and continuing reference to FIGS. 1A, 1B, and 19-27, the UI 1970 may also include visual elements 2802 representing mixes 2804 of energy sources 1924 being used to provide energy to the consumer. The mixes 2804 may include mix A 2810, mix B 2812, and the like. The mix A 2810 may be a current mix and may be used at one of more of the time intervals 1914 including current time interval A 2814 and forecasted mix times B 2812 may be used at future time intervals 2818. In these embodiments, the visual elements 2802 of the UI 1970 may also display differences 2820 between the current mix and forecasted mix including difference detail A 2822, difference detail B 2824, and the like. In these embodiments, consumer interaction with the visual elements 3202 may facilitate the allocation and selection 2830 of the energy sources 1924 in the mix of energy sources for future time intervals to produce energy for the consumer.

In embodiments, the marketplace platform may enable managing production based on the forecast demand for energy from particular types of energy sources. The marketplace platform may collect and optionally aggregate demand estimates for each of the raw sources of energy from a collection of consumers, such as indicated by consumers in a mobile application or other interfaces of the platform. An energy producer load manager may control or signal for energy flow from the raw energy sources at least in part based on the demand. Thus, in embodiments, an energy supply network for a consumer is provided, the network including multiple producers of a type of energy suitable for distribution over a residential energy distribution network, wherein a set of the multiple producers each uses different raw sources of energy to produce the type of energy; a consumer energy marketplace platform that calculates aggregated demand estimates for each of the raw sources of energy based on aggregated consumer energy consumption estimates allocated to each of the raw sources of energy as specified by the consumers; and an energy producer load manager that controls energy flow to the energy supply network from the multiple producers based on a demand forecast received from the consumer energy marketplace platform for each of the different raw sources of energy. The network may further include an energy output meter configured to measure an amount of energy provided to the energy supply network at an entry point into the energy supply network for each of the multiple producers. In embodiments, the type of energy is selected from the list consisting of natural gas, renewable, nuclear, coal, electricity, and oil.

In embodiments of the present disclosure, a platform is provided for controlling or signaling for energy producer output onto the grid based on feedback from consumer selection of raw energy source. A consumer may, for example, indicate a selection or preference for a renewable energy source over a fossil fuel source, for a less expensive source over a more expensive source, or the like, and individual or aggregate signals may be used to adjust the mix of raw energy sources used to power a grid on which one or more such consumers are located to better match the preferences or selections made by such consumers. In embodiments, methods and systems disclosed herein include methods and systems for managing energy for consumers, which may include methods and systems for receiving an estimate of an amount and timeframe of availability of the energy from each of multiple energy producers of a type of energy suitable for distribution over a residential energy distribution network; calculating a cost to receive the energy from the multiple energy producers and a retail price to provide the energy to the consumers over the residential energy distribution network from each of the multiple producers; generating retail consumer-specific usage cost estimates for multiple adjacent time intervals during the timeframe of availability by applying consumer-specific usage data to a model of energy usage for each of the multiple energy producers; associating a raw energy source to each of the multiple energy producers; presenting, in an electronic user interface of a consumer energy marketplace, comparative cost estimate information for a set of the multiple energy providers for the multiple adjacent time intervals; and in response to a consumer selecting a raw energy source for each of the multiple adjacent time intervals, providing raw energy source-specific energy demand data to an energy producer load management facility for managing an allocation of demand of energy during the timeframe of availability among the multiple energy producers. In embodiments, the raw energy source is selected from the list of raw energy sources consisting of solar, wind, hydro, fossil, nuclear, and gravity. In embodiments, the user interface is populated by data from a consumer energy marketplace through which a source of energy for allocating to at least one future discrete time interval is selectable by the consumer.

In embodiments, methods and systems are provided for an energy marketplace platform with energy cost calculation and feedback of consumer selection or preference for one or more raw energy sources based on the cost calculation. The cost calculation can take information, such as from a pricing engine that determines real time cost, forward market cost, and the like for energy based on information about the cost of raw energy sources used to power a power grid serving one or more consumers and present such information in an interface of the platform, such as in a mobile application of the platform. The interface can prompt a consumer to indicate a preference or selection, such as for a particular source or sources of energy. Based on the preference of an individual consumer or a group various actions may be taken, such as adjusting the mix of raw energy sources, recommending activities of the consumer, and the like. In embodiments, methods and systems are provided for an energy marketplace platform, including an energy supply pricing interface that accesses energy supply prices for multiple energy providers; an energy supply-demand feedback interface that provides consumer demand information for multiple raw energy sources, wherein each of the multiple energy providers is associated with at least one of the multiple raw energy sources; a consumer energy usage calculator that collects information about energy usage of multiple types of energy from energy usage monitoring devices disposed to determine an estimate of energy usage for multiple energy consuming devices operated by multiple consumers; a consumer energy cost calculator that computes a cost of using different raw energy sources to deliver energy needed to the multiple consumers based on the estimate of energy usage; and a consumer interface that presents computed costs of using different raw energy sources for individual consumers and is configured to provide an individual consumer with the ability to select at least one of the multiple raw energy sources for multiple adjacent time intervals, wherein the consumer demand information includes an aggregation of the individual consumer selection of at least one of the multiple raw energy sources with a plurality of other individual consumer selections of the at least one of the multiple raw energy sources. In embodiments, the user interface is populated by data from a consumer energy marketplace through which a source of energy for allocating to at least one future discrete time interval is selectable by one of the multiple consumers.

In embodiments, various modules, engines, systems and components facilitate providing visibility for real time pricing of the energy that is available to be delivered to a consumer from various raw energy sources that power a grid that provides energy to be consumed by the consumer. These include interfaces (and supporting components) for collecting information about real-time prices and energy sources that are available, such as from independent services organizations that maintain the energy grid. A host interface may be provided by which a host may process information collected about pricing, such as raw energy cost information, delivery cost information, regulatory cost information, and the like. The host may process the information in to various presentations, such as in visual or other user interface elements, to a user. The platform may include a pricing engine for combining raw energy cost, energy delivery cost, regulatory cost, and other costs for each of a plurality of types of raw energy, such as by time period, such as in a real-time snapshot, a snapshot of a forward market (such as for a day-ahead time period), or the like. The platform may include a regulatory interface by which regulatory information may be collected. The platform may include a user interface, such as of a mobile application, in which the platform facilitates presenting energy options with associated cost information for at least some of the available energy delivery offerings.

In embodiments, a platform for a consumer energy marketplace is provided including a service organization interface through which the marketplace receives at least one of energy demand information and real-time pricing information for energy delivered over an energy distribution network that supplies an energy consumer; a host interface through which the energy marketplace host processes delivery-related cost information for a plurality of consumer energy delivery offerings; a pricing engine that combines raw energy cost and energy delivery costs for each of the plurality of energy delivery offerings into a snapshot of energy pricing for an interval of time; and a user interface of the platform that facilitates presenting a plurality of energy cost options for at least a portion of the energy delivery offerings. In embodiments, the plurality of energy cost options is differentiated based on a raw source of energy used to produce energy delivered over the distribution network. In embodiments, the pricing engine calculates consumer prices of energy for each raw source of energy. In embodiments, the pricing engine calculates consumer prices of energy based on an estimate of aggregated demand for energy for each raw source of energy used to produce energy delivered over the distribution network. In embodiments, the energy cost options for a given energy delivery offering include energy costs for a plurality of raw energy sources available through the given energy delivery offering. In embodiments the platform further includes a regulatory interface through which an energy regulatory agency exchanges regulatory-related costs for at least one of energy delivered over the network and consumer access to energy delivered over the network. In embodiments, the pricing engine accounts for the regulatory-related costs. In embodiments, the pricing engine combines raw energy source-specific energy pricing with raw energy source-specific distribution and regulatory costs for producing energy cost options for each different raw source of energy. In embodiments, the pricing engine calculates real-time pricing for energy based on a spot market price for a time interval. In embodiments, the pricing engine calculates pricing for energy in a forward market for energy. In embodiments, the forward market is a day-ahead market. In embodiments, the calculation is based on a forward market for a specific type of raw energy source. In embodiments, the platform for the consumer energy marketplace is provided including a service organization interface associated with the consumer energy distribution network that is configured to include at least one of a licensed entity 1990, an authorized entity 1992, and a regulated entity 1994 that facilitates delivery of energy for consumption by the consumer. The consumer energy distribution network may also be configured to include an entity who is regulated in its interaction with delivery of energy for consumption by the consumer. The consumer energy distribution network may also be configured to include an entity who is authorized by a governing entity to proceed with its interaction with delivery of energy for consumption by the consumer.

Methods and systems are provided herein for presenting unit energy costs for a range of raw energy sources as a time series. The platform may collect raw energy cost information, such as from independent services organizations that maintain the grid and provide energy, from energy market data providers, or the like. The platform may process the information, such as by determining what energy grid delivered power to a consumer during each time interval, and what price was charged for the raw energy used to supply that grid, including across multiple raw energy sources. A time series may display the cost of energy for the consumer in the aggregate or by particular raw energy sources, among other options.

In embodiments, methods and systems are provided for updating a data structure of energy price information at least once per time period for a plurality of raw energy source-differentiated providers of an energy-type that is available to a consumer as a source of the energy-type delivered over a consumer energy distribution network; calculating a unit cost for each of a plurality of consecutive time periods for consumption of a unit of the energy-type delivered over the consumer energy distribution network for each of the raw energy sources; and presenting the unit cost for each raw energy source as a time period-based time series of unit costs in a user interface. In embodiments, unit costs for a raw energy source available to the consumer for each time period is displayed in the presentation by a non-text visual element. In embodiments, the interface further facilitates selection by the consumer of a raw energy source. In embodiments, unit costs for a raw energy source not selected by the user for a given time period that has a lower unit cost than the raw energy source selected by the user for the given time period is presented with a visual element that indicates a savings opportunity. In embodiments, calculating the unit cost includes calculating unit cost for future time periods based on forward pricing information. In embodiments, calculating the unit cost includes combining the energy price information with other cost information. In embodiments, the other cost information includes at least one of a regulatory cost, a delivery cost, and a platform membership cost.

In embodiments, methods and systems are provided for presenting current and future energy pricing in an energy marketplace platform. Information about energy prices, such as from real-time or spot markets for energy (including for different raw energy sources) and forward markets for energy (such as day-ahead markets), may be collected in the platform. Information may include forecast information for a time period (such as for an hour ahead, or the like, including based on predictions using data sources within the platform and external data sources, and ones using prediction systems described elsewhere herein. Such information may be associated with a specific energy grid, so that information may be provided for the raw energy sources that currently power a grid that delivers energy to a consumer's facility or that are potentially available to power such a grid for a future time interval (such as the next day, the next hour, or the like).

In embodiments, methods and systems are provided for receiving energy pricing information indicating current and estimated future energy costs for raw energy-use production source producing energy for an energy grid that provides energy to a consumer; and presenting in a user interface for the consumer a visual element indicating the pricing information. The methods and systems may further include comprising aggregating information and updating a data structure of raw energy source information at least once per time period for a plurality of raw energy source-differentiated providers of an energy-type delivered over a consumer energy distribution network and using the data structure to enable the visual element indicating the energy mix information. The methods and systems may further include calculating a unit cost for each of a plurality of consecutive time periods for consumption of a unit of the energy-type delivered over the consumer energy distribution network for each of the raw energy sources and presenting both the cost and the pricing information in the interface. The methods and systems may further include presenting the calculated cost information for the consumed energy as a time period-based time series in a user interface. In embodiments the visual element aggregates fossil fuel energy sources together. In embodiments the visual element aggregates renewable energy sources together. In embodiments the visual element indicates a mix among at least two of a fossil fuel source, a coal source, an oil source, a natural gas source, a nuclear source, a renewable source, a wind source, a solar source, a hydropower source, a stored energy source, a battery source, and a gravity power source. The methods and systems may further include an interface element by which a consumer may indicate a preferred mix of energy sources for future consumption. The methods and systems may further include an interface element by which a user interface element provides a recommendation for a consumer action that is configured to result in the preferred mix. In embodiments the interface element is produced using a recommendation engine that operates on at least one of historical, real-time and forward market information regarding at least one of energy production and energy price for at least one of a plurality of raw energy sources.

Figure 29:
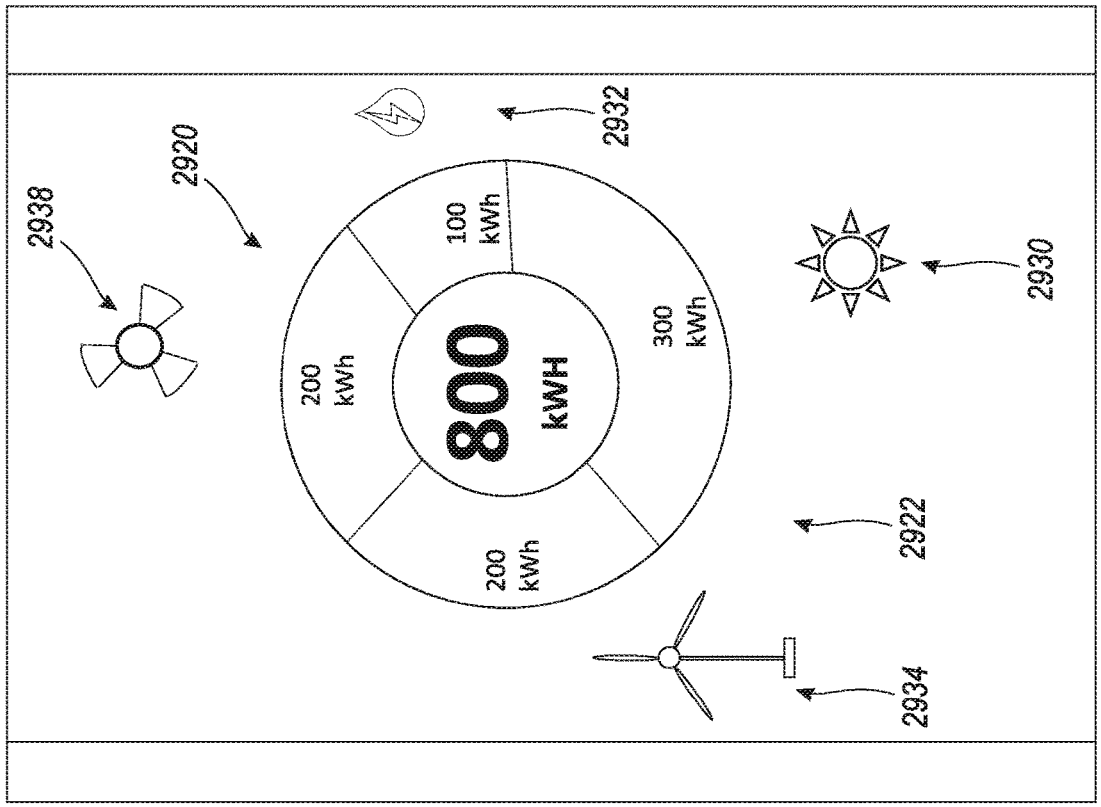
FIGS. 29, 30, and 31 depict a diagrammatic view of a user interface of the mobile application providing different time intervals for different blends of renewables at differing times of the day in accordance with the present disclosure.
Figure 29:
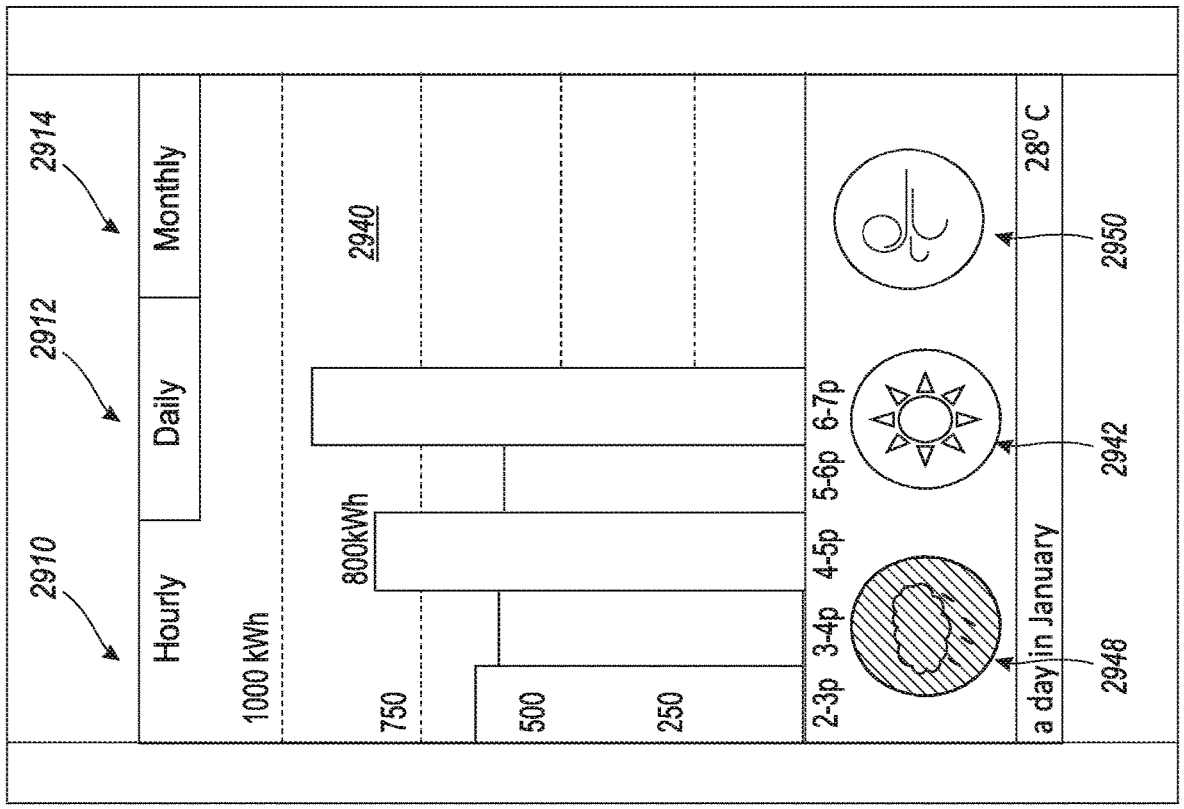
Figure 30:
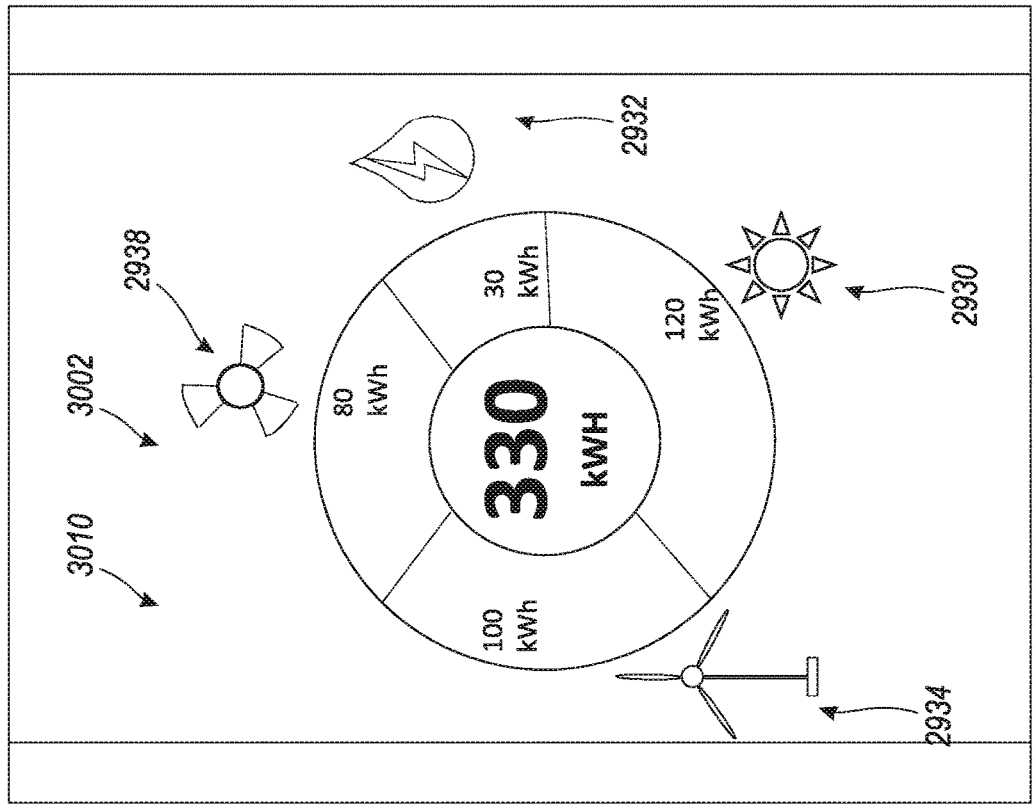
Figure 30:
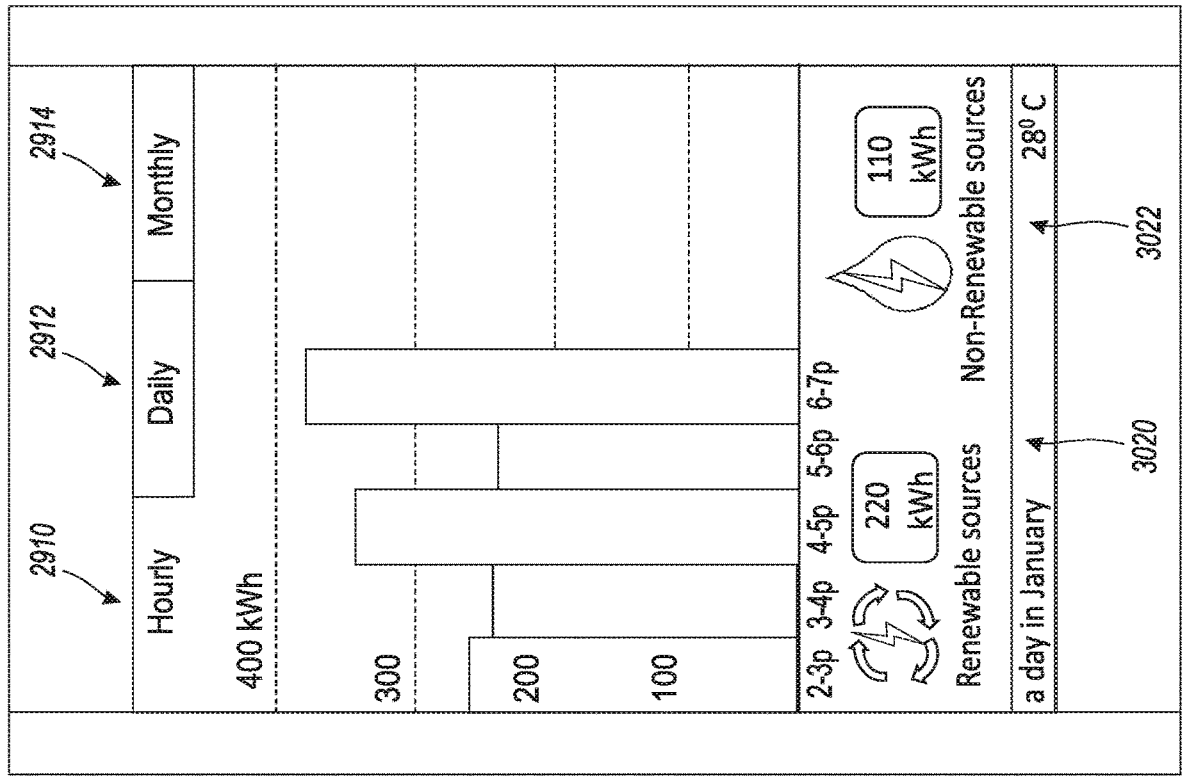
Figure 31:
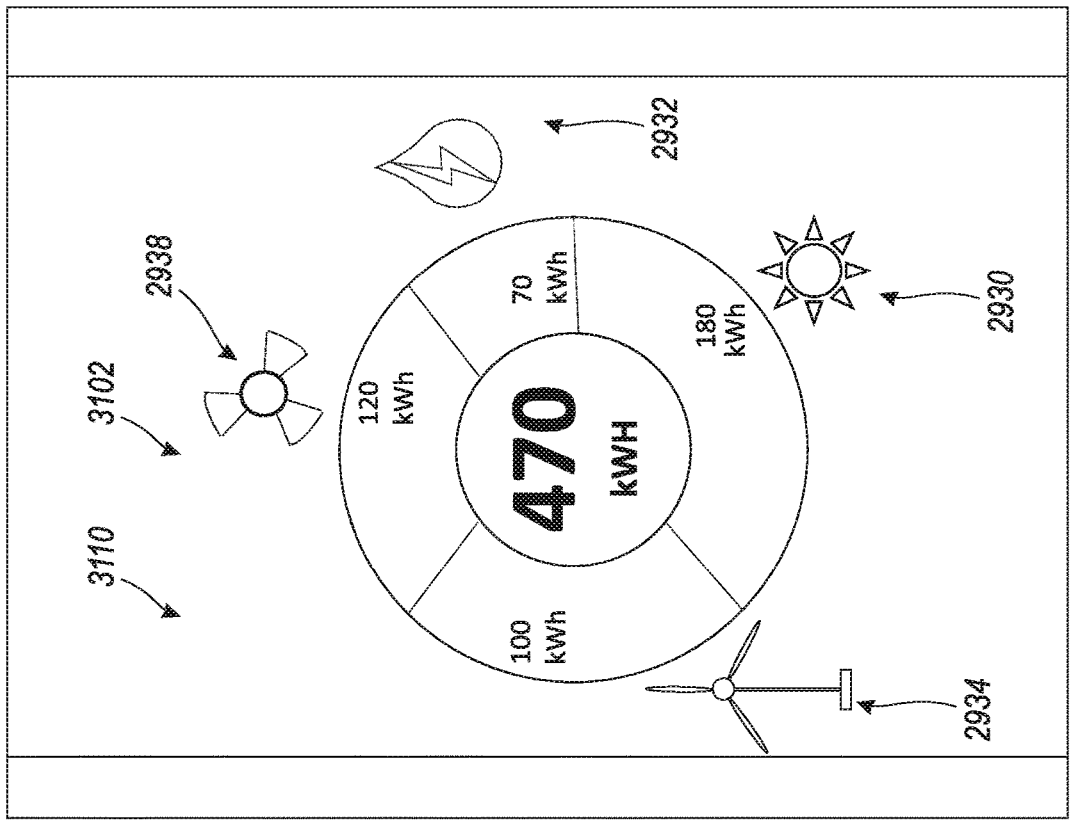
Figure 31:
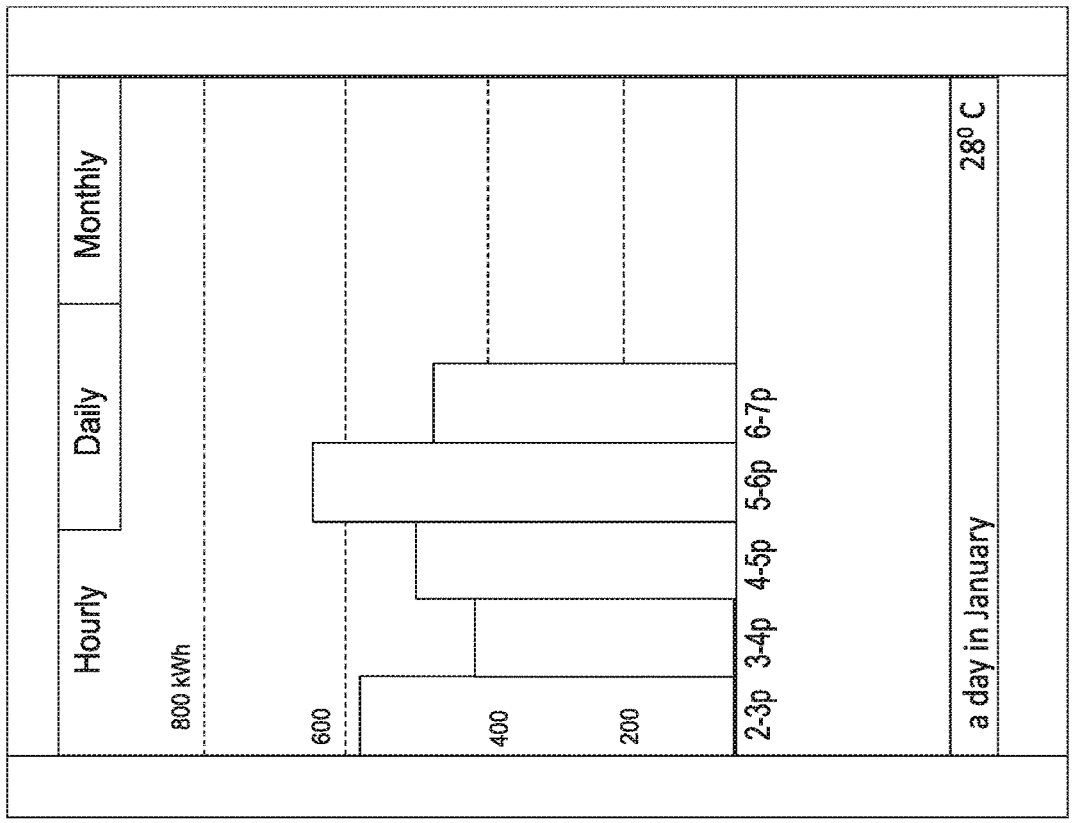

FIGS. 29, 30 and 31 depict user interfaces 1970 with visual elements 2902, 3002, 3102 that detail aspects of the utility marketplace platform 100, such as may be displayed in a mobile application, website, or other interface viewed by a consumer 132, displaying real-time energy capacity, demand, and availability respectively. The utility marketplace platform 100 may aggregate the capacity from different energy providers, such as providers of various raw energy sources 1924. The platform 100 may also aggregate demand from different consumers 132 to calculate the real-time energy capacity and consumer demand for a group of users, such as users served by an electrical grid or part thereof. In embodiments, real-time energy availability of energy may be determined by accounting for real-time demand in light of real-time capacity. Capacity, demand and availability may be accounted for by type. For example, consumers may indicate a preference for renewable energy, and the platform 100 may determine whether real time demand can be met by real-time capacity from renewable energy sources (i.e., that there is available capacity) or not (there is no available capacity generated from that source of energy). Indications of real time capacity and availability in light of demand may be displayed to a consumer 132, such as indicating whether consumption is likely to be served by a desired mix of available sources or not.

FIG. 29 depicts an example embodiment of the user interface (UI) 1970 of the utility marketplace platform 100 showing visual elements 2902 that relate to real-time energy capacity available to the platform, which may be made available, in many embodiments, to a supplier of energy, an independent service organization (ISO), a host of the platform 100, a consumer 132, other consumers on the platform, other users, data marketplaces on other platforms, and the like. The UI 1970 with visual element 2902 may provide information about the total energy capacity and the energy mix to different participants of the platform. The UI 1970 with visual element 2902 may include, for example, an hourly capacity view 2910, a daily capacity view 2912 and a monthly capacity view 2914. The UI 1970 with visual element 2902 may also include an energy mix view 2920 showing a breakdown of total capacity based on a raw energy mix 2922. The hourly capacity view 102 of the UI 1970 with visual element 2902 may aggregate the capacity information provided by a plurality of energy providers supplying energy to an energy grid on which the utility marketplace platform may collect information (in this example on an hourly basis) and then displays this capacity. The energy mix view 2922 further breaks down the total capacity aggregated from various providers based on different raw energy sources. In embodiments, the UI 1970 with visual element 2902 includes different raw energy sources represented in the energy mix on the platform include, for example, a solar element 2930, a fossil element 2932, a wind element 2934, a nuclear energy element 2938, and the like as needed over time. It will be appreciated in light of the disclosure that wide ranges of energy sources may be represented including fossil fuel source, coal source, oil source, natural gas source, ethanol or other biofuel sources, nuclear source, wind source, solar source, hydropower source, stored energy source, battery source, and gravity power source.

The UI 1970 with visual element 2902 may, therefore, provide a report 2940 showing total capacity and the raw energy mix at any given time and displays this report to consumers, energy providers, operators of the platform 100, ISOs and other parties. In embodiments, the platform 100 may show a grid with total capacity of 800 kWh between 4-5 PM on a day in January. This capacity further includes of 300 kWh of solar energy, 100 kWh of fossil energy and 200 kWh each of wind and nuclear energy.

The UI 1970 with visual element 2902 may also include buttons 2942 or other UI elements by which a user may obtain an indication of the estimated total capacity of market platform 100 based on environmental conditions. For example, selecting button A 2944 provides capacity information when the weather is sunny while selecting button B 2948 provides capacity information when the conditions are rainy. In embodiments, button C 2950 provides capacity information when conditions are windy. It will be appreciated in light of the disclosure that the total capacity, as well as the energy mix, may be different during different environmental conditions. For example, an energy provider generating solar energy may produce little or no energy during rainy conditions and so the energy mix may include greater proportions of fossil energy. In other embodiments, the UI 1970 with visual element 2902 may automatically present capacity based on forecasts, weather models, physical models, or information reported in real time, such as from an ISO, an energy provider, a smart grid system, other cloud providers, or the like.

FIG. 30 depicts the user interface (UI) with the visual elements 3002 that detail an energy demand graph for the utility marketplace platform 100. In embodiments, the utility marketplace platform 100 may allow a consumer 132 to provide an indicator of a preference for a raw energy source for a given time interval, which may be understood as an indicator of demand for that source. In other embodiments, demand may be measured by actual consumption of energy, such as by aggregating smart grid information, receiving a report from an ISO or grid infrastructure provider, aggregating information from a smart meter, or the like. Where a preference is indicated for a type of energy, the nominal or expressed demand for energy from a given raw energy type by all the consumers of the platform 132 may be aggregated for a given time interval to calculate total demand for the raw energy type. In embodiments, the demand data can then be used to report the energy demand graph for platform 100. In embodiments, the demand data can be used to report the energy demand graph for platform 100 and the consumer may react to the data and alter their energy consumption activities to take advantage of better pricing in lower demand time intervals and/or take advantage of more preferable energy mixes that may be supplied during such demand or may not be available because such demand is overwhelming the preferred mix of energy sources desired by the consumer.

In other embodiments, reports 3010 in the UI 1970 with the visual elements 3002 may be populated by actual demand information as indicated by current consumption. In the example illustrated in FIG. 30, the UI 1970 with the visual elements 3002 may depict a total aggregated expressed demand of 330 kWh between 4-5 PM on a day in January includes 120 kWh of solar energy, 30 kWh of fossil energy, 100 kWh of wind energy and 80 kWh of nuclear energy. By understanding desired sources, the platform 100 may, in embodiments, nominally allocate to particular consumers a fraction of the grid's capacity (or portion thereof), such that while energy is in fact actually mixed from various raw energy sources to produce energy that is indistinguishable by source once on the grid, the energy as reported on the platform 100 may be allocated, tracked, and detailed separately by the nominal assignment of particular tranches of energy to satisfy particular tranches of demand, such as collected by indicators, meters, and the like from individual consumers 132 that may, in turn, be aggregated and presented on the UI 1970 with the visual elements 3002. In embodiments, the UI 1970 with the visual elements 3002 may include additional visual elements to further aggregate non-renewable and renewable energy sources. In embodiments, the UI 1970 with the visual elements 3002 may include button A 3020 that may display the total energy demand for non-renewable sources i.e., solar and wind is 220 kWh. In embodiments, the UI 1970 with the visual elements 3002 may include button B 3022 that may display that the energy demand for renewable sources i.e., fossil and nuclear is 110 kWh.

FIG. 31 depicts the user interface (UI) 1970 with the visual elements 3102 that detail an availability graph for the utility marketplace platform 100. The total availability for a given raw energy type at a given time interval may be calculated by accounting for aggregated capacity for the raw energy type and by accounting for either an indicator of demand from consumers for the energy type or actual demand as measured by consumption. The availability data for the different energy types is then aggregated into a report 3110 that details the total energy availability for platform 100, which may be presented by type of raw energy source. For example, the platform has a total availability of 470 kWh between 4-5 PM on a day in January includes 180 kWh of solar energy, 70 kWh of fossil energy, 100 kWh of wind energy and 120 kWh of nuclear energy. Availability may then be allocated to additional demand as indicated by consumers. Thus, the marketplace platform 100 may present and facilitate allocation of electricity to consumers by tranches of energy type, optionally allowing separate pricing of the tranches to account for differences in demand and supply, among other factors, for each raw energy type that produces energy for the grid during a time interval.

The utility marketplace platform 100 may thus generate a variety of reports displaying the indicators of real-time capacity, availability, and consumer demand for energy produced for all different raw energy types for all the consumers and providers (and consumers that are also providers) that are participating in the energy marketplace. The information presented in the reports enables consumers to make decisions related to usage while providers may make decisions related to supply of energy. For example, a consumer may refrain from using energy when the supply is dominated by non-renewable energy types. Similarly, the information may help the providers plan the production capacity based on the information presented in consumer demand graph when providers are on the platform 100 and/or subscribe to data from the platform 100 through a data marketplace.

Figure 32:
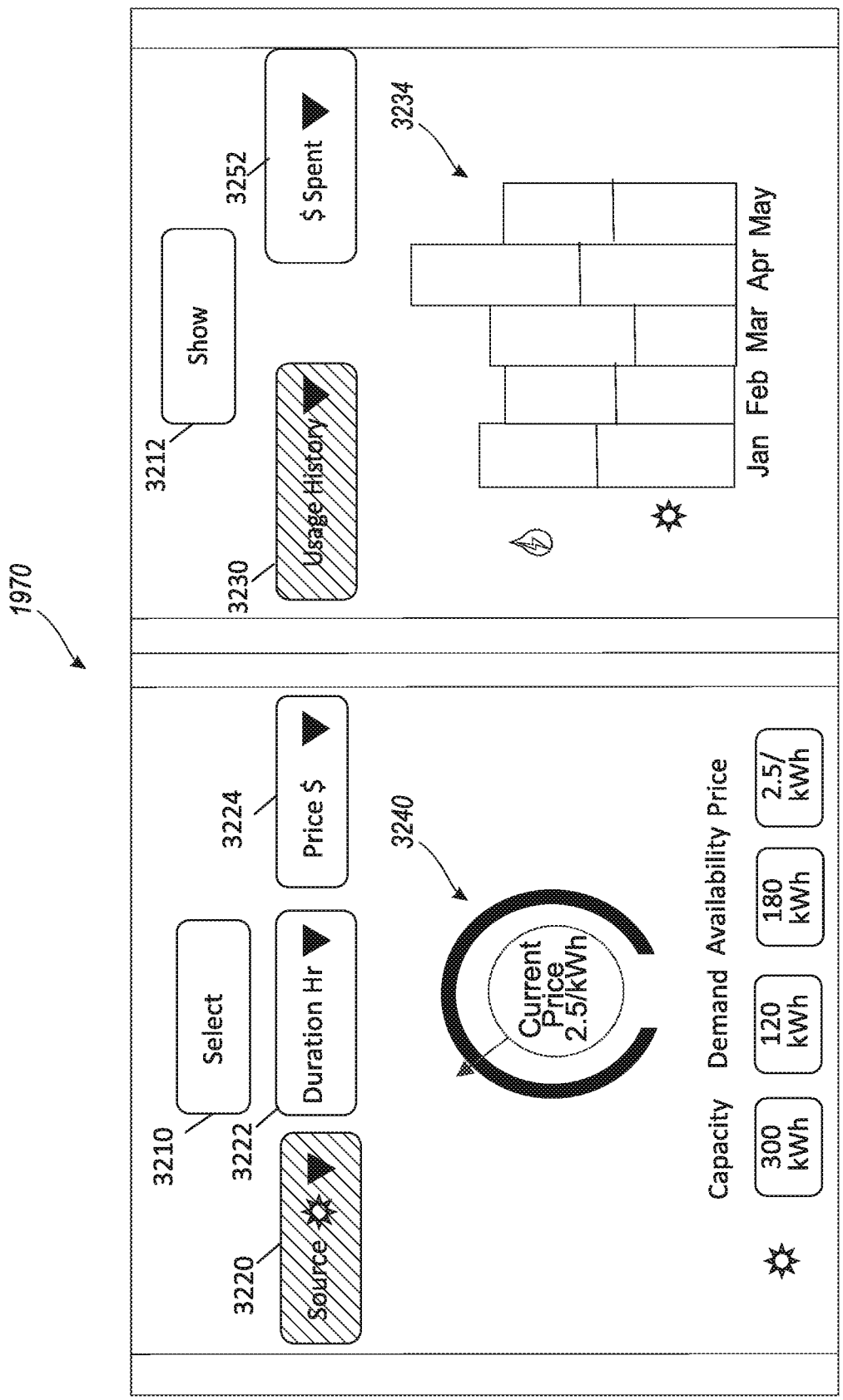
FIG. 32 depicts a diagrammatic view of a user interface of the mobile application providing configurations for different sources, usage histories, durations, and price for various renewables in accordance with the present disclosure.

It will be appreciated in light of the disclosure that utility marketplace platform 100 may consolidate and present information related to the capacity, demand and availability on historical, real-time and forward basis based on energy production and estimation information gathered from the providers and energy price information gathered from the market. In embodiments, FIG. 32 depicts the user interface (UI) 1970 with the visual elements 3202 for a utility marketplace platform 100 in which a consumer 132 can indicate a preference for an amount and type of energy for a time interval. The user interface includes select view 3210 and show view 3212. The select view 3210 include a drop-down menu item for energy source 3220, a drop-down menu item for specified duration 3222, and drop-down menu item for specified 3224. The drop-down menu item for energy source 3220 may allow the consumer to select the different energy sources on the platform. The drop-down menu item for specified duration 3222 may allow the consumer to specify the duration for which to select an energy source. drop-down menu item for specified price 3224 may allow the consumer to select a preferred price range. In embodiments, the consumer 132 may select a solar energy source from item 3220 and may be presented with information related to capacity, demand, availability, and price for solar energy on the utility marketplace 100. The consumer may then select a duration in item 3222 for which an individual or an entity would like to utilize solar energy source. This information may, in turn, be input to demand management engine 110. Alternatively, the consumer instead of specifying the energy source in item 3220, may select a price range in item 3210 and may be presented with one or more recommendations about energy sources to be used based on various factors like price preference and time of the day.

Figure 33:
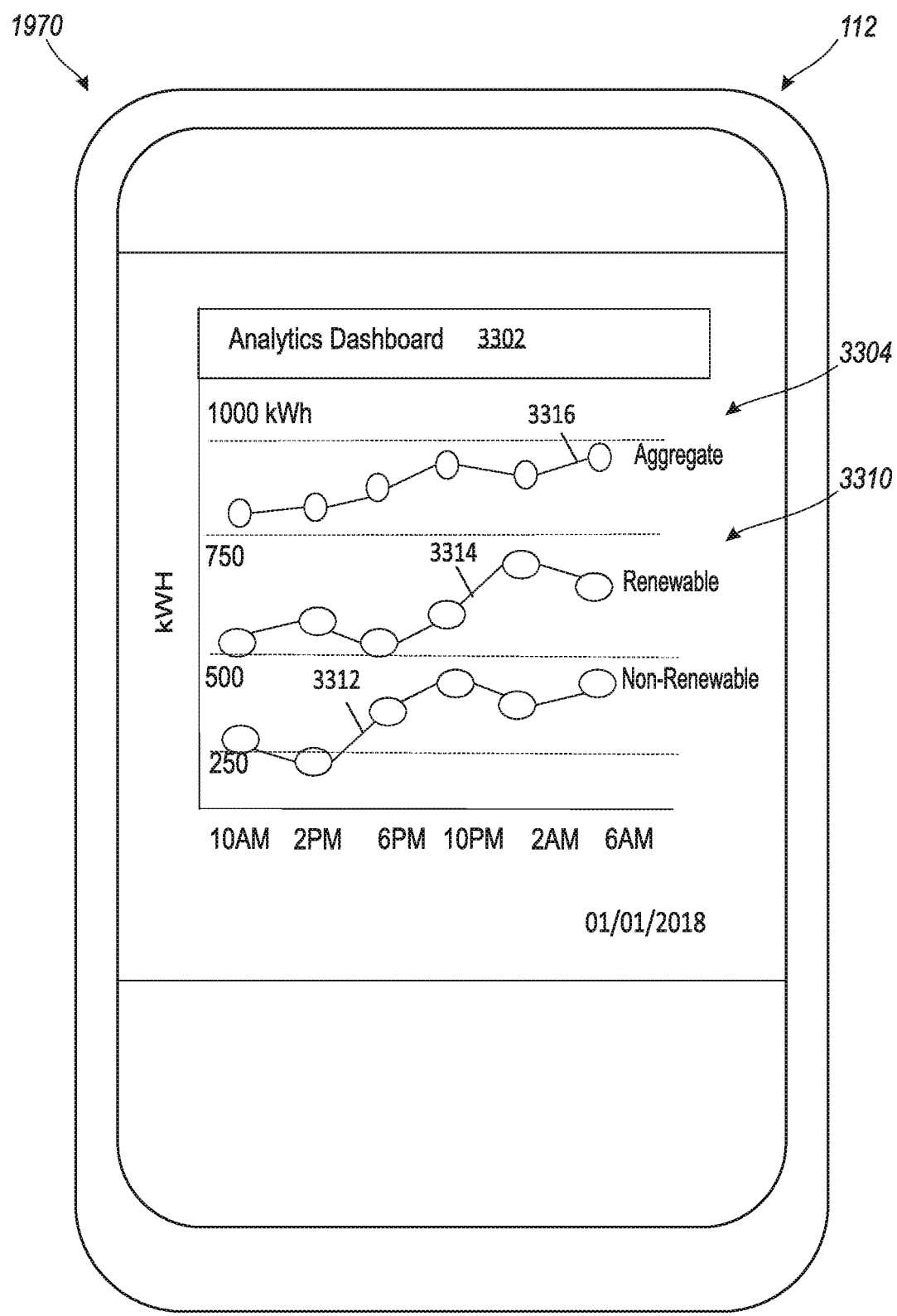
FIGS. 33 and 34 depict a diagrammatic view of a user interface of the mobile application providing chronological values and aggregate values of renewables with an analytics package in accordance with the present disclosure.
Figure 34:
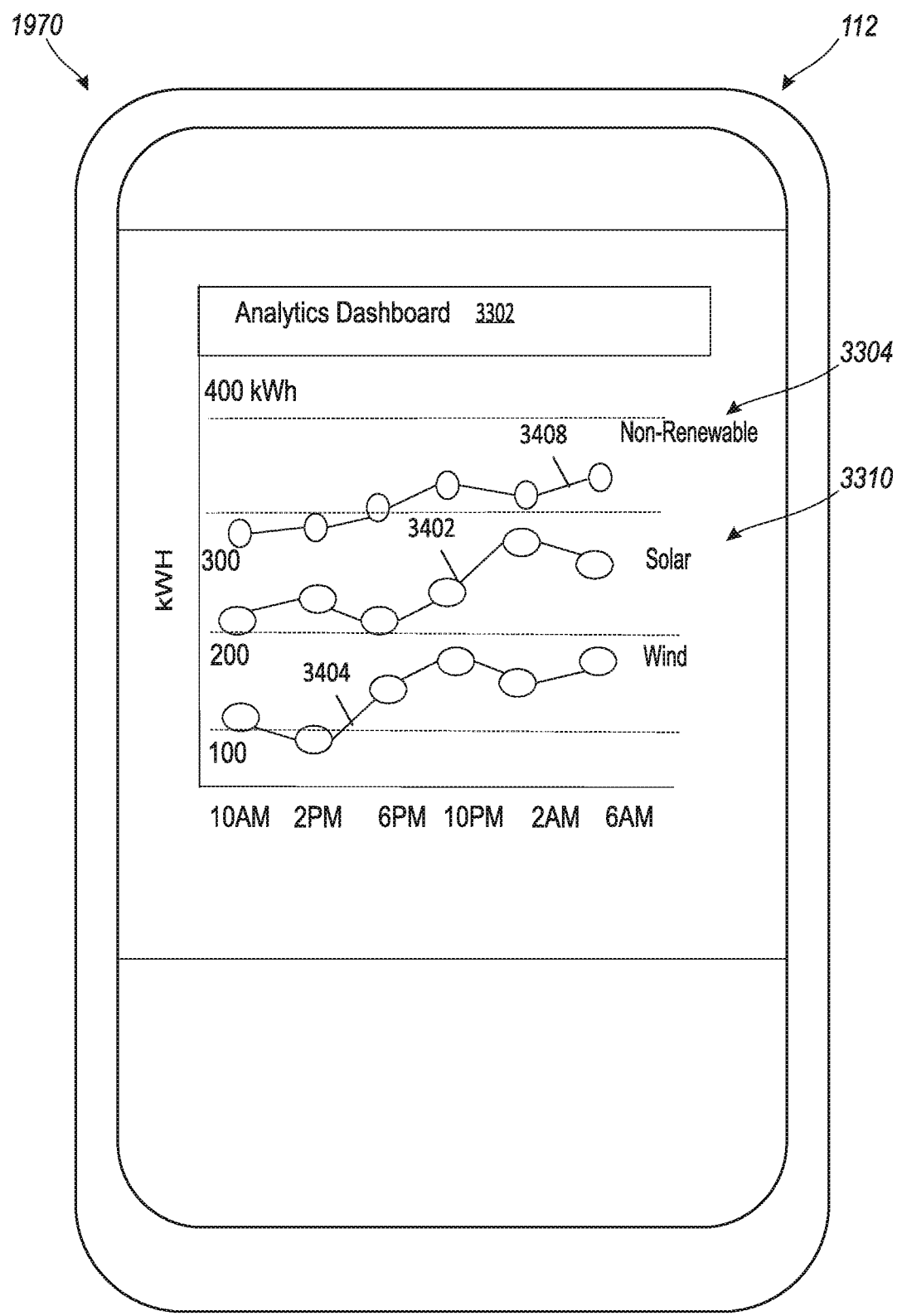

The show view 3212 may be configured to allow the consumer to view the usage history 3230 and money spent 3232 on the utility marketplace platform 100. In embodiments, the consumer 132 may select usage history through a date range 3234 that may include January to May and may be presented with analytics showing the energy usage and energy mix for the period or other periods as selected or defined by one or more of the users. FIGS. 33 and 34 show an analytics dashboard 3302 showing alternate views of available capacity 3304 for the utility marketplace platform 100. FIG. 33 shows an estimate of energy capacity 3310 available on the platform 100 during the course of a full day. In embodiments, a trend line 3312 may depict the available capacity consolidated based on non-renewable energy sources. By way of these examples, a trend line 3314 may depict the available capacity consolidated based on renewable energy sources. In many examples, a trend line 3318 may depict the trend of aggregate available capacity during the day.

FIG. 34 details, in many embodiments, a further break down of the renewable available capacity trend line 3314 of FIG. 33 into a trend line 3402 detailing solar energy capacity and a trend line 3404 detailing wind energy capacity. Trend line 3408 may depict the aggregate of the trend line 3402 depicting the solar energy capacity and trend line 3404 depicting the wind energy capacity.

It will be appreciated in light of the disclosure that the analytics dashboard 3302 on the user interface 1970 may present a wide range of analytics for consumers and providers on the utility marketplace platform 100. The analytics packages may include modules that may present charts and graphs related to production capacity, demand, available capacity, energy mix on historical, real-time and forward basis. The analytics packages may also be provided by the platform 100 to assist consumers for various purposes including usage planning, credit tracking, bill calculation, and the like. The analytics packages may be provided by the platform 100 to assist energy providers for various purposes including demand tracking, prediction, pricing, billing and awarding points to consumers, and the like.

In embodiments, FIG. 35 depicts an exemplary method for generating information and analytics related to the capacity, demand, availability, energy mix, pricing and usage on the utility marketplace platform 100. In this portion of the methodology and as deployed in many systems, the platform 100, at 3510, may gather capacity information from many (or all of) the different energy providers participating on platform 100. At 3512, platform 100 may gather information related to one or more of the raw energy sources for each of the energy providers. At 3514, the platform 100 may aggregate the capacity information based on one or more of the raw energy sources. At 3518, an aggregate demand may be generated based on demand information from all (or pre-defined portions) of the different consumers for different raw energy sources. At 3520, the aggregate capacity and demand information on platform 100 may be displayed to the various participants of the platform. This aggregate capacity and demand information may further be broken down based on different raw energy sources. At 3522, availability may be calculated by subtracting demand from capacity and various analytics around energy availability, energy mix, pricing and usage and may be displayed to the participants on the utility marketplace platform 100.

In embodiments, the methods and systems described herein, such as those that relate to an energy marketplace platform and the like may be employed to provide notifications to consumers, to energy providers, to energy service organizations (e.g., ISOs, regulated energy service companies, and the like), to automated energy monitoring and management systems, and the like. Notifications may facilitate taking action by the recipient to achieve an energy objective, such as reducing energy consumption, energy cost savings, improving the environment, producing energy, and the like. Notifications may be based on a range of energy-related aspects including, without limitation energy pricing (e.g., real-time, estimated, forecast, predicted, and the like), energy availability (e.g., from various sources, such as renewable and non-renewable sources), energy demand (e.g., current, estimated, forecast, and the like), energy-impacting events, and the like. Notifications may be based on changes in energy-related aspects, such as a change in a price for energy, a change in mix of energy sourcing, a change in demand for energy and the like.

In embodiments, notifications may be made to consumers of energy provided over a consumer energy distribution network via computing devices that the user commonly uses, such as a personal mobile device (e.g., a smart phone) and the like. Notifications may be presented to a consumer in a user interface that may include one or more selectable display elements to collect a response from the consumer to the notification. In addition to the selectable display elements facilitating collection of consumer response to a notification, consumer selection of a display element may cause one or more actions related to at least one of consumption and production of energy by the consumer to be performed by the platform, optionally in cooperation with energy consuming and/or energy producing devices under control of the consumer, such as behind-the-meter smart home devices, energy measurement and/or control devices, household and appliances, energy producing devices such as solar panels that the consumer owns and/or operates, electric and/or hybrid electric vehicles and charging stations, and the like.

In embodiments, notifications may be made directly to automated energy control devices, such as energy production systems, energy consumption devices, energy regulating systems and the like. In an example, notification of a decrease in demand for fossil fuel-based energy may be sent to an energy production system that uses fossil fuel to produce the energy. The fossil fuel-based production system may take an action, such as reducing production output, diverting production output to storage or to a portion of the grid that is not experiencing a reduction in demand, and the like. Similarly, a reduction in demand for fossil fuel may trigger an automatic action, such as notification to the platform, service organizations, and the like of a reduction in the price of such fuel charged by the production facility, such as to attempt to mitigate or reverse the reduction in demand.

In embodiments, notification to behind-the-meter devices may include notification to a renewable energy production system under the control of a consumer, such as a solar energy production system to increase production of electricity even though demand for electricity behind-the-meter is being met and to return excess produced electricity to the grid.

In embodiments, methods and systems of energy-related notification may include gathering pricing information, raw energy source information, consumer utilization thereof for calculation of projected costs of energy from different raw energy sources and automatically notifying select consumers. In an example of such energy-related notification, a method may include gathering prices for energy provided over a consumer energy distribution network from providers who use different sources of raw energy to produce the energy provided over the consumer energy distribution network. The prices may cover a plurality of future time intervals for which the providers indicate providing energy over the consumer energy distribution network. Projected costs for the energy may be calculated based one or more of the gathered prices for each of a plurality of consumers consuming energy over the consumer energy distribution network, such as consumers in a geographic region who consume electricity over an energy distribution network that serves the region. Projected costs may be calculated for a plurality of the future time intervals and may include energy and transmission related costs for each of a plurality of raw energy sources. Cost savings automatic notification may be made, such as by a transmission of a signal to a mobile device of each of the consumers who have requested notification when the calculation of projected costs results in a cost savings opportunity. Notification may be directed to select consumers who receive energy derived from a raw energy source that is impacting the cost savings. The notification may include a means by which the consumer can select a different raw energy source and/or a mix of raw energy sources for one or more of the future time intervals.

In embodiments, providers of the energy may indicate providing energy over the consumer energy distribution network based on an estimate of demand for energy sourced from the type of raw energy source used by the providers, such as from renewable energy sources. The estimate of demand may be calculated based on an indication of consumer demand resulting from consumers in the consumer energy marketplace selecting a raw energy source for their energy consumption needs. The consumer selection may be for one or more future discrete time intervals. Raw energy sources available for selection by a consumer in the energy marketplace may include a fossil fuel source, a coal source, an oil source, a natural gas source, a nuclear source, a renewable source, a wind source, a solar source, a hydropower source, a stored energy source, a battery source, and a gravity power source.

In embodiments notification in a consumer retain energy marketplace may include giving consumers an opportunity to adjust a selection of energy sources in response to the notification. Allocation of energy demand from these consumers may be impacted based on the consumer responses. In an example, prices of a consumer accessible energy-type produced by different energy producers may be tracked by accessing real-time energy pricing information for each of the different energy producers. The price information may be accessed through an energy supply information interface of a retail consumer energy marketplace platform. In the example, price notification thresholds for consumer notification may be set for a plurality of raw energy sources. Different energy producers may be associated with at least one raw energy source. The platform may track prices from the energy produces for one or more raw energy sources and, in response to a tracked price crossing the price notification threshold, the platform may send a price alert communication signal to a consumer. The signal may be sent to a consumer personal device, such as a mobile phone through which the consumer accesses the marketplace. The signal may activate a user interface function of the consumer device through which the consumer is enabled to select one of a plurality of raw energy sources. Selecting may result in increasing and/or decreasing an allocation of demand for the energy-type selected to be provided by an energy producer associated with the selected raw energy source. In the example, an increase in allocation of energy demand may be proportional to an estimate of energy usage by consumers of the energy type. Also in these examples, raw energy sources from which energy may be produced, prices may be tracked, and price thresholds may be set may include a fossil fuel source, a coal source, an oil source, a natural gas source, a nuclear source, a renewable source, a wind source, a solar source, a hydropower source, a stored energy source, a battery source, and a gravity power source.

In embodiments, price-related notification may be affected by estimates of consumption demand at least by the estimates of consumption demand impacting pricing of energy directly or indirectly. As described herein, energy pricing may be based on, among other things demand for the energy. Notifications may include an option by which a consumer may indicate his/her preference or specific selection of a raw energy source for the energy they consume. This indication may be aggregated among a plurality of consumers to produce a change in demand or a new demand for energy sourced from a particular raw energy source. This changed/new demand may be communicated from the platform to energy providers who may adjust production capacity and/or pricing based on the demand. If production capacity is available, production capacity may be increased in response to increasing demand. If production capacity is not available, prices for the energy may be increased in response to the increasing demand. Providing a feedback system that is integrated with pricing notification may include estimating a demand for a raw energy-specific consumer energy-type by calculating energy usage for consumers who have indicated a desire to consume energy produced from a specific raw energy type. The calculation may include consumers who are currently or have indicated a change from consuming energy produced from a different raw energy type. The demand estimate may be submitted to an energy supplier. The supplier may send a revised price for energy produced from the specific raw energy type. Based on a comparison of the revised price to a price notification threshold associated with the specific raw energy type, a notification may be sent to consumers. In embodiments, estimating a demand for a raw energy-specific consumer energy-type may include determining factors that impact the demand, gathering measures of the factors from a plurality of sources, and applying the measures to an energy consumption model that estimates energy demand based on the factors. Consumers who are consuming energy produced from a different raw energy type may be notified of an opportunity to switch to the specific raw energy type at a price that may be different than the price of they are paying. Consumers who are consuming energy produced from the affected raw energy type may be notified of a price change.

In embodiments, methods and systems are provided herein for an energy marketplace platform with an interface for an end consumer of energy having a system for automated usage-matching to real-time market price information in a consumer energy marketplace.

In embodiments, methods and systems are provided herein for an energy marketplace platform with an interface for an end consumer of energy having a system for automated usage-matching to real-time market price information in a consumer energy marketplace and having a system for presenting real-time energy pricing and other energy cost to an end consumer.

In embodiments, methods and systems are provided herein for an energy marketplace platform with an interface for an end consumer of energy having a system for automated usage-matching to real-time market price information in a consumer energy marketplace and having a system for presenting the mix of raw energy production sources that are being used to power a grid in real time to a consumer that is using energy from the grid.

In embodiments, methods and systems are provided herein for an energy marketplace platform with an interface for an end consumer of energy having a system for automated usage-matching to real-time market price information in a consumer energy marketplace and having a mobile application by which a consumer participates in the energy marketplace.

In embodiments, methods and systems are provided herein for an energy marketplace platform with an interface for an end consumer of energy having a system for automated usage-matching to real-time market price information in a consumer energy marketplace and having a system for automated notification to consumers of energy pricing changes.

In embodiments, methods and systems are provided herein for an energy marketplace platform with an interface for an end consumer of energy having a system for automated usage-matching to real-time market price information in a consumer energy marketplace and having a gamification engine for enabling a consumer game in an interface of the platform.

In embodiments, methods and systems are provided herein for an energy marketplace platform with an interface for an end consumer of energy having a system for automated usage-matching to real-time market price information in a consumer energy marketplace and having a machine learning system that optimizes gamification features of a game played in an interface of the platform.

In embodiments, methods and systems are provided herein for an energy marketplace platform with an interface for an end consumer of energy having a system for automated usage-matching to real-time market price information in a consumer energy marketplace and having a machine learning system recognizing a pattern to improve a prediction made by a prediction engine based on data collected by the platform.

In embodiments, methods and systems are provided herein for an energy marketplace platform with an interface for an end consumer of energy having a system for presenting real-time energy pricing and other energy cost to an end consumer.

In embodiments, methods and systems are provided herein for an energy marketplace platform with an interface for an end consumer of energy having a system for presenting real-time energy pricing and other energy cost to an end consumer and having a mobile application by which a consumer participates in the energy marketplace.

In embodiments, methods and systems are provided herein for an energy marketplace platform with an interface for an end consumer of energy having a system for presenting real-time energy pricing and other energy cost to an end consumer and having a system for presenting the mix of raw energy production sources that are being used to power a grid in real time to a consumer that is using energy from the grid.

In embodiments, methods and systems are provided herein for an energy marketplace platform with an interface for an end consumer of energy having a system for presenting real-time energy pricing and other energy cost to an end consumer and having a system for automated notification to consumers of energy pricing changes.

In embodiments, methods and systems are provided herein for an energy marketplace platform with an interface for an end consumer of energy having a system for presenting real-time energy pricing and other energy cost to an end consumer and having a gamification engine for enabling a consumer game in an interface of the platform.

In embodiments, methods and systems are provided herein for an energy marketplace platform with an interface for an end consumer of energy having a system for presenting real-time energy pricing and other energy cost to an end consumer and having a machine learning system that optimizes gamification features of a game played in an interface of the platform.

In embodiments, methods and systems are provided herein for an energy marketplace platform with an interface for an end consumer of energy having a system for presenting real-time energy pricing and other energy cost to an end consumer and having a machine learning system recognizing a pattern to improve a prediction made by a prediction engine based on data collected by the platform.

In embodiments, methods and systems are provided herein for an energy marketplace platform with an interface for an end consumer of energy having a system for presenting the mix of raw energy production sources that are being used to power a grid in real time to a consumer that is using energy from the grid.

In embodiments, methods and systems are provided herein for an energy marketplace platform with an interface for an end consumer of energy having a system for presenting the mix of raw energy production sources that are being used to power a grid in real time to a consumer that is using energy from the grid and having a mobile application by which a consumer participates in the energy marketplace.

In embodiments, methods and systems are provided herein for an energy marketplace platform with an interface for an end consumer of energy having a system for presenting the mix of raw energy production sources that are being used to power a grid in real time to a consumer that is using energy from the grid and having a system for automated notification to consumers of energy pricing changes.

In embodiments, methods and systems are provided herein for an energy marketplace platform with an interface for an end consumer of energy having a system for presenting the mix of raw energy production sources that are being used to power a grid in real time to a consumer that is using energy from the grid and having a gamification engine for enabling a consumer game in an interface of the platform.

In embodiments, methods and systems are provided herein for an energy marketplace platform with an interface for an end consumer of energy having a system for presenting the mix of raw energy production sources that are being used to power a grid in real time to a consumer that is using energy from the grid and having a machine learning system that optimizes gamification features of a game played in an interface of the platform.

In embodiments, methods and systems are provided herein for an energy marketplace platform with an interface for an end consumer of energy having a system for presenting the mix of raw energy production sources that are being used to power a grid in real time to a consumer that is using energy from the grid and having a machine learning system recognizing a pattern to improve a prediction made by a prediction engine based on data collected by the platform.

In embodiments, methods and systems are provided herein for an energy marketplace platform with an interface for an end consumer of energy having a mobile application by which a consumer participates in the energy marketplace.

In embodiments, methods and systems are provided herein for an energy marketplace platform with an interface for an end consumer of energy having a mobile application by which a consumer participates in the energy marketplace and having a system for automated notification to consumers of energy pricing changes.

In embodiments, methods and systems are provided herein for an energy marketplace platform with an interface for an end consumer of energy having a mobile application by which a consumer participates in the energy marketplace and having a gamification engine for enabling a consumer game in an interface of the platform.

In embodiments, methods and systems are provided herein for an energy marketplace platform with an interface for an end consumer of energy having a mobile application by which a consumer participates in the energy marketplace and having a machine learning system that optimizes gamification features of a game played in an interface of the platform.

In embodiments, methods and systems are provided herein for an energy marketplace platform with an interface for an end consumer of energy having a mobile application by which a consumer participates in the energy marketplace and having a machine learning system recognizing a pattern to improve a prediction made by a prediction engine based on data collected by the platform.

In embodiments, methods and systems are provided herein for an energy marketplace platform with an interface for an end consumer of energy having a system for automated notification to consumers of energy pricing changes.

In embodiments, methods and systems are provided herein for an energy marketplace platform with an interface for an end consumer of energy having a system for automated notification to consumers of energy pricing changes and having a gamification engine for enabling a consumer game in an interface of the platform.

In embodiments, methods and systems are provided herein for an energy marketplace platform with an interface for an end consumer of energy having a system for automated notification to consumers of energy pricing changes and having a machine learning system that optimizes gamification features of a game played in an interface of the platform.

In embodiments, methods and systems are provided herein for an energy marketplace platform with an interface for an end consumer of energy having a system for automated notification to consumers of energy pricing changes and having a machine learning system recognizing a pattern to improve a prediction made by a prediction engine based on data collected by the platform.

In embodiments, methods and systems are provided herein for an energy marketplace platform with an interface for an end consumer of energy having a gamification engine for enabling a consumer game in an interface of the platform.

In embodiments, methods and systems are provided herein for an energy marketplace platform with an interface for an end consumer of energy having a gamification engine for enabling a consumer game in an interface of the platform and having a machine learning system that optimizes gamification features of a game played in an interface of the platform.

In embodiments, methods and systems are provided herein for an energy marketplace platform with an interface for an end consumer of energy having a gamification engine for enabling a consumer game in an interface of the platform and having a machine learning system recognizing a pattern to improve a prediction made by a prediction engine based on data collected by the platform.

In embodiments, methods and systems are provided herein for an energy marketplace platform with an interface for an end consumer of energy having a machine learning system that optimizes gamification features of a game played in an interface of the platform.

In embodiments, methods and systems are provided herein for an energy marketplace platform with an interface for an end consumer of energy having a machine learning system that optimizes gamification features of a game played in an interface of the platform and having a machine learning system recognizing a pattern to improve a prediction made by a prediction engine based on data collected by the platform.

In embodiments, methods and systems are provided herein for an energy marketplace platform with an interface for an end consumer of energy having a machine learning system recognizing a pattern to improve a prediction made by a prediction engine based on data collected by the platform.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for a consumer to manage energy, the method comprising:
gathering consumer energy usage measurements for energy generated from a plurality of different types of energy sources and consumed by the consumer over discrete time intervals;
allocating the gathered consumer energy usage measurements for each of the different types of energy consumed to an energy source for each type of the different types of energy within the discrete time intervals;
calculating a cost of energy usage for each type of the different types of energy consumed in the discrete time intervals by processing the consumer energy usage measurements for each type of energy consumed and the energy source for each type of the different types of energy with an energy pricing engine that tracks real-time cost of energy sourced from the plurality of different types of energy sources;
aggregating the calculated cost of energy usage across each type of the different types of energy for each time interval;
presenting the aggregated calculated cost of energy usage and calculated costs of at least two sources of energy for each discrete time interval in a user interface; and
automatically controlling at least one device associated with the consumer based at least in part on the calculated cost of energy usage, wherein automatically controlling the at least one device associated with the consumer comprises outputting a signal to a smart home system of the consumer such that the smart home system adjusts operation of the at least one device.

2. The method of claim 1 wherein the user interface is populated by data from a consumer energy marketplace through which a source of energy for allocating to at least one future discrete time interval is selectable by the consumer.

3. The method of claim 1 wherein at least one of the at least two sources of energy is a fossil fuel.

4. The method of claim 3 wherein at least one other source of energy tracked by the energy pricing engine is a different fossil fuel.

5. The method of claim 1 wherein the at least one of the sources of energy is a renewable energy source relative to the plurality of different types of energy sources.

6. The method of claim 5 wherein at least one other source of energy tracked by the energy pricing engine is a fossil fuel source.

7. The method of claim 1 wherein the plurality of different types of energy sources includes at least one source of energy is one of fossil fuel, renewable fuel, and nuclear fuel.

8. The method of claim 1 wherein the energy pricing engine calculates costs of at least two sources of energy based on a consumer type of the consumer, wherein the presented calculated costs of the at least two other sources of energy are based on consumption costs by the consumer type of the consumer.

9. The method of claim 8 wherein the consumer type is one of a retail consumer, a business consumer, an industrial consumer, and an energy provider.

10. The method of claim 1 wherein the energy pricing engine calculates costs of the at least two sources of energy based on a location parameter of the consumer, wherein the presented calculated costs of the at least two sources of energy are based on costs for the energy in a geographic region indicated by the location parameter.

11. The method of claim 10 wherein the location parameter specifies a postal code.

12. The method of claim 10 wherein the location parameter specifies one of a county, a parish, a prefecture, an arrondissement, and a canton.

13. The method of claim 10 wherein the location parameter specifies one of a state, a commonwealth, a province, a territory, a municipality, and a community.

14. The method of claim 10 wherein the location parameter specifies one of a local geographic region, a multi-state region, a community region, and an administrative district.

15. The method of claim 1 wherein the energy pricing engine calculates costs of the at least two sources of energy based on available energy sources associated with a location parameter of the consumer, wherein the presented calculated costs of the at least two sources of energy are for sources of the energy for a geographic region indicated by the location parameter.

16. The method of claim 1 wherein the energy pricing engine calculates costs of the at least two sources of energy based on a target total consumption of energy from the at least two sources of energy, wherein the presented calculated costs of the at least two sources of energy are normalized for the target total consumption.

17. The method of claim 16 wherein the target total consumption of energy is aligned with an actual total consumption of the energy from at least one source of energy from the plurality of different types of energy sources and for each discrete time interval presented in the user interface.

18. The method of claim 1 wherein the at least one device is an energy production or storage system associated with the consumer.

19. The method of claim 1 wherein automatically controlling the at least one device associated with the consumer comprises controlling energy usage of the at least one device.

* * * * *